US009637380B2

(12) United States Patent
Turner et al.

(10) Patent No.: US 9,637,380 B2
(45) Date of Patent: May 2, 2017

(54) NANOSCALE APERTURES HAVING ISLANDS OF FUNCTIONALITY

(75) Inventors: Stephen Turner, Menlo Park, CA (US); Ron Kuse, San Diego, CA (US); Gregory Kearns, San Mateo, CA (US); Pezhman Monadgemi, Fremont, CA (US); Mathieu Foquet, San Jose, CA (US); Drew Martinez, Redwood City, CA (US)

(73) Assignee: Pacific Biosciences of California, Inc., Menlo Park, CA (US)

( * ) Notice: Subject to any disclaimer, the term of this patent is extended or adjusted under 35 U.S.C. 154(b) by 1471 days.

(21) Appl. No.: 13/095,021

(22) Filed: Apr. 27, 2011

(65) Prior Publication Data

US 2011/0257040 A1 Oct. 20, 2011

Related U.S. Application Data

(63) Continuation-in-part of application No. 12/384,097, filed on Mar. 30, 2009, now Pat. No. 8,906,831.

(60) Provisional application No. 61/329,026, filed on Apr. 28, 2010, provisional application No. 61/072,641, filed on Mar. 31, 2008, provisional application No. 61/139,316, filed on Dec. 19, 2008.

(51) Int. Cl.
*B82Y 5/00* (2011.01)
*B82Y 30/00* (2011.01)
*B01J 19/00* (2006.01)
*B01L 3/00* (2006.01)

(52) U.S. Cl.
CPC ........... *B82Y 30/00* (2013.01); *B01J 19/0046* (2013.01); *B01L 3/5085* (2013.01); *B01J 2219/0074* (2013.01); *B01J 2219/00317* (2013.01); *B01J 2219/00509* (2013.01); *B01J 2219/00637* (2013.01); *B01J 2219/00725* (2013.01); *B01L 2200/0668* (2013.01); *B01L 2200/12* (2013.01); *B01L 2300/0819* (2013.01); *B01L 2300/0896* (2013.01)

(58) Field of Classification Search
None
See application file for complete search history.

(56) References Cited

U.S. PATENT DOCUMENTS

| 5,350,686 | A | 9/1994 | Jhingan |
| 6,917,726 | B2 | 7/2005 | Levene et al. |
| 7,013,054 | B2* | 3/2006 | Levene ................. B82Y 20/00 385/12 |
| 7,033,764 | B2 | 4/2006 | Korlach et al. |
| 7,052,847 | B2 | 5/2006 | Korlach et al. |
| 7,056,661 | B2 | 6/2006 | Korlach et al. |
| 7,056,676 | B2 | 6/2006 | Korlach et al. |
| 7,292,742 | B2* | 11/2007 | Levene ................. B82Y 20/00 385/12 |
| 7,993,891 | B2* | 8/2011 | Roitman ............ G01N 33/543 435/174 |
| 2003/0044781 | A1 | 3/2003 | Korlach et al. |
| 2005/0106758 | A1 | 5/2005 | Fukumoto et al. |
| 2006/0061754 | A1 | 3/2006 | Turner et al. |
| 2007/0161017 | A1 | 7/2007 | Eid et al. |
| 2007/0238679 | A1 | 10/2007 | Rank et al. |
| 2008/0220537 | A1 | 9/2008 | Foquet |
| 2008/0241866 | A1 | 10/2008 | Korlach et al. |
| 2008/0241892 | A1 | 10/2008 | Roitman et al. |
| 2009/0118129 | A1 | 5/2009 | Turner |
| 2010/0261158 | A1 | 10/2010 | Nordman et al. |

FOREIGN PATENT DOCUMENTS

| WO | 2007075873 A2 | 7/2007 |
| WO | 2007075987 A2 | 7/2007 |
| WO | 2008121374 A2 | 10/2008 |
| WO | 2008140758 A1 | 11/2008 |

OTHER PUBLICATIONS

Steitz (1999 JBC 274: 17395-8).*
Marblestone et al., "Comparison of SUMO Fusion Technology with Traditional Gene Fusion Systems: Enhanced Expression and Solubility with SUMO," Protein Science (2006) 15(1):182-18.
Oliphant at al., "BeadArray Technology: Enabling an Accurate, Cost-Effective Approach to High-Throughput Genotyping," Biotechniques (2002) 32:S56-S61.
Tolbert et al., "New Methods for Proteomic Research: Preparation of Proteins with N-Terminal Cysteines for Labeling and Conjugation," Angew. Chem. Int. Ed., (2002) 41:2171-2174.
Grego et al., "Template-Directed Assembly on an Ordered Microsphere Array," Langmuir (2005) 21:4 71-75.
Holmberg et al., "The Biotin-Streptavidin interaction can be Reversibly Broken Using Water at Elevated Temperatures," Electrophoresis (2005) 26:601-10.
International Search Report and Written Opinion dated Feb. 8, 2012 for related case PCT/US2011/000747.
International Preliminary Report on Patentability dated Nov. 11, 2012 for related case PCT/US2011/000747.
Extended EP Search Report dated Oct. 31, 2014 for related EP 11777685.6.
First Exam Report dated May 5, 2015 for related CA 2720247.
First Office Action dated Feb. 8, 2012 for related case EP 09755181.6.

(Continued)

*Primary Examiner* — Christopher M Gross
(74) *Attorney, Agent, or Firm* — David C. Scherer; Robert H. Reamey

(57) ABSTRACT

Methods, compositions and arrays for non-random loading of single analyte molecules into array structures are provided. Arrays of confined regions are produced wherein each confined region comprises a single island within the confined region. The island can be selectively functionalized with a coupling agent to couple a single molecule of interest within the confined region.

16 Claims, 29 Drawing Sheets

(56) References Cited

OTHER PUBLICATIONS

Second Office Action dated Aug. 10, 2012 for related case EP 09755181.6.
First Office Action dated Apr. 1, 2014 for related case AU 2009251881.
Extended EP Search Report dated Apr. 7, 2015 for related EP 14196579.8.
Adhikari et al., "Conditions for subeutectic growth Ge nanowires by the vapor-liquid-solid mechanism" J Appl Phys (2007) 102:94311-94316.
Andersen et al., "Assembly and structural analysis of a covalently closed nanoscale DNA cage" Nucl Acids Res (2008) 36(4):1113-1119.
Cerofolini et al., "Strategies for nanoelectronics" Microelec Eng (2005) 81:405-419.
Chen et al., "Critical point energy as a function of electric field determined by electroreflectance of surfacepintrinsic-n+ type doped GaAs" Appl Phys Lett (2004) 84(18):4017-4019\.
Cohen et al., "Method for trapping an manipulating nanoscale objects in solution" Appl Phys Lett (2005) 86:93109-1 to 93109-3.
Eid et al., "Real-time DNA sequencing from single polymerase molecules" Science (2008) 323(5910):133-138.
Foquet et al., "Improved fabrication of zero-mode waveguides for single-molecule detection" J Apply Phys (2008) 103:34301-1 to 34301-9.
Korlach et al., "Selective aluminum passivation for targeted immobilization of single DNA polymerase molecules in zero-mode waveguide structures" PNAS (2008) 105(4):1176-1181.
Levene et al., "Zero mode waveguides for single molecule analysis at high concentrations" Science (2003) 299 (5607):682-686.
Leyden et al., "Tailoring surfaces with silanes" Symp Silylated Surfaces, Gordon & Breach (1980) Arkles, Chemtech (1977) 7:766-778.
Montemagno et al., "Constructing nanomechanical devices powered by biomolecular motors" Nanotech (1999) 10:225-231.
Park et al., "Finite-size fully addressable DNA tile lattices formed by hierarchical assembly procedures" Anger Chem Int Ed (2006) 45:735-739.
Richter et al., "In situ and interrupted-growth studies of the self assembly of octadecyltricholosilane monolayers" Phys Rev E (2000) 61:607-615.
Rothemund, "Folding DNA to create nanoscale shapes and patterns" Nature (2006) 440:297-302.
Rothemund et al., "Algorithmic self-assembly of DNA Sierpinski triangles" PLoS Biol (2004) 2(12)e424:2041-2053.
Svododa et al., "Biological applications of optical forces" Ann Rev Biophys Biomol Structure (1994) 23:247-285.
Weizmann et al., "A polycalenated DNA scaffold for the one-step assembly of hierarchical nanostructures" PNAS (2008) 105(14):5289-5294.
Woodruff et al., "Vertically oriented germanium nanowires grown from gold colloids on silicon substrates and subsequent gold removal" Nano Lett (2007) 7(6):1637-1642.
Zhang et al., "Periodic square-like gold nanoparticle arrays templated by self-assembled 2D DNA nanogrids on a surface" Nano Lett (2006) 6(2):248-251.
Zhang et al., "Conformational flexibliity facilitates self-assembly of complex DNA nanostructures" PNAS (2008) 105 (31):10665-10669.
Zimmermann et al., "Self assembly of a DNA dodecahedron from 20 Trisoligonucleotides with C3h linkers" Angew Chem Int Ed (2007)47:3626-3630.
International Search Report and Written Opinion date Nov. 3, 2009 for related case PCT/US2009/001970.
Supplemental EP Search Report dated Apr. 27, 2011 for related case EP 09755181.6.
Gorris et al., "Optical-Fiber Bundles," Febs Journ (2007) 274(21):5462-5470.
First Exam Report dated Apr. 14, 2016 for related EP 14196579.8.
First Exam Report dated Mar. 3, 2016 for related EP 11777685.6.
Second Exam Report dated May 6, 2016 for related CA 2720247.

* cited by examiner

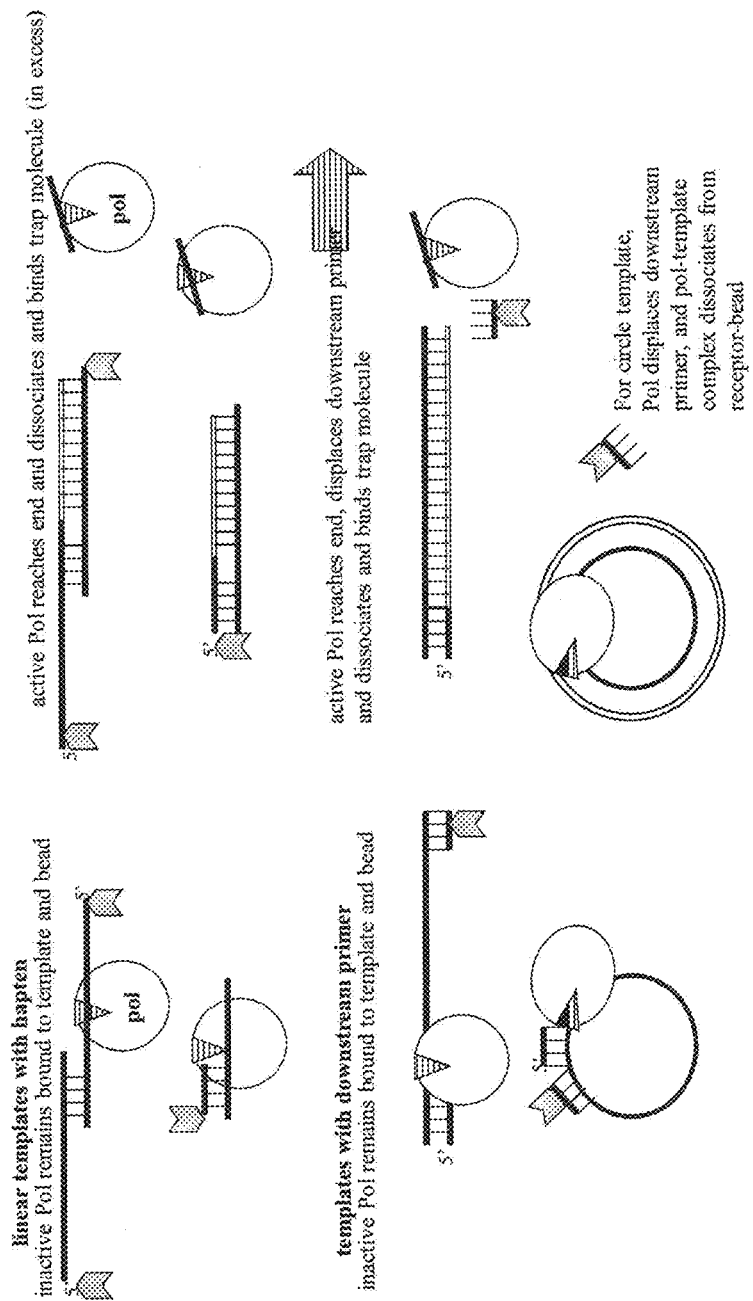

NANOSCALE APERTURES HAVING ISLANDS OF FUNCTIONALITY

CROSS REFERENCE TO RELATED APPLICATIONS

This application claims priority and benefit of Provisional Patent Application 61/329,026, filed Apr. 28, 2010. This application is a Continuation-in-Part to U.S. patent application Ser. No. 12/384,097, filed Mar. 30, 2009, which claims priority to and benefit of: Eid et al., SINGLE MOLECULE LOADING METHODS AND COMPOSITIONS, U.S. Ser. No. 61/072,641, filed Mar. 31, 2008; and Eid et al., SINGLE MOLECULE LOADING METHODS AND COMPOSITIONS, U.S. Ser. No. 61/139,316, filed Dec. 19, 2008; the full disclosures of which are incorporated by reference herein in their entirety.

BACKGROUND OF THE INVENTION

A variety of techniques in molecular biology and molecular medicine now rely on analysis of single biological molecules. Such techniques include DNA and RNA sequencing, polymorphism detection, the detection of proteins of interest, the detection of protein-nucleic acid complexes, and many others. The high sensitivity, high throughput and low reagent costs involved in single molecule analysis make this type of analysis an increasingly attractive approach for a variety of detection and analysis problems in molecular medicine, from low cost genomics to high sensitivity marker analysis.

For example, single molecule DNA sequencing is useful for the analysis of large sets of related DNAs, such as those that occur in a genome. In certain of these methods, a polymerase reaction is isolated within an array of extremely small (typically optically confined) observation volumes that each permit observation of the enzymatic action of individual polymerases in each reaction/observation volume of the array, while the polymerase copies a template nucleic acid. Nucleotide incorporation events are individually detected, ultimately providing the sequence of the template molecule. This approach dramatically increases throughput of sequencing systems, and also dramatically reduces reagent consumption costs—to the point where personalized genomics is increasingly feasible.

The small observation volumes used for single molecule nucleic acid sequencing and other analysis methods are typically provided by immobilizing or otherwise localizing the polymerase (or other) enzyme within an optical confinement reaction/observation region, such as an array of extremely smalls wells as in an array of Zero Mode Waveguides (ZMWs), and delivering a template, primers, etc., to the reaction region. For a description of ZMW arrays and their application to single molecule analyses, and particularly to nucleic acid sequencing, see, e.g., "Selective aluminum passivation for targeted immobilization of single DNA polymerase molecules in zero-mode waveguide nanostructures" (2008) Korlach et al. *Proceedings of the National Academy of Sciences U.S.A.* 105(4): 1176-1181; "Improved fabrication of zero-mode waveguides for single-molecule detection" (2008) Foquet et al. *Journal of Applied Physics* 103, 034301; "Zero-Mode Waveguides for Single-Molecule Analysis at High Concentrations" Levene et al. *Science* 299:682-686; published U.S. patent application No. 2003/0044781; Eid et al. (2008) "Real-Time DNA Sequencing from Single Polymerase Molecules" *Science* DOI: 10.1126/science.322.5905.1263b; and U.S. Pat. No. 6,917,726, each of which is incorporated herein by reference in its entirety for all purposes.

One difficulty in performing single molecule analyses occurs in loading the reaction/observation region of single molecule analysis devices with the molecules of interest (e.g., template or other analyte and/or enzyme). Loading two or more molecules of interest into a ZMW or other small observation volume tends to complicate any analysis of signals observed from double (or more than double)-loaded region. This is because two (or more) sets of signals may simultaneously be observed from the ZMW or other observation volume, meaning that the signals from the ZMW would have to be deconvoluted before data from the observation region could be used. More typically, data from double(+) loaded ZMWs can be recognized by various data analysis methods, and data from mis-loaded ZMWs or other relevant observation volumes is simply discarded.

To reduce the incidence of multiple molecule loading events in the relevant reaction/observation volume(s) of the array, it is typical in the art to substantially "under-load" the array with the analyte molecules of interest. Random distribution of molecules into the array results in one or fewer molecules being loaded into most reaction/observation volumes when fewer than 37% of all observation volumes are loaded. This type of loading is referred to as "Poisson-limited" analyte loading, meaning that few enough molecules are added to the array so that a Poisson-style random statistical distribution of the analytes into the array results in one or fewer analytes per observation volume in most cases. In the ZMW context, state of the art yields for single-molecule occupancies of approximately 30% have been obtained for a range of ZMW diameters (e.g., 70-100 nm). See, Foquet (2008), above. For this degree of loading, about 60% of the ZMWs in a typical ZMW array are not loaded (e.g., have no analyte molecules).

While such random distribution methods are effective in ensuring that, in most cases, not more than a single template or enzyme (or other analyte) molecule is loaded in each observation/reaction volume in an array such as a ZMW array, it would be desirable to develop methods and compositions for increasing the template and enzyme loading density of such arrays. Higher loading densities would permit the simultaneous analysis of more analyte molecules in the array, increasing the throughput of such systems, while simultaneously decreasing analysis costs. The present invention provides these and other features that will be apparent upon complete review of the following.

SUMMARY OF THE INVENTION

In some aspects, the invention provides an array of nanoscale apertures comprising: a transparent substrate having a cladding layer disposed on its surface, the cladding layer having a plurality of nanoscale apertures extending therethrough; each nanoscale aperture having walls and a base, wherein an isolation layer is on the walls and on a portion of the base of the nanoscale aperture; wherein a portion of the base of the nanoscale aperture comprises an island of substrate surrounded by isolation layer.

In some embodiments the substrate comprises a silica based material. In some embodiments the substrate comprises a fused silica. In some embodiments the substrate comprises more than 10,000 nanoscale apertures. In some embodiments the nanoscale apertures comprise holes having a circular lateral profile. In some embodiments the apertures have a cross sectional dimension between 1 nm and 500 nm.

In some embodiments at least some of the plurality of nanoscale apertures comprise a single molecule of interest. In some embodiments the single molecule of interest comprises an enzyme. In some embodiments at least some of the plurality of nanoscale apertures comprise a single active polymerase enzyme, a single active template nucleic acid, or a single active primer attached to the island.

In some aspects, the invention provides an array of nanoscale apertures comprising: a transparent substrate having a cladding layer disposed on its surface, the cladding layer having a plurality of nanoscale apertures extending therethrough; each nanoscale aperture having walls and a base and each nanoscale aperture having an island of island material on the base of the aperture, wherein the island does not contact the walls of the nanoscale aperture In some embodiments the substrate comprises a transparent material. In some embodiments the substrate comprises a silica based material. In some embodiments wherein the substrate comprises a fused silica.

In some embodiments the island material comprises a metal. In some embodiments the island material comprises gold. In some embodiments the substrate comprises more than 10,000 nanoscale apertures. In some embodiments the nanoscale apertures comprise holes having a circular lateral profile. In some embodiments the apertures have a cross sectional dimension between 1 nm and 500 nm.

In some embodiments at least some of the plurality of nanoscale apertures comprise a single molecule of interest. In some embodiments the single molecule of interest comprises an enzyme. In some embodiments at least some of the plurality of nanoscale apertures comprise a single active polymerase enzyme, a single active template nucleic acid, or a single active primer attached to the island.

In some aspects, the invention provides a method for producing an island within nanoscale apertures on a substrate comprising: providing a substrate having a cladding layer, the cladding layer having a plurality of nanoscale apertures extending therethrough; conformally depositing a sacrificial layer onto the top of the cladding layer; directionally etching the sacrificial layer such that the sacrificial layer remains on the walls of the nanoscale apertures, and the sacrificial layer is removed from the region of the nanoscale aperture between the sacrificial layer on the walls; depositing an island material onto the substrate; etching the island material such that a portion of the island material remains in the region between the sacrificial layer between the walls; and removing the sacrificial layer on the walls thereby producing an island of island material within the nanoscale aperture.

In some embodiments the method comprises providing a substrate having a cladding layer, the cladding layer having a plurality of nano scale apertures; conformally depositing a first sacrificial layer onto the top of the cladding layer; directionally etching the sacrificial layer such that the sacrificial layer remains on the walls of the nanoscale apertures, and the sacrificial layer is removed from the region of the nanoscale aperture between the sacrificial layer on the walls; directionally depositing an island material onto the substrate; depositing a second sacrificial layer on top of the island material; etching the second sacrificial layer so as to leave a portion of the second sacrificial layer on top of the island material within the nanoscale aperture, thereby protecting it from the subsequent etching step; etching the island material from the top of the cladding such that a portion of the island material remains in the region between the sacrificial layer between the walls; and removing the first sacrificial layer on the walls and the second sacrificial layer, thereby producing an island of island material within the nanoscale aperture.

In some embodiments the substrate comprises a transparent material. In some embodiments the substrate comprises a silica based material. In some embodiments the substrate comprises a fused silica.

In some embodiments the island material comprises a metal. In some embodiments the island material comprises gold. In some embodiments the sacrificial layer comprises silicon or germanium or silicon and germanium. In some embodiments the nanoscale apertures comprise holes having a circular lateral profile. In some embodiments the substrate comprises more than 10,000 nanoscale apertures.

In some embodiments the method further comprises binding a polymerase enzyme, template nucleic acid, or primer selectively onto the island.

In some embodiments, the first sacrificial layer and the second sacrificial layer comprise the same material. In some embodiments the first sacrificial layer and the second sacrificial layer comprise silicon or germanium or silicon and germanium. In some embodiments the first sacrificial layer and the second sacrificial layer comprise silicon.

In some aspects, the invention provides a method for forming an island of substrate surface within a nanoscale aperture comprising: providing a substrate having a cladding layer on top, the cladding layer having a plurality of nanoscale apertures extending therethrough; conformally depositing an isolation layer on the cladding layer and exposed portions of the substrate; conformally depositing a sacrificial layer onto the top of the isolation layer; directionally etching the sacrificial layer such that the sacrificial layer remains on the walls of the nanoscale apertures, and the sacrificial layer is removed from the region of the nanoscale aperture between the sacrificial layer on the walls, exposing a portion of the isolation layer within the nanoscale aperture; etching the portion of the isolation layer within the nanoscale aperture to expose a portion of the substrate; and removing the sacrificial layer to produce a structure having an island of exposed substrate surface surrounded by isolation layer within each nanoscale aperture.

In some embodiments the isolation layer is deposited by atomic layer deposition (ALD). In some embodiments the isolation layer comprises a metal oxide. In some embodiments the isolation layer comprises alumina. In some embodiments the substrate comprises a transparent material. In some embodiments the substrate comprises a silica based material.

In some embodiments the substrate comprises a fused silica. In some embodiments the island material comprises a metal. In some embodiments the island material comprises gold. In some embodiments sacrificial layer comprises silicon or germanium or silicon and germanium. In some embodiments the nanoscale apertures comprise holes having a circular lateral profile. In some embodiments the substrate comprises more than 10,000 nanoscale apertures.

In some embodiments the method further comprises binding a polymerase enzyme, template nucleic acid, or primer selectively onto the island.

In some aspects, the invention provides a method forming an island of substrate surface within a nanoscale aperture comprising: depositing an isolation layer onto a transparent substrate; forming nanopits in the isolation layer that extend to the substrate surface; depositing, exposing, and developing a resist to form a pillar of resist on top of and extending over each nanopit; depositing a cladding layer such that the cladding layer covers the pillars of resist and the exposed regions of isolation layer; and removing the resist resulting in lift-off of the portion of the cladding layer covering the pillars of resist, thereby forming a nanoscale apertures in the cladding layer, each having a nanopit at its base surrounded by isolation layer.

In some embodiments the substrate comprises a silica based material. In some embodiments the substrate comprises a fused silica. In some embodiments the isolation layer is deposited using atomic layer deposition (ALD). In some embodiments the isolation layer comprises alumina. In some embodiments the thickness of the isolation layer is between 2 nm and 20 nm. In some embodiments the nanopits have a circular lateral profile.

In some embodiments the nanopits have a lateral dimension of between 5 nm and 40 nm. In some embodiments the nanoscale apertures have a circular lateral profile. In some embodiments the nanoscale apertures have a lateral dimension of between 30 nm and 500 nm. In some embodiments the resist comprises a negative tone resist. In some embodiments the nanopits are formed using electron beam lithography or UV lithography.

In some embodiments the cladding comprises a metal. In some embodiments the cladding comprises aluminum.

In some embodiments, prior to forming the nanopits, alignment features are formed on the transparent substrate. In some embodiments the alignment features comprise features etched into the transparent substrate.

In some aspects, the invention provides a method for forming a nanoscale aperture having an island of substrate surface within it comprising: providing a transparent substrate having a sacrificial layer on its top, the sacrificial layer having a hard mask layer on its top; patterning and etching the hard mask layer to form a plurality of nanoscale features; etching the sacrificial layer to expose regions of the transparent substrate such that the etch of the sacrificial layer extends underneath the hard mask layer, producing an undercut; conformally depositing the exposed portions of the transparent substrate and the tops of hard mask layer features with an isolation layer whereby the isolation layer is deposited under the portions of the hard mask overhanging the sacrificial layer; directionally depositing a cladding layer, leaving portions of the isolation layer under the hard mask layer exposed; and removing the remaining portions of the sacrificial layer, hard mask, and portions of the isolation layer and cladding layer on top of the hard mask; thereby producing nanoscale apertures comprising islands of transparent substrate within the nanoscale apertures surrounded by isolation layer.

In some embodiments the sacrificial layer comprises silicon, germanium or silicon-germanium. In some embodiments the hard mask comprises PECVD oxide or nitride.

In some embodiments the etching of the sacrificial layer is carried out in two etching steps, the first having substantially no undercut, and the second etching step undercutting the hard mask layer.

In some embodiments the nanoscale aperture and the island within the nanoscale aperture each comprise a substantially circular lateral profile. In some embodiments the nanoscale apertures have a lateral dimension between 30 nm and 500 nm. In some embodiments the islands have a lateral dimension between 2 nm and 40 nm.

In some embodiments the isolation layer comprises alumina. In some embodiments the cladding comprises a metal. In some embodiments the cladding comprises aluminum. In some embodiments the transparent substrate comprises a silica based substrate.

In some aspects, the invention provides a method for forming a nanoscale aperture having an nanoscale island of island material within it comprising: providing a stack of materials comprising from bottom to top, a transparent substrate, an island material layer, a sacrificial layer, and a hard mask; patterning and etching the hard mask layer to form a plurality of nanoscale features; etching the sacrificial layer to expose regions of the island material layer such that the etch of the sacrificial layer extends underneath the hard mask layer, producing an undercut; directionally depositing a cladding layer, leaving portions of the island material layer under the hard mask layer exposed; etching the exposed portions of the island material layer; and removing the remaining portions of the sacrificial layer, hard mask, and portions of the cladding layer on top of the hard mask; thereby producing nanoscale apertures comprising islands of island material within the nanoscale apertures surrounded by regions of transparent substrate surface.

In some embodiments the hard mask, and portions of the cladding layer on top of the hard mask are removed before the etching of the exposed portions of the island material layer, and the removal of the remaining portions of the sacrificial layer is performed after this step.

In some aspects, the invention provides a method for forming a nanoscale aperture having an nanoscale island of island material within it comprising: providing a stack of materials comprising from bottom to top, a transparent substrate, a sacrificial layer, and a hard mask; patterning and etching the hard mask layer to form a plurality of nanoscale features; etching the sacrificial layer to expose regions of the island material layer such that the etch of the sacrificial layer extends underneath the hard mask layer, producing an undercut; depositing an isolation layer whereby the isolation layer extends under the undercut region to the remaining portions of sacrificial layer under the undercut; directionally depositing a cladding layer, leaving portions of the isolation layer under the hard mask layer exposed; and removing the remaining portions of the sacrificial layer, hard mask, and portions of the isolation layer and the cladding layer on top of the hard mask; thereby producing nanoscale apertures comprising islands of substrate surface within the nanoscale apertures surrounded by regions of isolation layer.

In some aspects, the invention provides a method of producing an array of nanoscale apertures wherein greater that 30 percent of the nanoscale apertures comprises a single active molecule of interest comprising: producing an array of nanoscale apertures, the nanoscale apertures having walls and a base, the base having an island of island material, the island surrounded by isolation material; selectively binding the molecule of interest to the island whereby a fraction of the nanoscale apertures comprise a single molecule of interest. In some embodiments the size of the island and the size of the molecule of interest are selected such that when one molecule of interest binds to the island, it sterically blocks the binding of a second molecule to the island.

In some embodiments the island has a substantially circular lateral profile with a diameter of from about 2 nm to about 20 nm. In some embodiments the single molecule of interest comprises a single active molecule of interest. In some embodiments the single molecule of interest comprises an enzyme. In some embodiments the single molecule of interest comprises a polymerase enzyme, a template nucleic acid, or a primer. In some embodiments the island comprises material deposited within the nanoscale apertures.

In some embodiments the isolation material comprises the surface of the substrate. In some embodiments the island comprises a portion of the surface of the substrate. In some embodiments the isolation material comprises aluminum oxide. In some embodiments the isolation material comprises a silane. In some embodiments the silane comprises a silane-polyethylene glycol (silane-PEG).

The invention provides methods and compositions for controlling loading of single analyte molecules, such as nucleic acid templates, into reaction/observation volumes (such as the wells of a ZMW array). These methods and compositions are useful for increasing the throughput and efficiency of single molecule analysis systems. Basic approaches that are provided include: creating a single binding site for an analyte in the reaction or observation volume; removing excess binding sites via catalytic or secondary binding methods, adjusting the size or charge of the analyte; packaging or binding the analyte molecules within (or on) a particle, where a single such particle fits into the relevant observation volume (due to size or charge of the particle and/or observation volume); using non-diffusion limited loading; controllably loading the analyte (e.g., using micro fluidic or optical or electrical control); sizing or selecting charges in the observation volumes (e.g., the sizes of ZMWs in an array) to control which analytes will fit (spatially or electrostatically) into which array wells or well regions, iterative loading of analyte, e.g., by masking active sites between loading cycles, enriching the activity of the analytes that are loaded, using self-assembling nucleic acids to sterically control loading, using ribosome display to control loading and provide a base for analyte screening, adjusting the size of the reaction/observation volume; and others. The methods and compositions provide for the possibility of completely loading single molecule array reaction sites (instead of about 30% of such sites as occurs in the prior art using random "Poisson limited" loading methods) with single analytes, and also provides for control over size, charge and/or location features for both array wells and analyte locations.

Accordingly, the invention provides methods of distributing a population of molecules of interest or target molecules into a plurality of size confined reaction or observation regions. Molecules of interest can optionally comprise nucleic acids, proteins, and/or enzyme-substrate complexes. The methods include providing a structure (e.g., a ZMW, planar substrate, small well array, or the like) comprising the size-confined reaction or observation regions wherein each of the regions has an island of functional material and providing the population of molecules of interest to be distributed into the confined regions. The methods include adjusting the size of the confined reaction or observation regions by adding at least one sizing moiety to individual reaction or observation regions, such that a selected number of target molecules will fit into the resulting size-adjusted regions. Alternately, the size of individual target molecules of the population can be adjusted by linking at least one sizing moiety to individual target molecules, creating a population of sizing moiety-linked target molecules (e.g., particles linked to an analyte of interest). The sizing moieties are of sufficient size, relative to the size-confined reaction or observation regions, so that only a selected number of sizing moieties, e.g., less than 10 moieties, less than 5 moieties, or, e.g., about one moiety, will fit into the size confined regions. The sizing moieties can fit partly or fully into the region; the relevant determinant is delivery of the target molecule portion to the region. The methods thus include loading the target molecules into the regions, whereby a selected number of target molecules can fit into each region, thus distributing the population of target molecules into the plurality of size confined regions. The methods optionally include selecting the sizing moiety or configuring the reaction region, so that a single sizing moiety will fit into the reaction region. Optionally, the sizing moieties or target molecules can comprise a selected charge, which can be used to electrostatically control loading.

The size-confined regions can individually comprise or be present within an individual well of an array, or in a size-delimited substrate, e.g., a selected portion of a planar or other substrate. For example, the size-confined regions can be present in an optically confined region, e.g., a reaction or observation region of a ZMW. Preferably, the population of target molecules is distributed into size-confined regions (e.g., wells) of an array such that at least 38% of the size-confined regions (e.g., wells) of the array are occupied by only one target molecule. For example, the population of target molecules can be distributed into wells of the array such that at least 50%, or at least 75% or more of the wells of the array are occupied by only one target molecule. Optionally, the methods include selecting the sizing moiety or configuring the reaction region, in such a manner that a single sizing moiety will fit into the size-confined reaction region.

A sizing moiety is a moiety of a selected size that can be used to regulate entry of linked target molecules or linked island forming particles into a size-confined region. Typically, the sizing moieties can comprise one or more particles, e.g., beads, metal particles, or nanoparticles, or one or more polymers (e.g., one or more PEG, cross-linked polymers, dendritic polymers, hyperbranched polymers, starred polymers, dendrimers, dendrons, nucleic acids, DNA origami, polypeptides, or the like). In addition, sizing moieties can comprise a polysaccharide, polyethylene glycol (PEG), poly (lactic acid), poly(glycolic) acid, hyaluronic acid, a ribosome, a ribosome polypeptide, or a type 1 collagen protein. In certain embodiments, sizing moieties can comprise viral capsids, e.g., viral capsids that include at least one recombinant or modified coat protein that comprises polymerase activity. In some embodiments, the sizing moities comprise particles of island material surrounded by a coating, for example, by a polymer which can subsequently be removed to deposit an island of island material within the size-confined region. For example, the particle of island material can be a particle of metal or semiconductor that is surrounded by a polymeric coating so as to deposit one sizing moiety into one size-confined region. The polymer can subsequently be degraded with a plasma, resulting in the deposition of the island particle into a central portion of the size-confined region.

The methods provided by the invention can be used to distribute polymerases to size-confined regions. In such embodiments, the sizing moieties can comprise polymer tails linked to each polymerase, and protease cleavage sites can be located between each polymer tail and polymerase, e.g., to permit the release of the polymerase from the sizing moiety. Optionally, the sizing moieties can be ribosomes that each bind a target polymerase during translation. A target population of polymerases in size-confined regions can optionally constitute a ribosome display library of polymerase variants, such that different polymerase variants are present in different regions. Relatedly, the methods can further comprise screening the polymerases of the ribosome display library for one or more properties of interest. The polymerases of the library can optionally reverse transcribe or sequence a nucleic acid encoding the polymerase. This nucleic acid is at least initially associated with a ribosome that is at least initially associated with the polymerase.

In one embodiment, the sizing moieties expand upon binding to structures in the confined regions to prevent additional sizing moieties from entering into the confined regions. This can occur, e.g., where the sizing moiety is initially approximately spherical, and flattens upon entry into or binding within or proximal to the sizing region. Desirably, the sizing moieties and confined regions are sized such that a single sizing moiety can fit into each of the plurality of confined regions, thereby providing for delivery of a single target molecule into the size delimited region. As noted, individual sizing moieties can fit fully or only partially into each of the plurality of confined regions to provide the target molecule (e.g., nucleic acid or protein), into the region. In one convenient embodiment, the sizing moiety linked target molecules are flowed into the reaction/observation regions.

Sizing moieties can optionally form a size-exclusion matrix that prevents more than a single target Molecule from entering an analysis or fixation region of the size-confined reaction or observation region. The fixation region can comprise, e.g., functionalized silicon, gold or aluminum; the functionalized region can comprise, e.g., one or more binding partners; and the sizing moieties or analytes can comprise, e.g., one or more cognate binding partners. In one useful embodiment, the sizing moieties can be removed from the size confined reaction or observation region subsequent to loading of the single target molecule.

Individual sizing moieties can be covalently or non-covalently linked to walls of the confined regions or to individual target molecules. For example, the target molecules to which the sizing moieties are linked can be polymerase enzyme molecules that comprise a reactive or binding moiety, such as a SNAP tag, that permits attachment of the sizing moiety. Individual sizing moieties optionally can be cleaved from the individual target molecules or walls after the loading step by exposing an individual sizing moiety-target molecule complex to, e.g., a change in pH, a change in salt conditions, addition of a competition moiety, light, heat, a protease, an endonuclease, an exonuclease, and/or an electromagnetic field.

A plurality of size confined reaction or observation regions can optionally include a subset of regions that are pre-loaded with a single polymerase molecule, a subset of regions members that lack polymerase molecules, and sizing moiety-linked target molecules that comprise one or more template nucleic acids. In such embodiments, the methods can include initiating copying or transcription of the template nucleic acid by the polymerase, followed by loading of additional polymerase protein molecules into at least some of the members that lacked polymerase, resulting in secondarily loaded confined observation or reaction regions comprising secondary polymerase proteins. A secondary loading step can then be performed in which additional sizing moiety linked template nucleic acids are loaded into the secondarily loaded regions.

In a related aspect, the invention comprises methods of distributing a population of nucleic acid or other analyte molecules into a plurality of wells in a small well array. The methods include providing a small well array that comprises the plurality of wells and providing a population of particles that bind or package a population of analyte molecules. In these methods, the plurality of wells in the array are individually configured to receive a single particle from the population of particles, such that delivering the population of particles into the plurality of wells distributes the population of analyte molecules to the plurality of wells.

In one example, the invention provides methods of distributing a population of analyte molecules (e.g., nucleic acids, polymerase molecules, etc.) to a plurality of wells in a zero-mode waveguide (ZMW). The methods include providing a zero-mode waveguide that comprises a plurality of wells, providing a population of particles that can bind or package a population of analyte molecules, and delivering the population of particles to which the nucleic acids are bound or packaged into wells of the ZMW. Optionally, the plurality of wells can be individually configured to each receive a single particle. Optionally, the particles can be sized such that a single particle can fit in each of the plurality of wells.

In the embodiments, particles used to distribute nucleic acids or other analytes to the wells in a size delimited region, ZMW, or other array can optionally comprise viral capsids, e.g., capsids derived from a lambda phage, a phi29 phage, a T7 phage, a T4 phage, a virus of the Myoviridae family, a virus of the Siphoviridae family, a virus of the Podoviridae family, or a capsid that comprises at least one recombinant coat protein that comprises polymerase activity. Particles can optionally comprise a self-assembled DNA structure. For example, self-assembled DNA structures used in the methods can optionally comprise long DNAs, DNAs comprising a large radius of gyration, plasmids, circular DNAs, DNA origami structures, DNA grids, DNA grids comprising a gold particles, DNA dodecahedrons, Sierpinski triangles, DNA octahedrons, or polycatenated DNA scaffolds. In certain embodiments, the DNA structure can comprise a single polymerase binding site and/or can be covalently bound to a single polymerase molecule. Alternatively, the particles can individually comprise one or more nanostructure, bead, polymer, polysaccharide, polyethylene glycol (PEG), poly (lactic acid), poly(glycolic) acid, hyaluronic acid, type 1 collagen, ribosome, ribosome polypeptide, or polypeptide. Such particles can be cleaved from the nucleic acid molecules after delivery by exposing individual particle-nucleic acid complexes to any one or more of the conditions described previously. These approaches can be used, for example to deliver a particle of island material into a well where the particle is smaller than the lateral dimensions of the well and is delivered in such a manner that there is a region of exposed surface around the particle, such that the particle acts as an island.

Delivering the population of particles to e.g., to the wells of a ZMW or a small well array, includes distributing the particles such that at, e.g., least 38% of the wells, at least 50% or the wells, at least 75% of the wells, or, most preferably, at least 95% or more of the wells of the ZMW or small well array are occupied by one particle. The methods can further include sequencing the nucleic acid molecules by performing a sequencing reaction in the wells of the ZMW or small well array.

Compositions provided by the invention include analysis devices comprising an array of analytes that are arranged in the array by one or more phase determining features in such a manner that single molecules of the analyte are present in each of at least 40% of the analysis regions of the array. The analyte molecules can optionally be, e.g., at least 20 nm, at least 30 nm, at least 40 nm, or, preferably, at least 50 nm apart on the array. The phase determining features that arrange the analyte molecules can optionally include an arrangement of wells in the array, an arrangement of ZMWs in the array, a mask that permits access by the analyte to the analysis regions, an arrangement of particles in the array, the particles comprising binding moieties that bind to the analyte, and/or an arrangement of binding sites located at least 50 nm apart in the array, which binding sites are configured to bind individual analyte molecules.

Other compositions that are provided by the invention include a zero-mode waveguide (ZMW) or other small well array that comprises a plurality of wells, and a population of particles that bind or package a population of analyte that has been distributed into the plurality of wells. Optionally, the wells of the ZMW or other array (or an observation/reaction region in the ZMWs) can be configured to receive only one particle. Optionally, at least 38% of the wells, at 50% of the wells, at least 75% of the wells, or, most preferably, 95% or more of the wells of the ZMW or small well arrays of the invention can be occupied by one particle. The particles in the wells can optionally comprise one or more bead, nanostructure, or polypeptide, or viral capsid recited above. The particles can be provided such that the particles comprise both an island forming portion and a portion that does not become part of the island, for example in the form of a micelle. The particles are provided to the wells in the controlled way described herein, an the portion that does not become part of the island is removed in order to deposit the particle within the well. In some cases the analyte such as the polymerase enzyme is present on the island material during deposition, in other cases, the analyte such as the polymerase enzyme is attached to the island material after the particle is deposited into the well.

The invention also provides methods of producing a non-random distribution of single analyte molecules in analysis regions of an array, e.g., analysis regions within wells of a small well array. These methods include selectively distributing the analyte molecules into the analysis regions, such that at least 38% of the regions are occupied by one analyte molecule, fewer than 5% of the analysis regions (and, preferably, fewer than 1%, or even fewer than 0.1%) are occupied by more than one analyte molecule, and fewer than 62% of the analysis regions are occupied by fewer than one analyte molecule. The non-random distribution of nucleic acid molecules in the analysis regions can optionally be a non-Poisson distribution. In one useful embodiment, these methods can be used to distribute nucleic acid and/or polymerase molecules to target wells of a zero-mode waveguide (ZMW). The nucleic acid molecules in the target wells can optionally be sequenced.

Non-random analyte molecule distribution to analysis regions in an array can optionally include configuring selected analysis regions of the array to receive, at most, one particle, and delivering a population of particles that comprise, bind, or package the analyte molecules into the target regions, in a manner such that at least 38% of the regions are occupied by the particles. The population of particles can optionally be delivered to the analysis regions of the array such that at least 50%, at least 75%, or, most desirably, at least 95% or more of the analysis regions are occupied by the particles.

Producing a non-random distribution of analyte molecules in analysis regions of an array or ZMW can optionally include distributing a nucleic acid mask into individual analysis regions that comprise oligonucleotide positioning features that position the nucleic acid mask within the individual analysis regions. An individual analysis region can be exposed through a small hole in a selected region of the mask, the oligonucleotide positioning features can hybridize to the mask, and a single analyte molecule can bind the analysis region through the small hole in the mask. Optionally, the mask can be removed or degraded subsequent to binding of the analyte molecule.

Optionally, the non-random distribution of analyte molecules in the analysis regions can be produced by providing a population of nucleic acid particles individually comprising a single binding moiety and providing a population of adaptors that can individually bind to the binding moiety and to an individual the analysis region. Desirably, the nucleic acid particles are large enough relative to the analysis regions to effectively inhibit binding of more than one particle to one analysis region. Binding the population of nucleic acid particles and the adaptors to the analysis regions can be followed by the cleavage of the nucleic acid particles, which cleavage exposes individual single adaptors bound to within the analysis regions. Analyte molecules can then be advantageously bound to single adaptors.

Optionally, individual nanostructures comprising a binding site for the analyte molecule can be fabricated in or distributed into the analysis region in such a manner that binding of more than a single analyte molecule to the nanostructure is sterically inhibited. For example, a nanostructure can optionally be a nanoparticle that is small enough to inhibit binding of more than a single analyte molecule comprising a polymerase to the nanoparticle. The nano structure can optionally be deposited electrochemically, and growth of the nanostructure can be terminated while the nanostructure is small enough to sterically inhibit binding of more than a single analyte molecule to the nanoparticle.

Fabricating nanostructures in analysis regions can optionally comprise forming a monolayer of small nanoparticles in individual analysis regions and coalescing the small nanoparticles in the individual regions into larger nanoparticles in the regions, such that at least one larger nanoparticle is formed in at least one individual region. Optionally, an array of small wells comprising the analysis regions can be provided, and a micelle comprising a nanostructure of interest, which micelle is sized such that it centers the nanostructure within the well, can be distributed to each of the small wells. For example, the micelle can comprise a coating of polymeric material having a small (island forming) nanoparticle in its core. After deposition of the micelles into the wells, the polymeric material can be removed to deposit the nanoparticle into the well, for example in the central region of the well, thus forming an island of material in the well. The nanoparticle island thus formed can comprise an analysis region. The analyte can be specifically bound to the nanoparticle, attached either before or after the deposition of the particle into the well. Alternately, fabricating the nanostructure in the region can include dispersing particles in a photopolymerizable monomer, delivering the resulting monomer-particle solution to the region, photopolymerizing the monomer in the region, and fixing the particle in the region.

Optionally, single nanostructure islands or nanostructure dots that bind a single analyte molecule can be deposited into single analysis regions of an array. The analysis regions of the array can optionally comprise regions proximal to the dots or islands, or they can comprise ZMWs that are formed around the dots or islands. Optionally, an island or dot can comprise Au—S—$(CH_2)_x(C_2H_4O)_y$-biotin, the analyte molecule can comprises avidin-polymerase, and the analyte can be bound to the island or dot through the binding of the Avidin moiety to the biotin moiety. Fabricating a nanostructure island or dot can include cleaning a fused silica or synthetic quartz wafer, applying a resist adhesion promoter to the wafer, spin coating the wafer with a positive tone chemically amplified resist, baking the positive tone chemically amplified resist, performing e-beam lithography on the wafer to form a pattern in the resist, baking the resist after lithography, developing the resist, performing photoresist descum, depositing metal to form dots or islands, and deresisting the wafer.

A nanostructure island or dot is can optionally be fabricated in place using, e.g., electron beam lithography, nanoimprint pattern formation, high-aspect physical vapor deposition or chemical vapor deposition. For example, a substrate comprising a base material, a cladding material, an aspect buffer control layer, and a resist can be provided, an array of wells, the wells extending through the resist, cladding material and aspect buffer control layer to the base layer can be formed, and a masking film over the array can be formed to produce a mask that partially extends across the tops of the wells of the array, restricting access to a small diameter region in the bottom of each of the wells. Nanostructures in the small diameter regions can be deposited, and the mask can subsequently be removed, thereby providing an array of wells that each comprise a single nanostructure that is configured to attach a single analyte molecule in the well's analysis region. In other embodiments, a substrate comprising a base material, a cladding material, an aspect buffer control layer, and a resist can be provided, and an array of wells that extending through the resist, cladding material and aspect buffer control layer to the base layer can be formed. A masking film can then be deposited over the array, thereby producing a mask that partially extends across the tops of the wells of the array, restricting access to a small diameter region in the bottom of each of the wells. Subsequently, nanostructures can be deposited in the small diameter regions, and the walls of the wells can be removed to provide an array of nanostructure configured to attach a single analyte molecule in an analysis region of the array.

Alternatively, forming or depositing a nanostructure island or nanostructure dot that binds a single analyte molecule in an analysis regions of the array can include permitting an imperfect self-assembled monolayer (SAM) to form in wells of a small well array or on the surface of a substrate. An island can then be formed through a selected region of the SAM via atomic layer deposition. Other methods to form a nanostructure in an analysis region include forming a multi-film stack on a substrate, forming a well array through multiple layers of the multi-film stack, depositing a spacer film over the well array, planarizing the multi-film stack to remove at least one layer of the multi-film stack between wells, and removing portions of the spacer film within the wells, thereby producing nanostructures within the wells of the array. Optionally, a multi-film stack can be formed on a substrate, an array of structures can be formed through multiple layers of the multi-film stack, and a spacer film can be deposited over the array. The multi-film stack can then be planarized to remove at least one layer of the multi-film stack, and the spacer film can be etched to produce nanostructures on the substrate.

Methods to produce a non-random distribution of single analyte molecules in analysis regions of an array can optionally include fabricating a nanostructure array, wherein the analyte molecules are subsequently bound to the nanostructures, and subsequently forming the analysis regions to encompass the nanostructures of the array. Fabricating the nanostructure array can optionally include forming an array of metal nanostructures on a substrate. For example, a cladding material can be applied to the array, the cladding can be spin coated with a resist layer, and regions of the resist proximal to the metal nanostructures can be removed. The cladding in these regions can then be etched to expose the metal nanostructures, thereby forming an array of small wells in the cladding.

In other embodiments, single analyte molecules can be distributed to analysis regions in a non-random manner by fabricating a small well array, wherein the floor of the wells comprises a substrate material and walls of the wells comprise a cladding material that is different from the substrate material. The wells can then be coated with an analyte binding material, cladding material can be etched to increase the diameter of the wells, leaving the analyte binding material approximately in the center and on the bottom of individual wells in a patch of analyte binding material that is sufficiently small in size to inhibit binding of more than one analyte molecule to the patch of binding material. Analyte molecules can then be bound to the patch of analyte binding material in the wells.

Alternatively, a solvent comprising a low concentration of an analyte binding moiety that binds to the analyte and to analysis regions can be deposited into an analysis region. The solvent can be evaporated to deposit the analyte binding moiety in the analysis region, and the analyte can then be bound to the analyte moiety in the analysis region to produce a non-random distribution of analyte molecules. In one useful example, the analysis region can be a zero mode waveguide (ZMW) and evaporation of the solvent can deposit the analyte binding moiety in approximately the center of the ZMW.

Other methods of selectively distributing analyte molecules can optionally include applying a coating in a solvent to the analysis regions, evaporating the solvent while rotating the array, thereby leaving a portion in the center of the analysis region that is free of the coating. A single analyte molecule can then be bound to the center of the analysis region. Desirably, the uncoated center portion is small enough that binding of more than 1 selected analyte molecule to the center region is sterically inhibited.

Single analyte molecule can optionally be controllably transported into each of the analysis regions to produce a non-random distribution of analyte molecules in analysis regions. For example, this can include fluidly coupling a plurality of analysis regions of the array to at least one source of the analyte through at least one microscale channel and controlling the flow between the source and the analysis region with a control module that gates or regulates flow from the source to the analysis region. A control module can optionally be operably connected to a sensor configured to sense flow of an analyte molecules from the channel into the analysis region. Optionally, the analyte can be optically labeled, the sensor can comprise an optical sensor, and the controller can controls a valve between the source and the analysis region. Optionally, the sensor can comprise a conductivity sensor that detects passage of an analyte molecule past the sensor, and each analyte molecule can be coupled to a dielectric nanoparticle. Single analyte molecules can optionally be transported into individual analysis regions using a gradient optical force, or an electrical trap. Controllably transporting an analyte molecule into an analysis region can optionally preventing the binding of additional analyte molecules in the analysis regions.

Optionally, selectively distributing single analyte molecules into analysis regions can include controllably transporting single that comprise a binding site for the analyte molecule into each of the analysis regions. Steric inhibition can thereby prevent the binding of more than 1 analyte molecule to the particle. Alternately, the particle can comprise a single analyte molecule binding site. A single particle can be controllably transported into an analysis region via, e.g., a fluidic control, an optical gradient, and/or an electrical trap. An array of optical traps with a trap to trap spacing that matches spacing between analysis regions can optionally be used to controllably transport single to analysis regions. A plurality of single particles can optionally be transported in parallel to a plurality of analysis regions.

Analyte molecules can optionally be activity enriched before distributing them into the analysis regions. For example, the analyte molecules can be or comprise polymerase molecules. Activity enrichment of the polymerase can include binding polymerase molecules to a template nucleic acid, separating unbound polymerase molecules from the template-bound polymerases, thereby removing polymerase molecules that lack template binding activity from polymerase molecules that comprise template binding activity. The template bound polymerase molecules that can copy the template can also dissociate from the template, thereby forming released active polymerase molecules. (Polymerase molecules that lack template copying activity remain bound to the template.) Alternately, activity enrichment of the polymerase molecules can include removing polymerase molecules that lack template binding activity from polymerase molecules that comprise template binding activity, as described above, and permitting template bound polymerase molecules to copy the template. Based upon production of an at least partial copy of the template, the active polymerase molecules can be separated from inactive molecules. The actively enriched analyte molecules can be selectively reacted with the island or nanodot within a confined region in order to attach a single active analyte molecule within the optical confinement.

The invention also provides a particle bound to a polymerase-template complex. Any of the features noted above can apply to this embodiment, e.g., the particle can be a magnetic bead. For example, the magnetic bead can include an affinity moiety such as a Ni-NTA moiety bound to the polymerase template complex, e.g., where the polymerase comprises a cognate affinity moiety such as a recombinant polyhistidine sequence. The polymerase can further comprises features that permit cleavage from the bead, such as a recombinant endonuclease site proximal to the polyhistidine sequence.

In some cases, an array of single molecules of interest can be produced on a surface by having an array of nanodots on a transparent surface where the array of nanodots is arranged such that each of the single molecules of interest can be observed independently. The nanodots are of a size whereby only a single molecule of interest, e.g. an enzyme is bound to a single nanodot. The dots can be arranged into an array of nanodots on the substrate by a variety of methods including using a core-shell polymer in which the core comprises the nanodot material or a precursor to the nanodot material. Once the array of nanodots is deposited, the nanodots can be selectively functionalized with a coupling agent for the molecule of interest. The nandots can then be exposed to the molecules of interest, for example where the nanodots and the molecules of interest are sized such that where one molecule of interest binds to the nanodot, the binding of a second molecule of interest to that nanodot will be sterically prohibited. The array of nanodots can be observed using a total internal reflection fluorescent (TIRF) system, or with a system wherein there are a plurality of beamlets, each directed to a nanodot on the array.

In some aspects the invention provides a method for forming an island of functionality comprising: a) providing a substrate comprising a cladding layer on top of a transparent layer, having a plurality of nanoscale apertures extending through the cladding layer to the transparent layer, such that the apertures each comprise walls and a base; b) depositing a core-shell particle that is sized to fit within the plurality of apertures onto the substrate such that generally only one core-shell particle is deposited per aperture; c) removing the shell from the core-shell particle whereby the core of the core-shell particle is deposited on the base of the aperture; d) depositing an isolation layer over the substrate; and e) removing the core of the core-shell particle to produce an island of exposed substrate surrounded by isolation layer.

In some embodiments the invention further comprises, between steps (a) and (b), depositing a coating layer that covers both the cladding layer and exposed portions of the transparent layer, whereby after step (e) an island of coating layer is exposed. In some embodiments, the core-shell particle comprises a metal or metal oxide core and an outer organic layer. In some embodiments, the invention further comprises, after step (e), selectively functionalizing the island of exposed substrate.

Combinations of these embodiments are expressly a feature of the invention. Kits comprising the components noted herein are also a feature of the invention.

DETAILED DESCRIPTION

Figure 1:
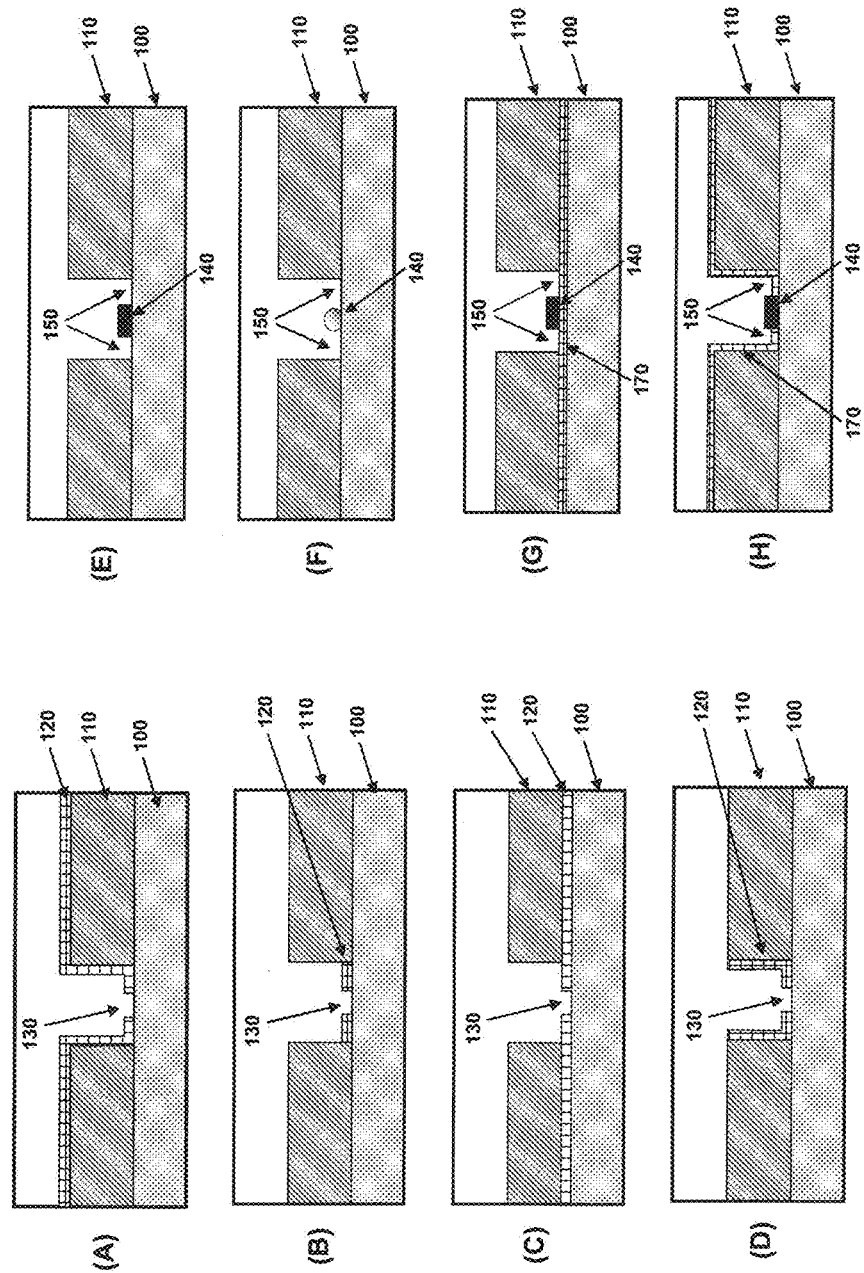
FIG. 1 (A)-(H) shows various structures having islands of substrate ((A)-(D)), or islands of island material ((E)-(H)) in confined regions within an array.

The invention provides methods and compositions that provide for non-random distribution of target molecules (e.g., analytes such as template nucleic acids and/or relevant enzymes such as polymerases) into small reaction/observation volume arrays, such as ZMW arrays. These methods and compositions can achieve much higher analyte, reagent, and/or reactant loading efficiencies than are typically observed using Poisson-limited random molecule loading methods. The approaches generally involve creating a single binding site for the analyte in the reaction/observation volume, e.g., by placing or fabricating a nanostructure in the reaction/observation volume, or by selectively forming analyte binding sites in the reaction/observation volume. In addition, the methods of the invention can include delivering the analyte molecules using a sizing, e.g., particle, delivery system to provide single molecule loading for each molecule type of interest.

These basic approaches can also be used in combination, e.g., the size and distribution of observation volumes can be selected in conjunction with a particle delivery system to control delivery and retention of particle-bound moieties of interest; binding sites can be used to bind to sizing moieties, iterative loading can be practiced in combination with any of the other approaches, etc.

The invention is generally directed to improving the loading of single molecule analytes into arrays of confined regions by providing an "island" within the confined region onto which the single analyte molecule can be attached. An island is a portion of the confined region which has a different physical or chemical property from that of the portion of the confined region surrounding the island. Where the confined region comprises walls, the island is generally separated from the walls. The island can be surrounded by what is referred to herein as an isolation region, or a region of isolation material. The isolation material has one or more different physical and/or chemical properties from the island material. The different properties of the island material from the portion surrounding it within the confined region can be used to selectively couple molecules of interest to the island region. The dimensions of the island material can be produced such that only a single molecule becomes attached to the island, for example where the first attached single molecule prevents the binding of a second. By controlling the binding characteristics of the surfaces and the size of the island, the relative number of confined regions having only a single analyte molecule attached to them can be increased above the levels that can be obtained by random attachment.

The islands of the invention are generally on a substrate, which is typically a transparent substrate. In some cases, the island comprises a layer of material or a particle of material that is disposed on top of the substrate. In other cases, the island of material comprises a portion of the substrate that is not coated, but which is surrounded by a region of isolation material. In either case, the island can be selectively functionalized so as to be disposed to bind to a single analyte molecule of interest. In some cases, the island can comprise a particle of island material that is deposited within the confined region. In this case, it is possible that the analyte molecule is coupled to the particle prior to its being deposited onto the confined region.

FIG. 1 shows some embodiments of structures of the invention comprising islands within confined regions which can comprise observation/reaction volumes. Each of FIGS. 1(A) to (H) show a single nanoscale aperture extending through a cladding layer 110 to a transparent substrate 100. The observation/reaction volumes are generally present as an array of observation/reaction volumes, for example comprising hundreds to millions of apertures on a substrate. The observation/reaction volumes can comprise, for example, zero mode waveguides. The substrate is generally transparent to allow for the illumination of the apertures from below and to allow detection from below of light emitted from the apertures. The cladding is generally a thin layer of an opaque material, for example a metal or metal oxide. The cladding can have a thickness from about 30 nm to about 200 nm. In FIGS. 1(A)-(D), each of the apertures has an island of exposed substrate 130 surrounded by isolation material. The isolation material is a material that is different than that of the transparent substrate, allowing for selectively functionalizing the exposed transparent substrate. The transparent substrate can be selectively functionalized, for example using silane chemistry, to provide one or more coupling groups in order to attach an analyte molecule of interest. In some cases, the array of confined regions will include a layer of material between the transparent substrate 100 and the cladding 110. Where such a layer is present, the island can comprise a portion of the exposed intermediate layer rather that an exposed portion of the substrate. The isolation material can comprise an inorganic material, such as a metal oxide, e.g. alumina, or the isolation material can comprise an organic material such as a polymer, e.g. polyethylene glycol.

FIG. 1(A) shows a nanoscale aperture having a layer of isolation material that surrounds the island of substrate surface and also extends over the walls of the aperture and the top surface of the cladding layer. This type of structure can be advantageous in limiting the number of types of surfaces which are to be functionalized. This type of structure can be formed using deposition and etching processes as described in more detail herein. FIG. 1(B) shows an aperture in which the island of exposed surface is surrounded by isolation material on the base of the aperture, and the isolation material does not substantially extend up the walls of the apertures or over the top of the cladding. In FIG. 1(C) the isolation layer 120 is disposed between the substrate and the cladding. In FIG. 1(D) the isolation layer 120 surrounds the island and extends over the walls of the aperture, but does not extend over the top of the cladding.

FIGS. 1(E) to (H) show exemplary nanoscale apertures having islands 140 of material disposed within them. The island material can be any suitable material. The island material is generally different from the material comprising the substrate, allowing for selective coupling of an analyte molecule of interest to the island. The nanoscale aperture extends through the cladding layer 110 to the transparent substrate layer 100. The island 140 is surrounded by a region 150, having different chemical or physical properties from the island material. In some embodiments the island 140 comprises a metal, metal oxide, or semiconductor material. In FIG. 1(E) the island 140 within the aperture is surrounded by regions 150 of exposed surface. In FIG. 1(F), the island 140 comprises a particle 140 that has been deposited within the aperture leaving regions of the substrate 150 surrounding it within the aperture. This particle can be deposited with a method that results in a large fraction of apertures having only one particle per well, for example by depositing a particle having a core and a shell, where the particle is sized such that generally only one particle is deposited in each well, and removing the shell to deposit the core into the aperture such that the core of the particle comprises the island as used herein. FIG. 1(G) shows an aperture having an island that is deposited onto a layer 170 that is disposed on top of the transparent substrate 100, between the transparent substrate 100 and the cladding layer 110. The layer 170 can be a transparent material, or if it is thin, e.g. less than 10 nm, it can constitute a metal or semiconductor material which would not be transparent at higher thicknesses. The layer 170 can be used, for example, for access to different chemical properties than those of the transparent substrate surface. FIG. 1(H) shows an aperture in which a layer 170 of material surrounds the island 140, and extends over the walls of the aperture and over the top of the cladding layer. As shown, the layer 170 does not extend under the island 140. In some embodiments, the layer 170 may extend under the island 140. The layer 170 can comprise an inorganic or an organic material. It can comprise, for example, a metal, metal oxide, semiconductor, or polymer.

The structures shown in Figures (A) to (H) represent examples of island structures within confined regions. There are other structures that can be used. It is understood that there are various combinations and variations of the embodiments shown which are also of use The choice of which of the structures or which combination of structures from FIGS. 1(A) to (H) is used can depend on the effectiveness of the process used to form the structures, the types of materials which are amenable to the process, and the performance of the fabricated array.

The confined regions generally have at least one lateral dimension on the nanometer scale. The confined regions can comprise nanoscale apertures with a lateral dimension between 20 nm and 300 nm, or between 40 nm and 150 nm. The lateral dimensions of the islands are smaller than those of the nanoscale aperture such that the islands generally do not come into contact with the walls of the apertures. In some cases the lateral dimensions of the islands are about 60% to about 2% or from about 40% to about 10% of the corresponding lateral dimension of the nanoscale aperture. In some embodiments the nanoscale aperture and the island each have a substantially circular lateral profile. The nanoscale aperture have a cylindrical aperture with a diameter between about 90 nm to about 150 nm, and the island can have a circular profile with a diameter of between about 5 nm and about 30 nm. The lateral profile of the apertures can be substantially circular, but need not be. In some cases, the lateral profile of the aperture is oval, elliptical, triangular, square, rectangular, polygonal, or in the form of a long strip.

The arrays of confined regions comprising islands can be disposed on the tops of microarray structures for improved optical performance within an analytical system. Such micromirror structures are described, for example, in U.S. patent application Ser. No. 12/567,526, filed Sep. 25, 2009, the disclosure of which is incorporated herein by reference for all purposes. In some cases, the confined regions have walls comprising a layer of a non-reflective material as described in U.S. Patent Application 61/241,700, filed Sep. 11, 2009, the disclosure of which is incorporated herein by reference for all purposes.

Having the analytical molecule of interest attached to the island can have a number of advantages. One advantage being that only a small number or only a single molecule or complex will be within the aperture. Another advantage is that the analyte molecule, when attached to the island is held within the center of the aperture which can be advantageous with respect to detection. For example, molecules disposed toward the center of a ZMW can experience higher illumination intensities than molecules right next to the wall of a ZMW. In addition, the emission from a molecule near the center of a ZMW can be transmitted more effectively than molecules at the walls of a ZMW. In some cases, the attachment of the analyte molecule to a particle or nanostructure that comprises the island can result in the enhancement of emission from a label associated with the analyte. This type of enhancement can be obtained, for example, where the material comprising the island comprises a metal. See, for example, U.S. Patent Application 2008/0241866 filed Mar. 27, 2008. In some cases, this type of enhancement is desired. In other cases, it is desired not to have this type of enhancement, for example to enhance reproducibility. The methods of the invention allow the user to produce a system with the level of enhancement desired for the particular application.

The arrays and methods of the invention utilize arrays of nanoscale apertures, such as ZMWs. These structures can comprise a transparent substrate upon which a cladding is deposited. The cladding has an array of nanoscale apertures extending through it to the transparent substrate. The cladding is generally from about 5 nm to about 300 nm, or about 40 nm to about 150 nm thick. The cladding can comprise a metal such as aluminum, gold, chromium, copper, titanium, silver or platinum.

In the discussions herein, an "analyte" molecule or molecule of interest is a molecule analyzed in the system of interest, e.g., a template nucleic acid, primer, enzyme, or the like. For example, in a sequencing reaction, the nucleic acid template can be an analyte molecule, as the properties of the template (e.g., its sequence) are under investigation. However, the template is not the only analyte in a sequencing reaction. For example, properties of the sequencing primers are also detected in the system (e.g., primer binding/polymerase initiation activity, as evidenced by a productive sequencing reaction) as are properties of the enzyme (e.g., polymerase activity, also as evidenced by a productive sequencing reaction). For convenience, unless context dictates otherwise, the relevant analyte under consideration can be any moiety active to the analysis, e.g., a substrate, template, primer, enzyme or the like. Typically the analysis that is being performed is an optical analysis, and the analysis is performed by observing labels within the aperture. In some cases, the analysis includes observing the interaction of a bound species with another species in solution. In order to do so, the species in solution may be the species that is labeled, and the analysis involves observing the label when the two species are bound together, forming a bound complex. Here, while the bound species may not be labeled, we may still refer to it as a bound analyte as we are analyzing its activity in observing its binding. In many cases, the analyte comprises a complex such as an enzyme-template complex or an enzyme-template-primer complex or an enzyme-template-primer-substrate complex. Where a complex is observed as part of the analysis, the attachment of any of the components of the complex comprises the attachment of an analyte.

Figure 2:
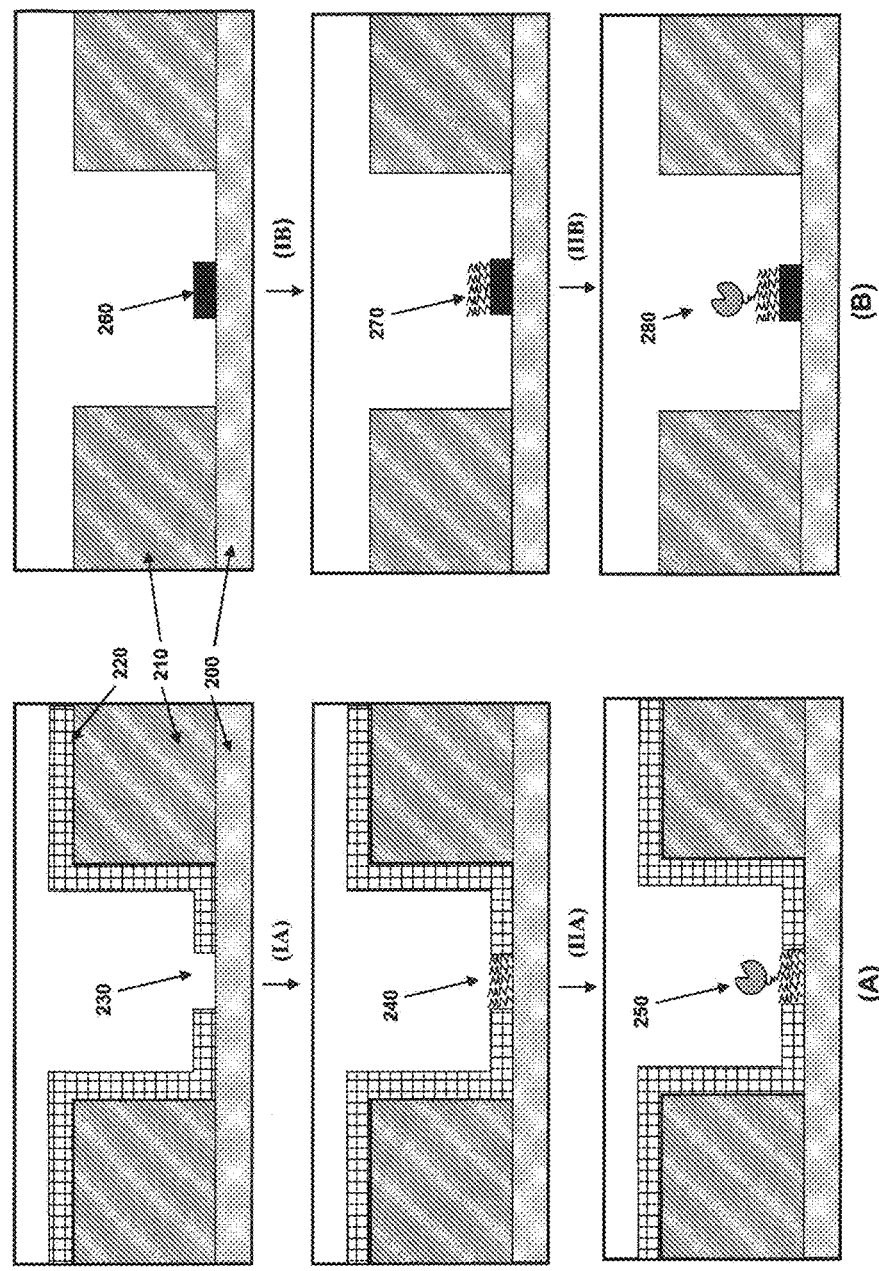
FIG. 2(A) is a schematic representation of a process of the invention for coupling a single active molecule to an island of substrate within a confined region.
FIG. 2(B) shows the coupling of a single active molecule to an island of island material within a confined region.

FIG. 2 shows schematic illustrations of methods of the invention for attaching a single analyte molecule such as an enzyme within a nanoscale aperture using either (A) an island of substrate 230 surrounded by isolation layer 220, or (B) an island of material surrounded by substrate surface or isolation layer. In FIG. 2(A) a nanoscale aperture extends through cladding 210 to substrate 200. An island 230 of exposed substrate surface within the aperture is surrounded by a layer of isolation material 220. In step (IA) the substrate surface is selectively reacted with coupling agent 240. The coupling agent is selected to react primarily or exclusively with the substrate and to not react with the isolation layer. In step (IIA) a single analyte molecule 250 is attached to the island by reacting with the coupling agent 240. A higher than random distribution of single analyte molecules within apertures can be obtained, for example where the size of the patch of coupling agent on the island is such that the binding of a first analyte molecule to the island sterically prevents the binding of a second analyte molecule. In some cases the analyte molecule comprises an enzyme such as a polymerase enzyme. In some cases, the enzyme is provided in the form of an enzyme complex, such as a polymerase-template or polymerase-primer-template complex. In some cases, the analyte molecule such as the enzyme can have sizing moieties as described herein attached to it to raise its effective size, to increase the steric prevention of the binding of a second analyte molecule. Subsequent or prior to the binding of the molecule of interest, the isolation layer can be coated with a passivation layer to prevent inadvertent binding to that surface. The passivation layer can comprise polyethylene glycol.

In some cases, the transparent substrate 200 can comprise a silica based material such as fused silica, and the cladding material can comprise a metal layer such as aluminum. The isolation layer 220 can comprise either an inorganic material such as alumina or an organic material such as polyethylene glycol (PEG). The fused silica island can be selectively functionalized, for example using a silane coupling agent. The silane coupling agent will react preferentially with the silica surface, and will generally not react with the alumina or PEG surface. The analyte molecule is provides with a functionality that reacts specifically with the coupling agent on the island. For example, in some cases, the silane coupling agent comprises a silane-PEG-biotin, the analyte molecule comprises an enzyme such as a polymerase comprising biotin, and the enzyme is bound to the island through an intermediate avidin or streptavidin.

FIG. 2(B) shows an analogous process for binding a single analyte molecule 280 to an island of material 260 surrounded by substrate surface within the aperture. In step (IB) the island material is selectively reacted with coupling agent 270. The coupling agent is selected to react primarily or exclusively with the island material and to not react with the substrate surface. While shown here as unmodified, it will be understood that the surface of the substrate and the surfaces of the cladding will in some cases be treated with other layers in order to modify their chemical or physical properties. For example, in some cases, one or both of these surfaces may be coated with PEG to prevent unwanted binding. In step (JIB) a single analyte molecule is attached to the island by reacting with the coupling agent 270. A higher than random distribution of single analyte molecules within apertures can be obtained, for example where the size of the patch of coupling agent on the island is such that the binding of a first analyte molecule to the island sterically prevents the binding of a second analyte molecule. In some cases the analyte molecule comprises an enzyme such as a polymerase enzyme. In some cases, the enzyme is provided in the form of an enzyme complex, such as a polymerase-template or polymerase-primer-template complex. In some cases, the analyte molecule such as the enzyme can have sizing moieties as described herein attached to it to raise its effective size, to increase the steric prevention of the binding of a second analyte molecule.

In some embodiments, for example, the island material comprises a metal such as gold. The gold can be selectively reacted with a coupling agent, for example using thiol terminated reagents such as a thiol-alkane-PEG-biotin. The analyte molecule can comprise, for example, an enzyme such as a polymerase having attached to it a biotin moiety. The analyte can then be selectively reacted with the coupling agent on the island with an intermediate avidin or streptavidin.

The selective immobilization illustrated in steps (IA) and (IB) of FIG. 2 can be carried out as is known in the art by exploiting the chemical differences between the material comprising the surface of the island and the material surrounding the island. The differences in charge, polarity, hydrogen bonding, and reactivity of functional groups on the surfaces can be used for obtaining selective immobilization. Approaches to selective immobilization are described, for example, in U.S. patent application Ser. No. 11/731,748 filed Mar. 29, 2007, the disclosure of which is included herein by reference in its entirety for all purposes.

Particle/sizing moiety regulated delivery of analytes such as nucleic acids and/or enzymes such as polymerases to small volume arrays such as arrays of ZMWs can be accomplished by associating the nucleic acids or enzymes with the particles or other sized (and/or charged) moieties, e.g., by packaging the nucleic acids or enzymes using the particles (e.g., where the particles at issue comprise viral capsids), or by binding or otherwise linking the nucleic acids or enzymes to the particles. Any of a variety of particle types can be used, including viral particles, proteins, protein complexes, beads, metallic particles, large molecules (e.g., PEG) and the like. Each of these approaches is discussed in more detail below.

Placing or Fabricating Analyte Binding Nanostructures into Array Features

One general approach of the invention to increasing the loading efficiency of single molecule analytes into an array of reaction regions includes creating a single binding site for the analyte within each of the reaction regions, and then completely loading the single binding sites. The single binding site can be, for example, an island of material deposited or formed within a confined region, or an island of exposed substrate surface surrounded by an isolation region. Washing steps can be used to remove unbound analytes from the array, resulting in essentially complete loading of analytes on the binding sites, leading to one analyte being loaded per reaction site. This yields an array of reaction sites, such as an array of ZMWs, having most or all of the reaction regions of the array loaded with a single molecule of the analyte of interest. While this approach is particularly well-suited to loading of single analyte molecules into reaction regions, it will be appreciated that the same approach can be used to load more than 1 molecule, e.g., by creating more than one binding site per reaction region, and loading the multiple binding sites.

In one example implementation, this aspect of the invention provides a general method for fabricating zero-mode waveguide (ZMW) or other reaction region structures with a single nanostructure (e.g., a nanodot) inside the ZMW hole/reaction region or other array feature. The diameter of a typical ZMW hole is between, e.g., about 50 nm and about 120 nm, which is large enough to accommodate several copies of most reaction analytes (polymerase molecules, templates, etc.). The nanostructure in the hole or other reaction region, etc., is fabricated to be small enough, relative to the analyte, that only a single molecule of the analyte can bind to the nanostructure (alternately, the nanostructure can include just a single binding site for the analyte). Example nanostructures include islands comprising metal nanodots, metallic nanostructure, dielectric nanostructures, or semiconductor material nanostructures that can be functionalized using standard chemistries to display binding moieties that can be bound by an analyte of interest. The nanostructures can also comprise islands having one chemical composition surrounded by regions having another chemical composition, where the island is capable of being selectively functionalized for the attachment of a single molecule or single complex of interest.

For example, the presence of a functionalized metal nanodot or other nanostructure provides a binding site e.g., on the bottom surface or other target portion of a reaction region (e.g., a ZMW), etc., that is sufficiently limited in area such that a single analyte (e.g., polymerase or other enzyme) can be immobilized, e.g., for DNA sequencing or other single-molecule reactions. For example, noble metals, such as gold, silver, or platinum can be functionalized to form metal thiolates using alkanethiols, forming a binding site for the analyte.

Either the nanoparticles, the analytes, or both are optionally functionalized in order to attach the analytes to the nanoparticles. Similarly, an intermediate binding moiety such as a biotin or avidin can be functionalized. For instance, nucleotides or polypeptides herein are optionally functionalized with alkanethiols to facilitate attachment to noble metals such as gold. For example, nucleotides can be functionalized at their 3'-termini or 5'-termini (e.g., to attach them to gold nanoparticles). See Whitesides, *Proceedings of the Robert A. Welch Foundation 39th Conference On Chemical Research Nanophase Chemistry*, Houston, Tex., pages 109-121 (1995) and Mucic, et al. *Chem. Commun.*, 1966, 555-557. Functionalization via alkanethiol attachment strategies is also optionally used to attach analytes to other metal, semiconductor or magnetic nanoparticles. Additional or alternate functional groups used in attaching analytes to nanoparticles can include, e.g., phosphorothioate groups (see, e.g., U.S. Pat. No. 5,472,881), substituted alkylsiloxanes (see, e.g. Burwell, *Chemical Technology*, 1974, 4:370-377, Matteucci, *J. Am. Chem. Soc.*, 1981, 103:3185-3191 (1981), and Grabar, et al., *Anal. Chem.*, 67:735-743). Nucleotides terminated with a 5' thionucleoside or a 3' thionucleoside can be used for attaching nucleotides/oligonucleotides to solid nanoparticles. See also Nuzzo, et al., *J. Am. Chem. Soc.*, 1987, 109:2358; Allara, *Langmuir*, 1985, 1:45; Allara, *Colloid Interface Sci.*, 1974, 49:410-421; Iter, *The Chemistry Of Silica*, Chapter 6, (Wiley 1979); Timmons, *J. Phys. Chem.*, 1965, 69:984-990; and Soriaga, *J. Am. Chem. Soc.*, 1982, 104:3937. Further guidance regarding combinations of nanoparticles and analytes can be found in, e.g., U.S. Pat. No. 6,979,729 to Sperling et al.; U.S. Pat. No. 6,387,626 to Shi et al.; and U.S. Pat. No. 6,136,962 to Shi et al.; and U.S. Pat. No. 7,208,587 to Mirkin et al. Additional details regarding suitable linking chemistries is found herein.

One example of the overall strategy is to fabricate a nanostructure array comprising Au nanostructures, followed by immobilization of a polymerase, template nucleic acid, or other analyte using typical functionalization and binding chemistries, e.g., to provide an analyte bound nanostructure, e.g., AuS—$(CH_2)_x(CH_2H_4O)_y$-Biotin-Avidin-Analyte (e.g., AuS—$(CH_2)_x(CH_2H_4O)_y$-Biotin-Avidin-Polymerase). The incorporation of metal nanostructures in ZMW holes or other reaction regions is not limited by Poisson statistics; thus, binding of the polymerase or other analyte to the nanostructures provides high yields of reaction regions in an array that each have a single active polymerase or other analyte.

Overall fabrication approaches to making the array of nanostructures in reaction regions optionally use available process technology from semiconductor fabrication, photomasking, and MEMS manufacturing. For example, an array of metal nanodots can be formed using e-beam lithography, Deep Ultra-Violet (DUV) lithography, nanoimprint, or other available lithography process, or other available patterning techniques. Available commercial e-beam equipment and photoresist technology are sufficient to meet the size and positioning resolution requirements, e.g. a Vistec VB300 Electron Beam System and positive-tone chemically-amplified resist. The steps can include, e.g.: (1.) surface cleaning of a fused silica or synthetic quartz wafer, e.g., using conventional industry standard RCA protocols (also known as "standard cleaning" or SC-1), or using Piranha cleaning (also known as "piranha etching," e.g., using a mixture of sulfuric acid and hydrogen peroxide), see also, Rastegar "Cleaning of Clean Quartz Plates," Surface preparation and Wafer Cleaning Workshop, Austin, April 2005; (2) application of a resist adhesion promoter such as, but not limited to, hexamethyldisilazane; (3) spin coating and post-application bake of a positive-tone. chemically-amplified resist; (4) e-beam lithography; (5) post-exposure bake; (6) photoresist development; (7) photoresist descum; (8) metal deposition; and (9) deresisting. For additional details in wafer fabrication and lithography, see, e.g., Eynon and Wu (2005) *Pho-* tomask Fabrication Technology, New York; McGraw-Hill; Alexe (Editor), Gösele (Editor), Gösele (Author) (2004) Wafer Bonding Springer ISBN-10: 3540210490; Luo (2004) Integrated Modeling of Chemical Mechanical Planarization for Sub-Micron IC Fabrication: from Particle Scale to Feature, Die and Wafer Scales ISBN-10: 354022369X; Madou (2002) Fundamentals of Microfabrication: The Science of Miniaturization, Second Edition CRC; and Atherton (1995) Wafer Fabrication: Factory Performance and Analysis (The Springer International Series in Engineering and Computer Science) Springer ISBN-10: 0792396197. Microfabrication approaches which can be used to form the structures described herein are described in copending U.S. patent application Ser. Nos. 12/567,526 filed Sep. 25, 2009, and 61/312,953 filed Mar. 11, 2010, each of which are incorporated herein by reference in their entirety for all purposes.

If metals such as Au, which generally have poor adhesion to SiO, are used, then an adhesion promoter can be deposited using vapor phase deposition. One example for an adhesion promoter for Au on SiO is octadecyltrichlorosilane (Szunerits et al. (2006) 22:10716-10722). Other alternatives to improve adhesion include using an interfacial metal such as Cr or Ti during the metallization step. Further details regarding available deposition methods, including vapor and thin film deposition, can be found, e.g., in Harsha (2006) Principles of Vapor Deposition of Thin Films, Elsevier Science ISBN-10: 008044699X; Dobkin and Zuraw (2003) Principles of Chemical Vapor Deposition ISBN-10: 1402012489; Mahan (2000) Physical Vapor Deposition of Thin Films ISBN-10: 0471330019; Mattox (1998) Handbook of Physical Vapor Deposition (PVD) Processing (Materials Science and Process Technology Series) Noyes Publications ISBN-10: 0815514220; and Smith (1995) Thin-Film Deposition: Principles and Practice McGraw-Hill Professional ISBN-10: 0070585024.

In some aspects of the invention, microfabrication methods can be used to produce islands of material within confined regions or nanoscale apertures by first: providing a substrate having a cladding layer in which the cladding layer has an array of nanoscale apertures extending through it to the substrate. Onto the cladding is deposited a sacrificial layer. The sacrificial layer is generally deposited in a conformal manner to coat the walls of the apertures. After the sacrificial layer is deposited, the sacrificial layer is directionally etched. The directional etching is carried out in a manner that results in the removal of the region of the sacrificial layer in the center of the nanoscale aperture, without the removal of the sacrificial layer from the walls. An island material is then deposited over the substrate such that a portion of the island material becomes deposited in the central region of the aperture that was opened with the directional etching. The island material is then etched such that a portion of the island material within the aperture remains, and whereby portions of the sacrificial layer remaining are exposed. The sacrificial layer is then removed, leaving at least a portion of the island material within the aperture. This process produces an island of material within a nanoscale aperture to which analyte molecules of interest can be attached.

Figure 3:
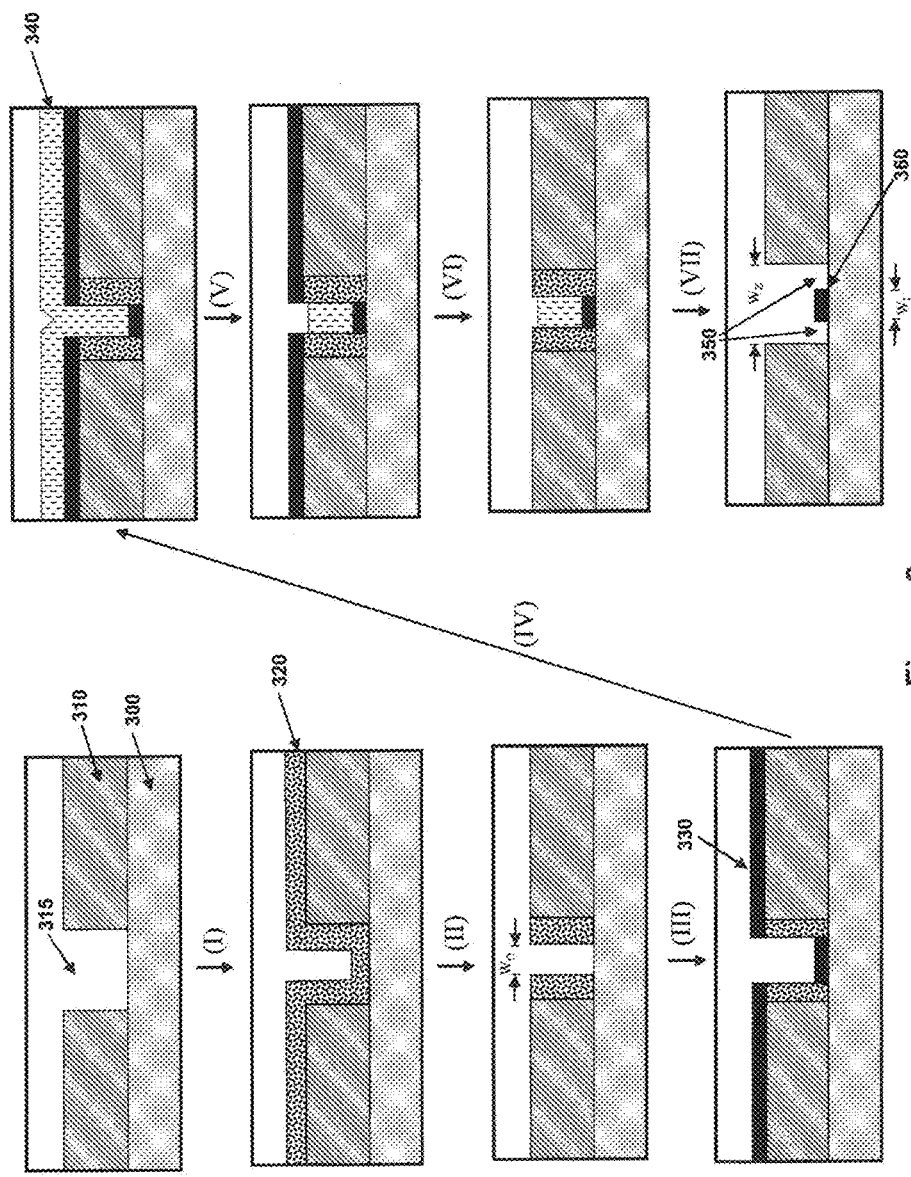
FIG. 3 is a schematic representation of a method for fowling an island of material within a confined region using two sacrificial layers.

FIG. 3 provides an exemplary method for using a sacrificial spacer to produce a nanoscale apertures having islands disposed within them. A transparent substrate 300 having a cladding layer on its surface is provided. The cladding layer has an array of nanoscale apertures 315 extending through the cladding 310 to the substrate 300. The substrate 300 is generally a transparent substrate. In some cases, the transparent substrate comprises a silica based material such as fused silica (FuSi) or quartz. The cladding layer can be, for example a metal such as aluminum. In step (I) a first sacrificial layer 320 is deposited onto the cladding layer. The deposition is carried out in a conformal manner whereby the walls of the aperture become coated with sacrificial material. The sacrificial material can comprise, for example, silicon, germanium, or silicon/germanium. The first sacrificial layer can be deposited, for example using chemical vapor deposition methods such as PECVD or LPCVD depending on the material deposited. In step (II) the sacrificial layer is etched in a directional manner. The directional etching results generally in the removal of the sacrificial material from the horizontal surfaces, leaving the sacrificial material coated on the walls of the apertures. The deposition of the first sacrificial 320 spacer is carried out in order to leave an opening with a cross sectional dimension of $W_O$. The control of the size of this opening will in turn control the size of the dimensions of the island. The thickness of the first sacrificial spacer ($T_S$) on the walls of the aperture is related to the size of the opening by $W_O = W_Z - 2T_S$, where $W_Z$ is the size of the opening of the aperture. The size of the island, represented by $W_I$, is on the order of $W_O$, as the sacrificial layer acts as a mask during the etch step used to produce the island. In this step, it can be important to remove all of the first sacrificial material from the region within the aperture in order to ensure good adhesion of the island material.

In step (III) an island material 330 is deposited, for example in a directional manner. A portion of the island material coats the exposed portions of the surface in the regions between the sacrificial layers coating the walls of the apertures. The island material can comprise, for example, a metal such as gold, silver, platinum, nickel, or copper. The directional deposition of the island material can be carried out, for example using electron beam or thermal evaporation. In some cases, a seed layer, for example of titanium or chromium is used to improve the adhesion of the island material. A second sacrificial material 340 is deposited in step (IV) in a manner whereby a portion of the second sacrificial material is deposited on top of the portion of island material within the aperture. The second sacrificial material can comprise silicon, germanium or silicon/geimanium. In some embodiments, the first sacrificial layer and second sacrificial layer comprise the same materials.

In step (V) an etching step is performed to remove the second sacrificial layer and expose the portions of the island material that is on top of the cladding layer. The etching is carried out in a manner whereby the portion of the second sacrificial material within the aperture remains covering the portion of the island material within the aperture. In step (VI) an etching step is used to remove the portion of the island material over the cladding layer. Where the island material comprises gold, a wet etching step is typically employed. In this step, the remaining portion of second sacrificial material covers the island material within the aperture, preventing it from being etched and removed. In step (VII) the first sacrificial layer and the second sacrificial layer are removed. This removal is carried out in a manner that is selective to the cladding, the island material, and the substrate, such that these materials are not substantially removed in the process. Removal of the sacrificial spacer layers can be carried out, for example, using hydrogen peroxide or xenon difluoride. This process results in the formation of an island of material 360 within the nanoscale aperture. The island material is spaced within the aperture away from the walls. Surrounding the island 360 is a region of substrate surface 350. The regions of substrate surface typically have different enough chemical and physical properties to provide for the specific functionalization of the island material.

Figure 4:
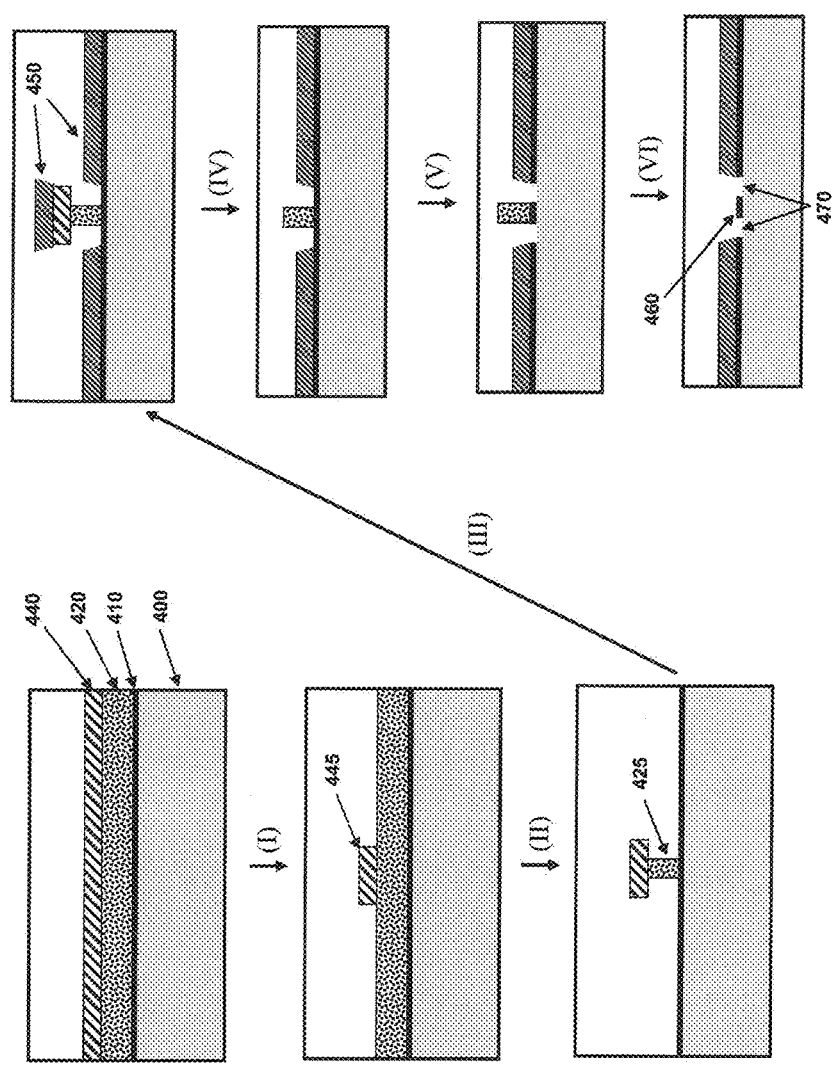
FIG. 4 is a schematic illustration showing the formation of an island of material within a confined region using a sacrificial pillar.

FIG. 4 provides an alternative method for microfabricating an island of material within an aperture which utilizes a gap-shirking approach using an undercut. This method is amenable to high-throughput processing. The undercut procedure provides a self-aligned approach to forming the island. A dry undercut procedure can be employed to provide reliable undercut etching. In FIG. 4, first, a substrate 400 is provided having three layers on its top surface; first a layer of island material 410, then a layer of sacrificial material 420, followed by a layer of hard mask 440. The hard mask layer can be, for example, PECVD oxide or nitride, or any of the materials described herein for use as a sacrificial layer. For this process, the hard mask layer must be different than the sacrificial layer below it in order to allow for preferential etching. In step (I), the hard mask layer is patterned and etched to form hard-mask structures 445 that will be used to define the nanoscale apertures. Next, in step (II) the sacrificial layer is etched, using the hard mask layer as a mask, to remove the portions of the sacrificial material not covered by the hard mask, and to undercut the hard mask to form pillars 425. The etching process can be carried out in two steps, one to remove the bulk of the sacrificial material, and the second to perform the undercut, for example where the second step uses a dry etch undercut.

In step (III), a cladding layer 450 is deposited. The cladding layer can be a metal such as aluminum or an aluminum alloy. Step IV shows an optional step in which the hard mask layer is removed. Where the hard mask is PECVD oxide, a Pad etch, for example, can be used. Pad etch solutions are available from Ashland Chemical Company. Step (IV) is included, for example where it is desired to use an ion milling step in (V) where the presence of the hard mask could cause occlusion. In step (V), the island material layer is etched using the sacrificial pillar and the cladding layer as a mask. The island material can comprise a metal such as gold. The etch of the island material can be carried out, for example, using ion milling or with a wet etch. In step (VI) the sacrificial pillar is removed, for examples using hydrogen peroxide, $XeF_2$, or $SF_6$. Where step (IV) is not used, in some cases, the removal of both the pillar and the hard mask can be accomplished by etching away the sacrificial pillar. The process results in the formation of an array of apertures in the cladding layer, each aperture having an island 460 of island material surrounded by exposed substrate 470.

In a number of embodiments of the invention, sacrificial layers are deployed in a microfabrication process. The material that makes up the sacrificial layer depends on the manner that it is utilized and the other materials it is used with in the process. The suitable sacrificial material will generally have the property whereby it can be selectively etched and removed without the etching and removal of other materials exposed in that part of the process such as the cladding, substrate, island material, etc. In some cases, the sacrificial material comprises a semiconductor material such as silicon, germanium, or silicon/germanium. It can be, for example, amorphous silicon, amorphous silicon carbide, or poly-germanium. In other cases, it can comprise other semiconductors such as III-V semiconductors including Ga—As. In some cases, the sacrificial layer can comprise a metal such as titanium or tungsten. The sacrificial layer can also comprise a dielectric material such as a metal oxide or nitride including silicon oxide, silicon nitride, or titanium nitride. The sacrificial layer is generally an inorganic material, but in some cases, it can comprise an organic material such as parylene, photoresist, or another organic polymer. In some cases a sacrificial layer can comprise a spin-on-glass, which are generally not preferred due to high temperature curing requirements, but which could be used in some circumstances, for example where higher curing temperatures can be tolerated. The sacrificial layer can be coated in the manner suitable for the material and structure of the desired deposition. Suitable methods include, for example chemical vapor deposition (CVD), atomic layer deposition (ALD), sputtering, evaporation, electroplating, electroless plating, molecular beam epitaxy (MBE), or spin coating. In some cases, such as where the sacrificial layer acts to coat the walls of apertures to provide an opening for the formation of an island, the coating of the sacrificial layer is performed conformally, but not in a manner that will produce a planarized coating. In some cases, such as where a second sacrificial layer is coated to protect an island material from being etched in a subsequent step, the sacrificial layer can be deposited so as to form a planarized coating.

Figure 5A:
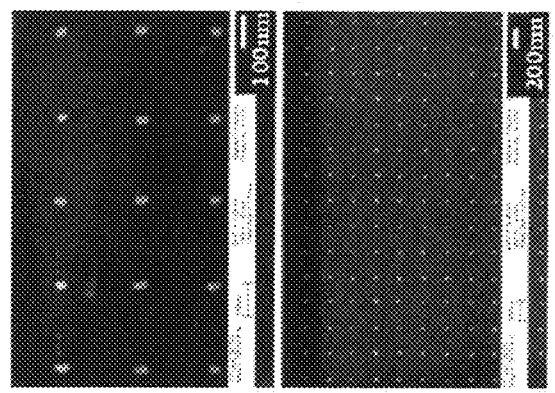
FIG. 5, panel A provides a photomicrograph of an array fabricated using a Vistec VB300 Electron Beam System and positive-tone chemically-amplified resist. Panel B shows a schematic and photomicrograph illustrating formation of a Ge nano-wire with a Au—Ge tip. Panel C shows a flow chart and schematic for formation of a ZMW nanostructure over a nanodot array.
Figure 5B:
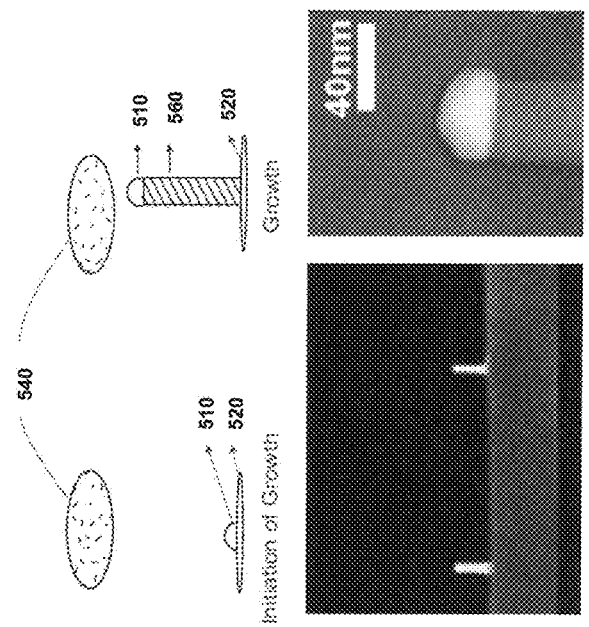

For the case when the nanodot is gold, its diameter and height in a ZMW or other reaction region can be modulated and its adhesion to the substrate, if no adhesion promoter is used, can be achieved by exposing the array to germane ($GeH_4$), e.g., as in Adhikari et al. (2007) *J. Appl. Phys.* 102:94311-94316. Au catalyzes decomposition of germane by the reaction $GeH_4$->Ge $2H_2$ (Woodruff et al. (2007) *Nano Lett.* 7:1.637-1642) resulting in a Ge nano-wire with a Au—Ge tip as shown in FIGS. 5A and 5B. As shown in FIG. 5B, solid/liquid nanoparticle 510 is situated upon solid flat substrate 520 in the presence of $GeH_4$ vapor 540, resulting in the formation of solid Ge nano-wire 560 with a tip composed of solid/liquid nanoparticle 510. The diameter and length of the nano-wire can be controlled by modulating process conditions and exposure time to $GeH_4$. Prior to exposing the array to GeH4, the substrate can be exposed to high temperatures (ca. 300 degrees C.) to form spheres on the substrate. Anchoring the nanodot, e.g., through a germanium nano-wire to the substrate, is not generally required for this class of embodiments.

Figure 5C:
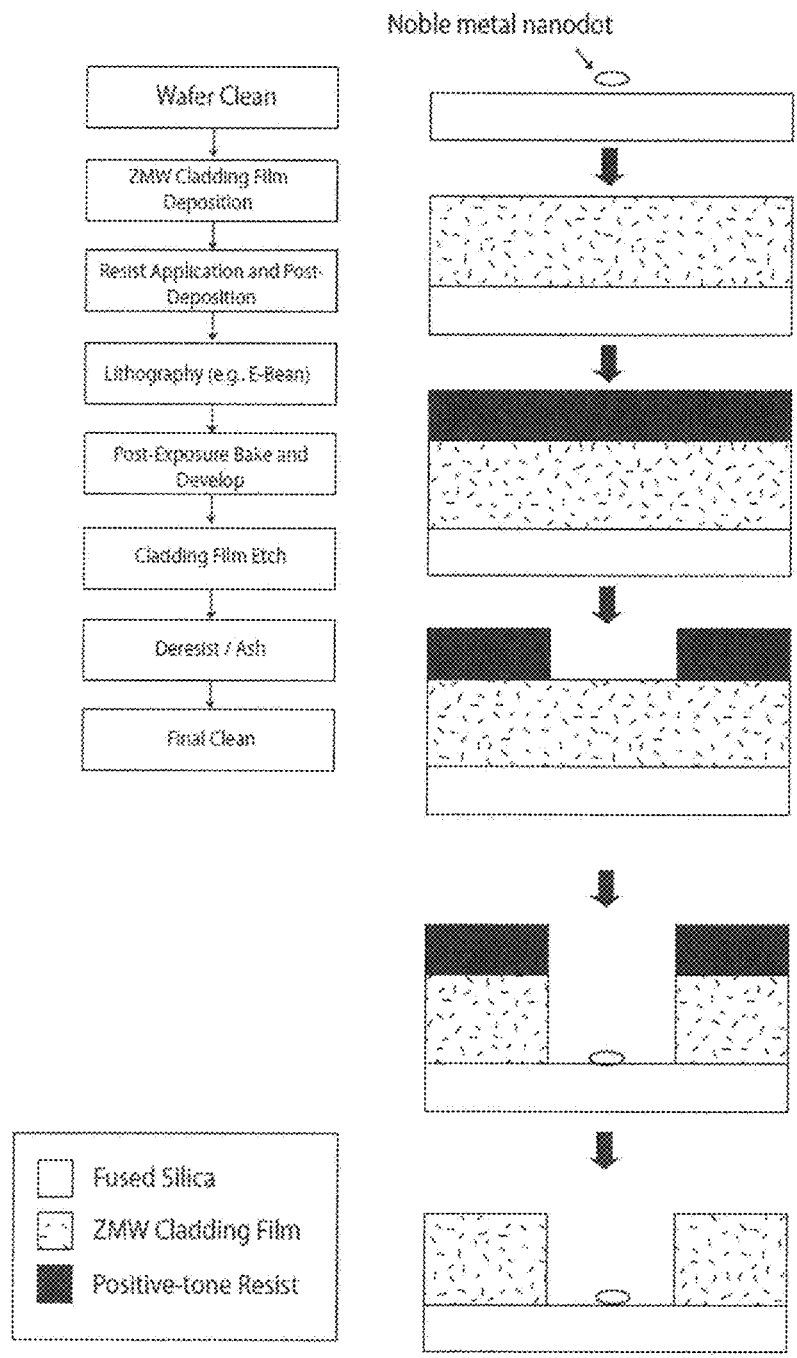

The ZMW or other reaction region array structure can be formed using available fabrication methods, e.g., forming the reaction region array over the completed nanostructure array, such that the nanostructures reside in a desired portion of each of the reaction regions (e.g., in the bottom of ZMW holes in a ZMW array). An example process for producing an array of ZMWs or other suitable reaction regions can include: (1) surface cleaning, with the cleaning process type and recipe being based on, e.g., the effectiveness of the deresisting process used at the end of the production of the nano structure array, adhesion strength of the nanodots to the substrate and accumulated adventitious contamination due to time between steps and any storage environment; (2) deposition of a ZMW (or other array feature) cladding metal such as aluminum; (3) spin coating and post-application bake of a positive-tone, chemically-amplified resist; (4) e-beam or other suitable lithography; (5) post-exposure bake; (6) photoresist development; (7) photoresist descum; (8) etch of the cladding metal; and (9) deresisting and final cleaning. For an example illustration of this process, see the flow diagram and illustration shown in FIG. 5C. Image placement or registration errors of current electron beam technology is sufficiently to provide accurate patterning of the zero mode waveguide structures over the nanodot array, e.g., over a 6-inch square area. See, e.g., Saitou (2005) "E-Beam Mask Writers," in *Handbook of Photomask Manufacturing Technology*, edited by S. Rizvi, New York, Taylor and Francis. For example, the VB300 Electron Beam Lithography System from Vistec can achieve less than a 10 nm error in patterning. Available e-beam systems used for photomask fabrication such as those from Nuflare Technology and JEOL have comparable image placement areas over a 6-inch square area Eynon and Wu (2005) *Photomask Fabrication Technology*, New York, McGraw-Hill; *International Technology Roadmap for Semiconductors*, 2007 Edition. The cladding metal lithography technique for patterning steps, nanodot metal adhesion promoters, and substrate material can be varied with still accomplishing the main objective of the invention. Additional details on example implementations that provide nanostructures in array regions such as ZMWs are provided below.

Fabricating or Immobilizing Nanoparticles in Arrays

One feature of the invention is the ability to achieve efficient high density loading of single molecules of interest into analysis regions of an array. One class of embodiments achieves higher levels of single (or other desired number) occupancy loading into arrays or reaction regions such as ZMWs by fabricating a nanoparticle deposited or fabricated in the reaction region. The nanoparticle is small enough that only one (or another desired number) analyte can bind to the particle. While this approach is particularly useful for loading single molecules of analyte, e.g., for single molecule reactions (e.g., SMS), it will be appreciated that a desired number of particles can be deposited or fabricated in selected reaction regions to achieve specific loading of any desired specific number of analytes.

The nanoparticle(s) optionally include(s) an easily functionalized surface to permit attachment of an analyte of interest. For example, the particle(s) can comprise gold, which can be functionalized with standard thiol chemistries. Individual particles are small enough that only a desired number of analytes (e.g., one) can bind to the particle, due to steric interactions of the analyte at the surface of the particle.

Figure 6:
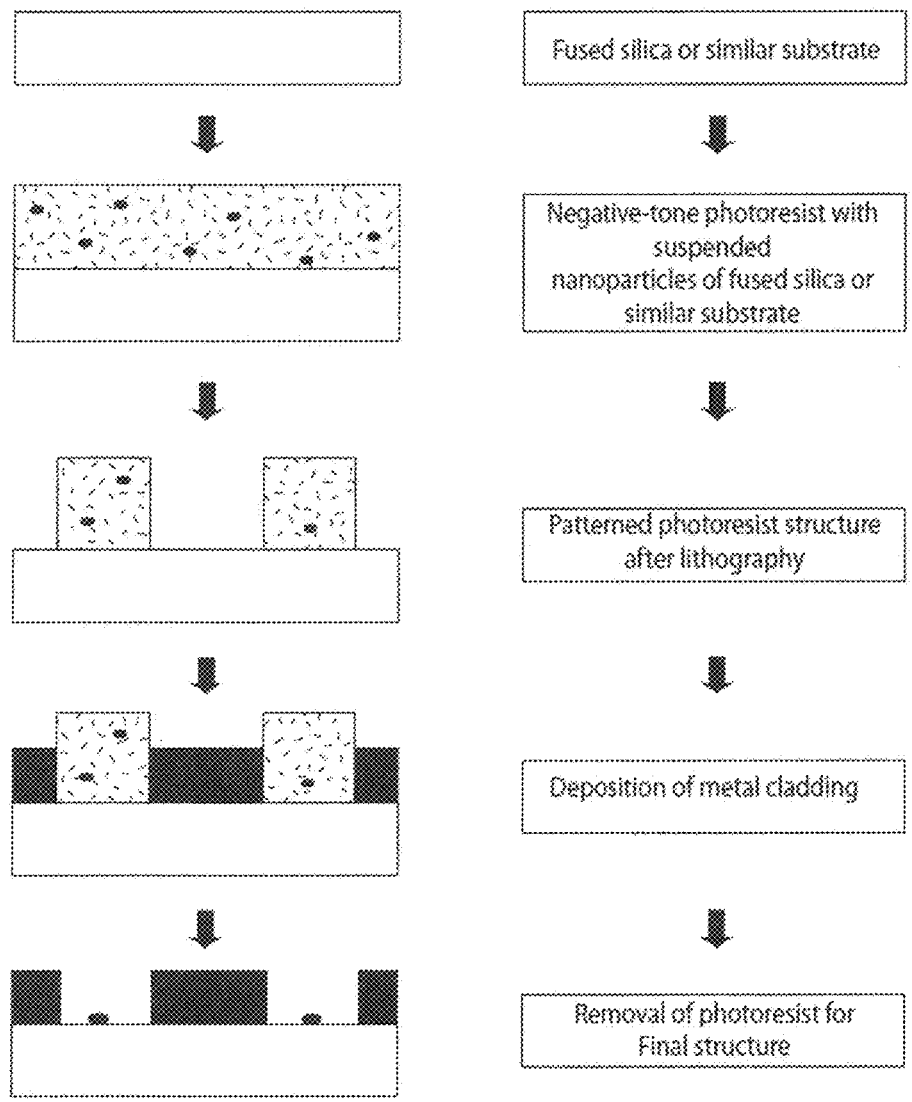
FIG. 6 provides a flow chart and schematic illustration of a process for immobilization of nanoparticles in a ZMW.

For example, immobilization of, e.g., metal nanoparticles can be performed by the process shown in FIG. 6. Metal nanoparticles of sizes ranging from 10-100 nm are suspended in a negative-tone photoresist and spun onto a fused silica, synthetic quartz, borosilicate, or a similar substrate. Using e-beam lithography, Deep Ultra-Violet (DUV) lithography, nanoimprint, or other available lithography process, pillars ranging from 50-200 nm in diameter are fabricated. A metal cladding film such as aluminum is deposited onto the structure. The photoresist is removed in a manner that leaves a single nanoparticle in each newly-created hole (e.g., comprising a reaction region (e.g., a ZMW). Biotin/avidin/polymerase can be tethered on the nanoparticle (e.g., Au—S—$(CH_2)_x(C_2H_4O)_y$-biotin). The nanoparticles are small enough that only one polymerase or other analyte of interest can fit on them in the reaction region, effectively limiting the number of analytes in the reaction region. During subsequent analyte loading processes, the analyte can be loaded into the reaction regions at relatively high concentrations, effectively loading most or all of the particles with an analyte molecule. Excess analyte is washed from the reaction region, resulting in a high percentage of the reaction regions acquiring a single polymerase or other analyte.

Depositing a Small Binding Site Island in a ZMW Using Directional Deposition

In one example approach, methods, systems and compositions for depositing a small island or dot at the bottom of an array feature (e.g., ZMW) or even simply on a flat substrate to create a heterogeneous surface of phase determining features, e.g., for single molecule attachment are provided. As above, the island/dot can be, e.g., a metallic, dielectric, or semiconductor material on which a polymerase or other analyte can be immobilized by means of a linker molecule such as a biotin-terminated poly(ethylene glycol) alkanethiol, as noted in more detail above.

Figure 7A:
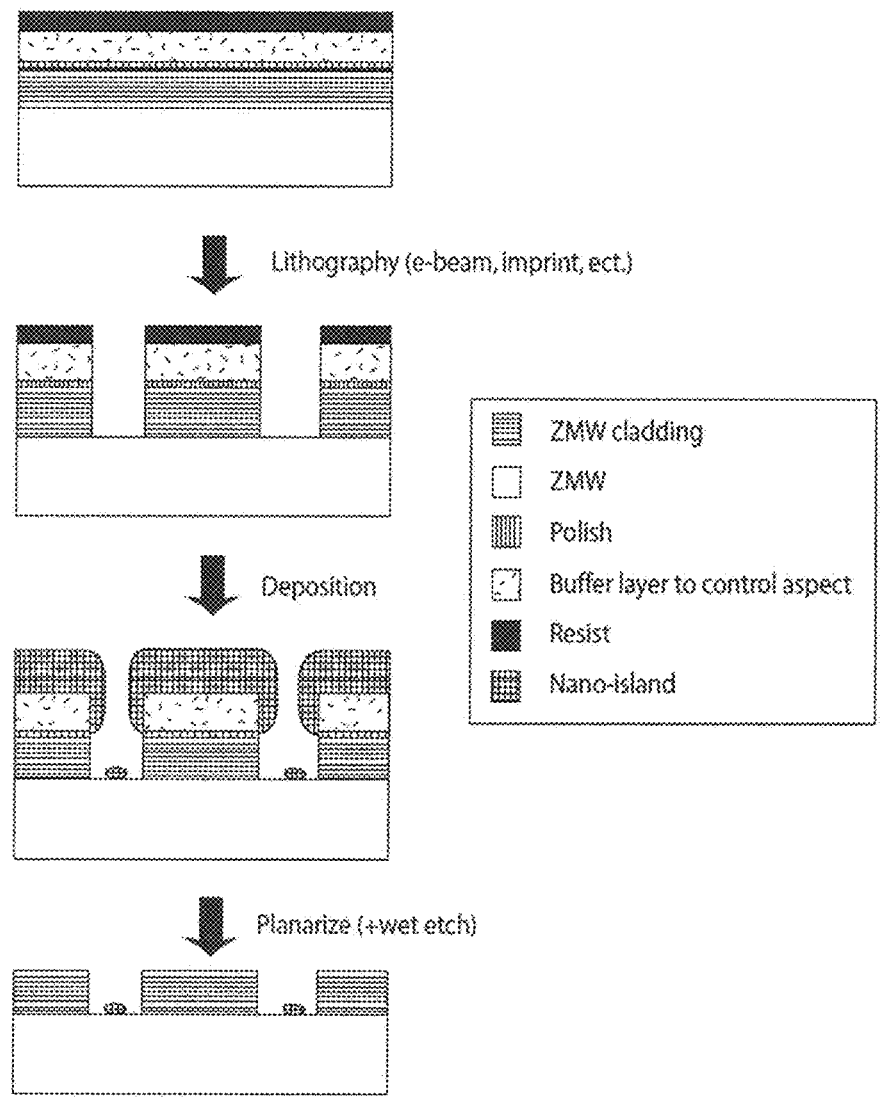
FIG. 7A provides a schematic illustration of a procedure for forming nanoparticles in ZMWs.

In one aspect, in order to make islands sufficiently small so that only one polymerase can bind to one island, a high aspect ratio structure is used in conjunction with nonspecific, directional deposition. This can include, but is not limited to, physical vapor deposition (PVD) such as sputtering, e-beam evaporation, and thermal evaporation, or chemical vapor deposition (CVD) such as low-pressure CVD, plasma-enhanced CVD, or high density plasma CVD. Similar approaches have been used for fabricating nanowires of similar length scales, demonstrating the basic feasibility of this approach. As shown in FIG. 7A, a high aspect ratio pattern is created by adding a buffer film between a photoresist and a cladding film. Alternatively, a bilayer resist can be used in place of a single-layer resist/buffer layer to create the necessary dimensions. After patterning the ZMW hole or other array feature with the desired aspect ratio, a film is deposited over the entire structure by PVD or CVD. By using suitable aspect ratios and deposition conditions, a "breadloaf" shaped structure forms above the film, creating a mask through which a small diameter restricts the area of deposition onto the substrate. The breadloaf-like structure forms isotropically around, e.g., a ZMW hole, naturally aligning the island in the center of the ZMW cavity. The resulting island surface can be functionalized with linker to bind the desired enzyme, e.g., a polymerase.

Figure 7B:
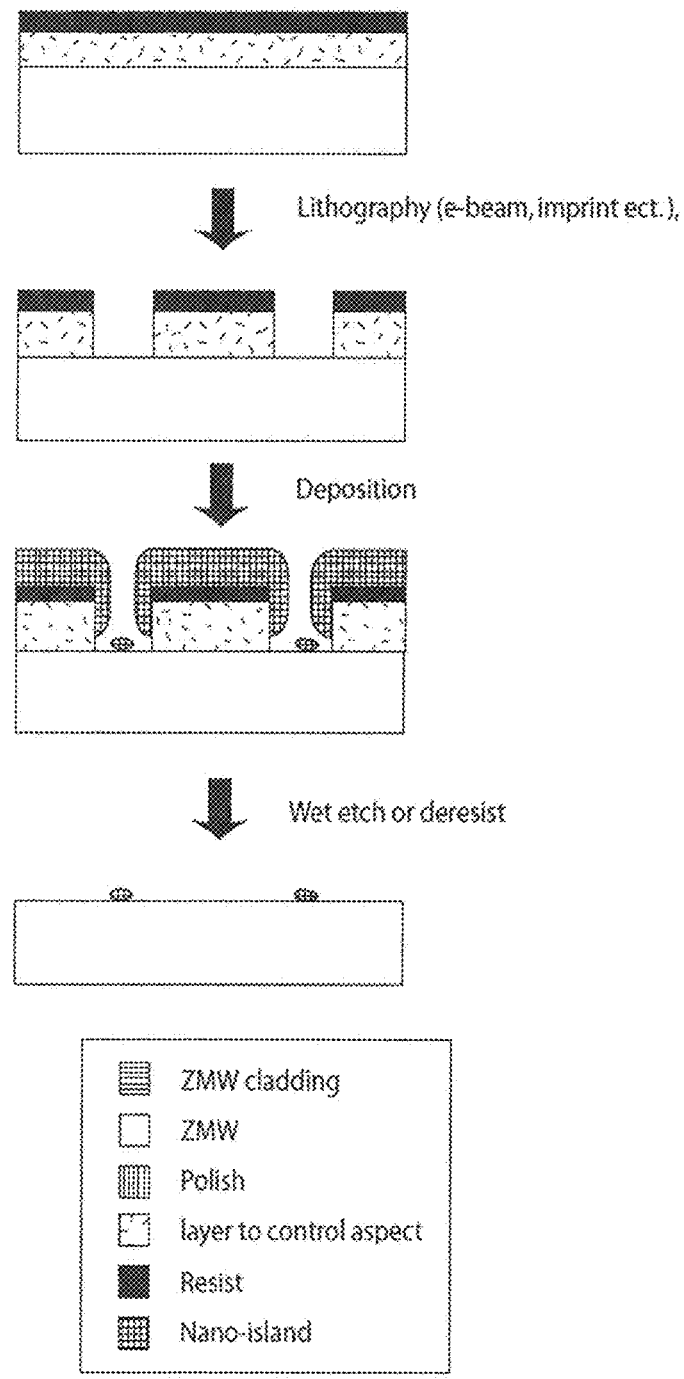
FIG. 7B provides a schematic of a process flow for flat substrates.

This overall process can also be adopted to form small dots that are sized for a single polymerase on flat substrates. These substrates can be used with single molecule analysis techniques that do not require a ZMW structure, such as Total Internal Reflectance Fluorescence (TIRF). A process flow for flat substrates is shown in FIG. 7B.

Figure 8A:
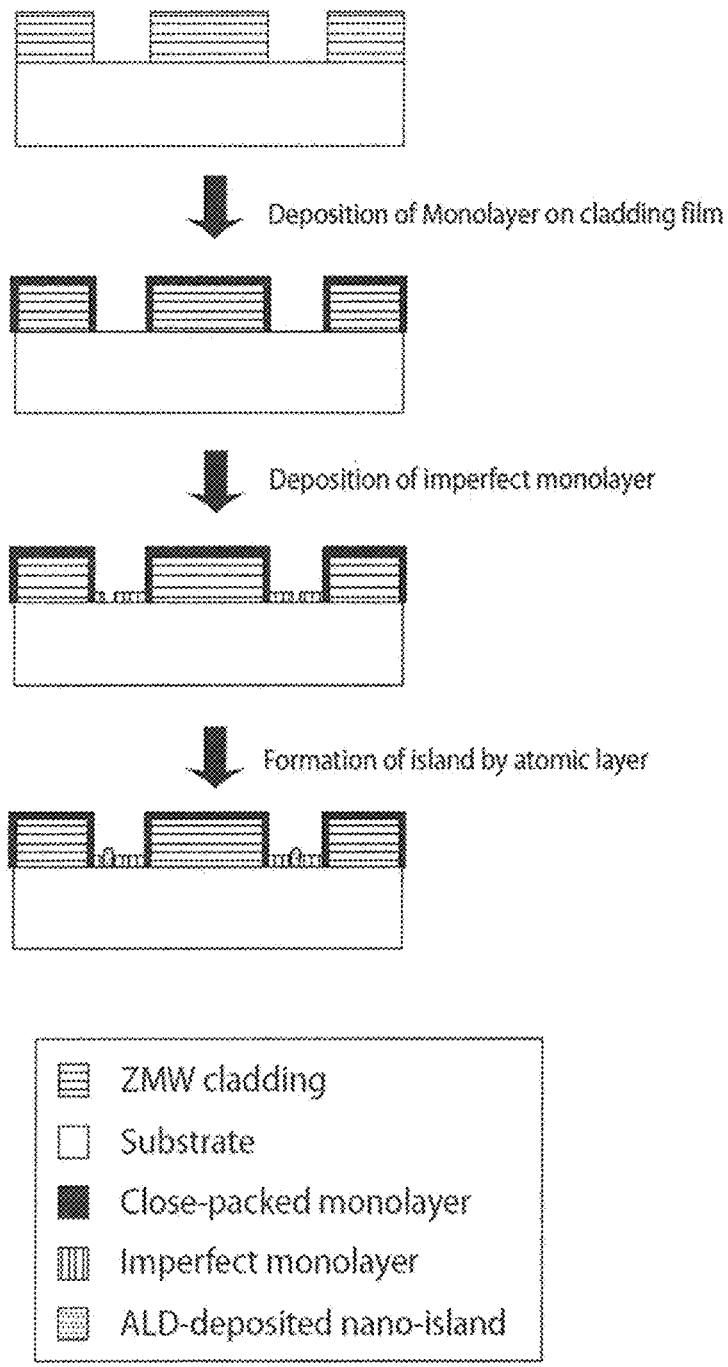
FIG. 8A provides a schematic illustration of a process flow for forming nanoparticles in ZMWs via deposition of an imperfect monolayer. A process flow for flat substrates is shown in FIG. 8B.
Figure 8B:
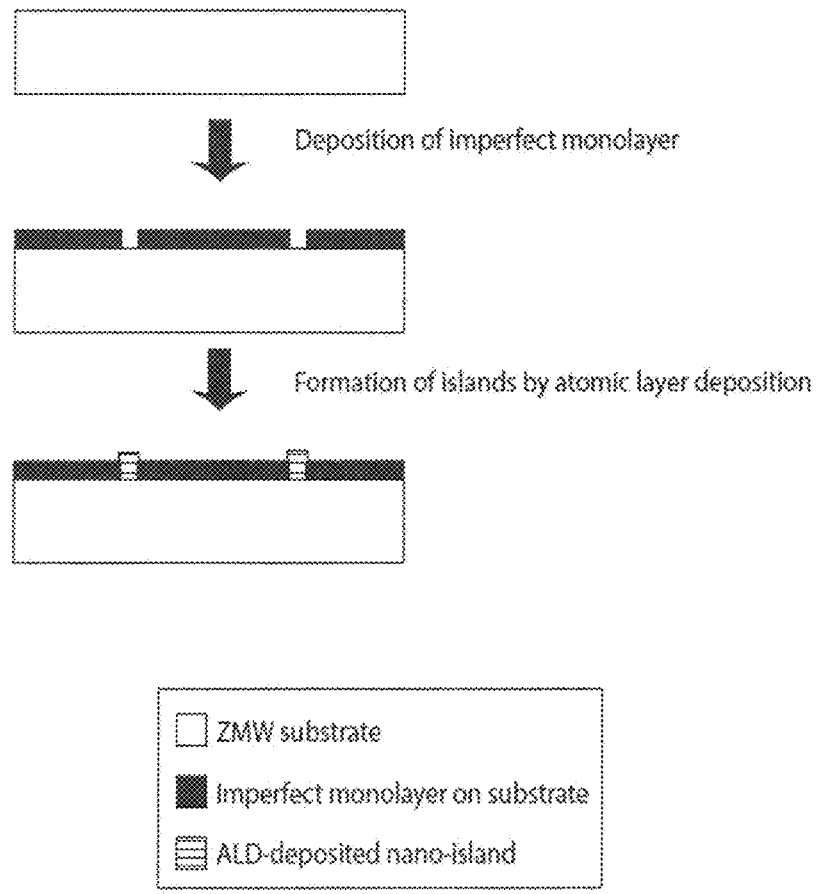

Depositing a Small Binding Site Island in a ZMW Using Self-Assembled Monolayers and Atomic Layer Deposition In this embodiment, to make islands sufficiently small so that only one polymerase can bind to one island, imperfectly-formed self-assembled monolayers and atomic layer deposition (ALD) are used. These technologies are routinely applied to form gate dielectrics of similar size for nanoscale electronics, demonstrating the feasibility of this method. As shown in FIG. 8A, the imperfect monolayer serves as a mask for forming an island on the surface by ALD. This island surface can be functionalized with linker to bind the desired enzyme, e.g., a polymerase. Unlike other types of deposition processes such as sputtering, evaporation, and conventional chemical vapor deposition (including but not limited to low-pressure chemical vapor deposition, high-density plasma chemical vapor deposition, plasma-enhanced chemical vapor deposition, etc.), ALD is sensitive to surface species, and films do not typically form unless those surface species are present to react with the ALD precursor and oxidizer. By selecting suitable monolayers for the cladding film and substrate, the ALD film grows only on the substrate. Deposition of materials that form imperfect monolayers such as octadecyltrichlorosilane is repeatable and controllable so that very small (<30 nm diameter) openings can be created, yielding an effective nano-mask for ALD. As above, this process can also be adopted to form small clusters sized for single polymerases on flat substrates. As above, these substrates can be used with single molecule techniques that do not require a ZMW structure such as TIRF. A process flow for flat substrates is shown in FIG. 8B.

Additional details regarding the production of imperfect monolayers can be found, e.g., in Richter et al. *Phys. Rev. E,* 2000, 61, 607-615. Further details regarding ALD can be found in Chen, et al., *Appl. Phys. Lett.,* 2004, 84, 4017-4019.

Depositing Small Binding Site Islands ZMW Using Spacer Film

Figure 9A:
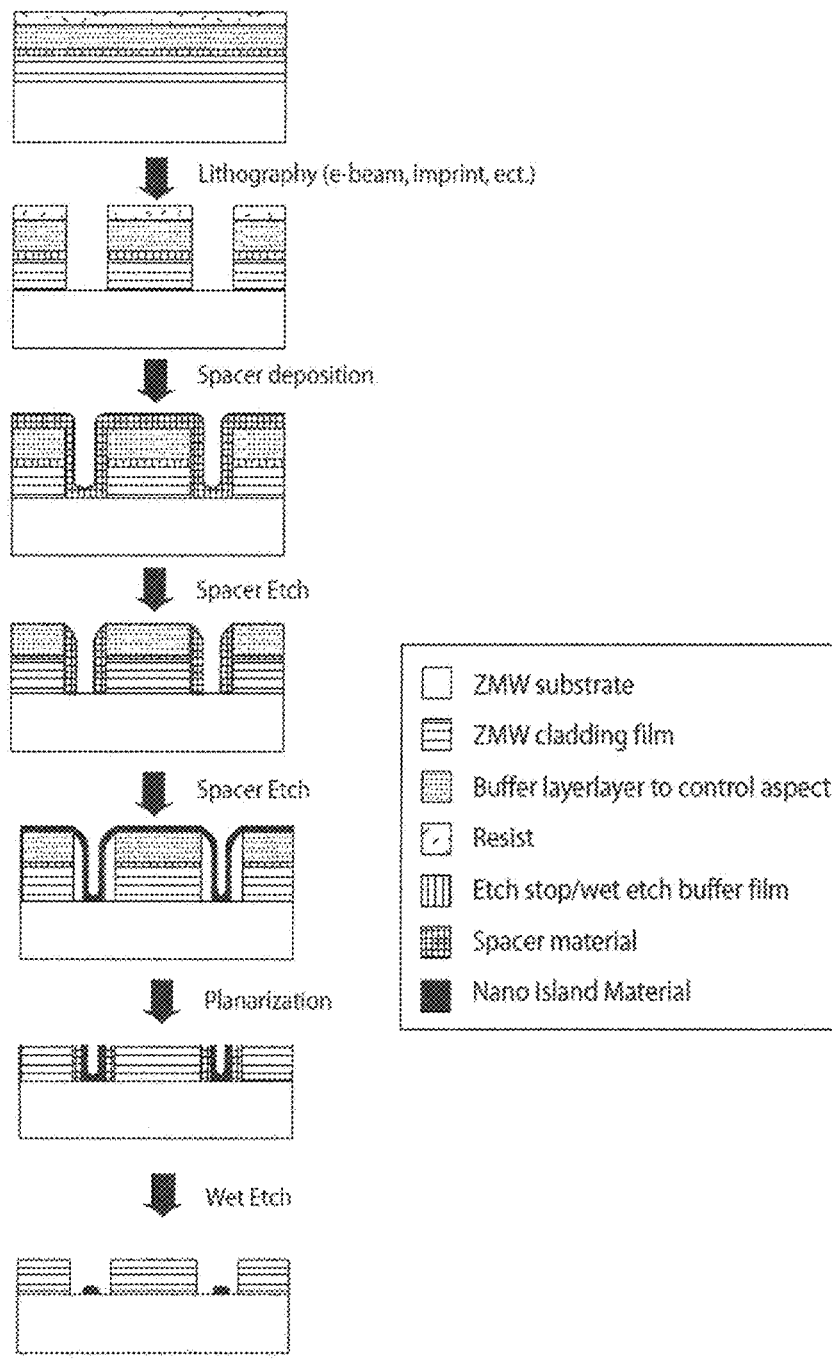
FIG. 9A provides a schematic illustration of a process for placing a functionalized island in a ZMW. A related process flow for flat substrates is shown in FIG. 9B.

In this embodiment, in order to make e.g., dots or islands, sufficiently small so that only one polymerase may be bound to one island or dot, a structure similar to that used for transistor spacer films is used as a self-aligning masking layer which controls both the location and size of the island or dot. This method uses a spacer film or sacrificial layer as also described above. As shown in FIG. 9A, a multi-film stack is created by exposing a positive-tone photoresist and etching through three layers. Alternatively, a positive-tone-like resist pattern can be created using nanoimprint lithography. The spacer film is deposited over the etched pattern by atomic layer deposition (ALD) or chemical vapor deposition (CVD). Using a directional etch, a spacer structure is created that forms isotropically around the ZMW hole, naturally aligning a space to deposit the island film in the center of the ZMW cavity. The island material is deposited by physical vapor deposition (PVD) or CVD. The entire stack is planarized to expose the buffer layer and spacer material so they can be removed by wet etching. A polish stop/wet etch bather shown as the green film in FIG. 9A is present to protect the cladding film during these last two steps. Further details regarding techniques useful to this embodiment are found in Cerofolini, et al., (2005) *Microelectr. Eng.,* 81, 405.

Figure 9B:
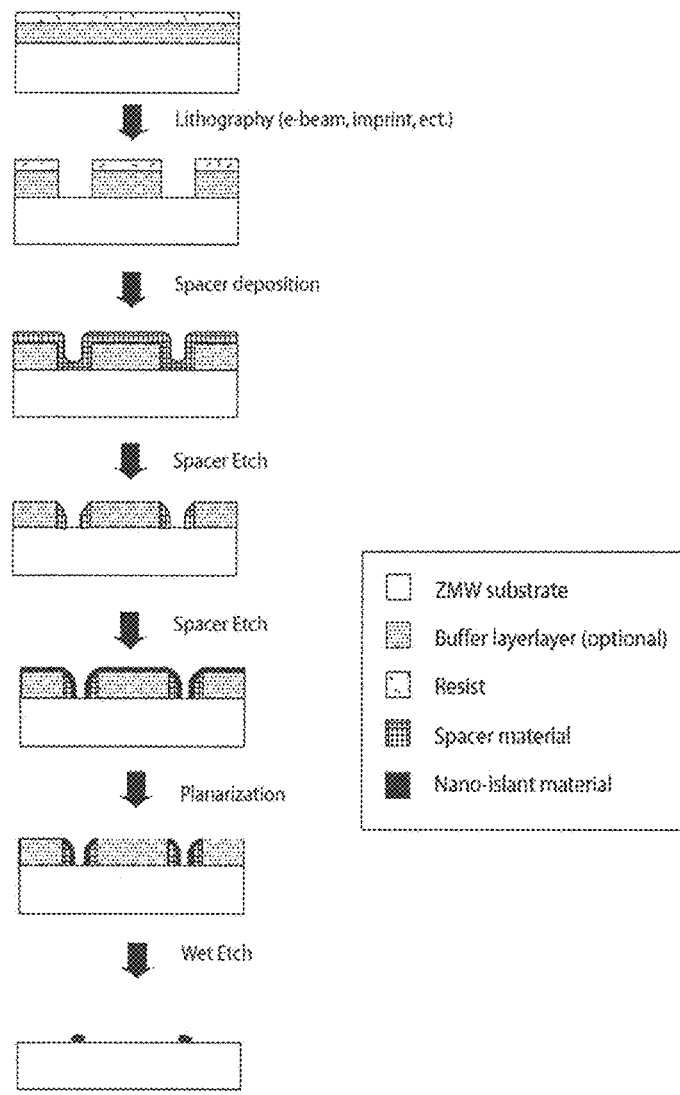

This process can also be adopted to form small islands that are sized for a single polymerase on flat substrates as well, e.g., using TIRF. A process flow for flat substrates is shown in FIG. 9B. In this case, if the resist is used alone or in conjunction with the buffer layer, then low-temperature ALD is suitable for depositing over the resist structures. The techniques illustrated by both FIGS. 9A and 9B produce an island surface that can be functionalized with a linker, e.g., that binds to polymerase.

Deposit Metal Nanoparticles in a ZMW Using Backside Exposure of Photoresist

Figure 10:
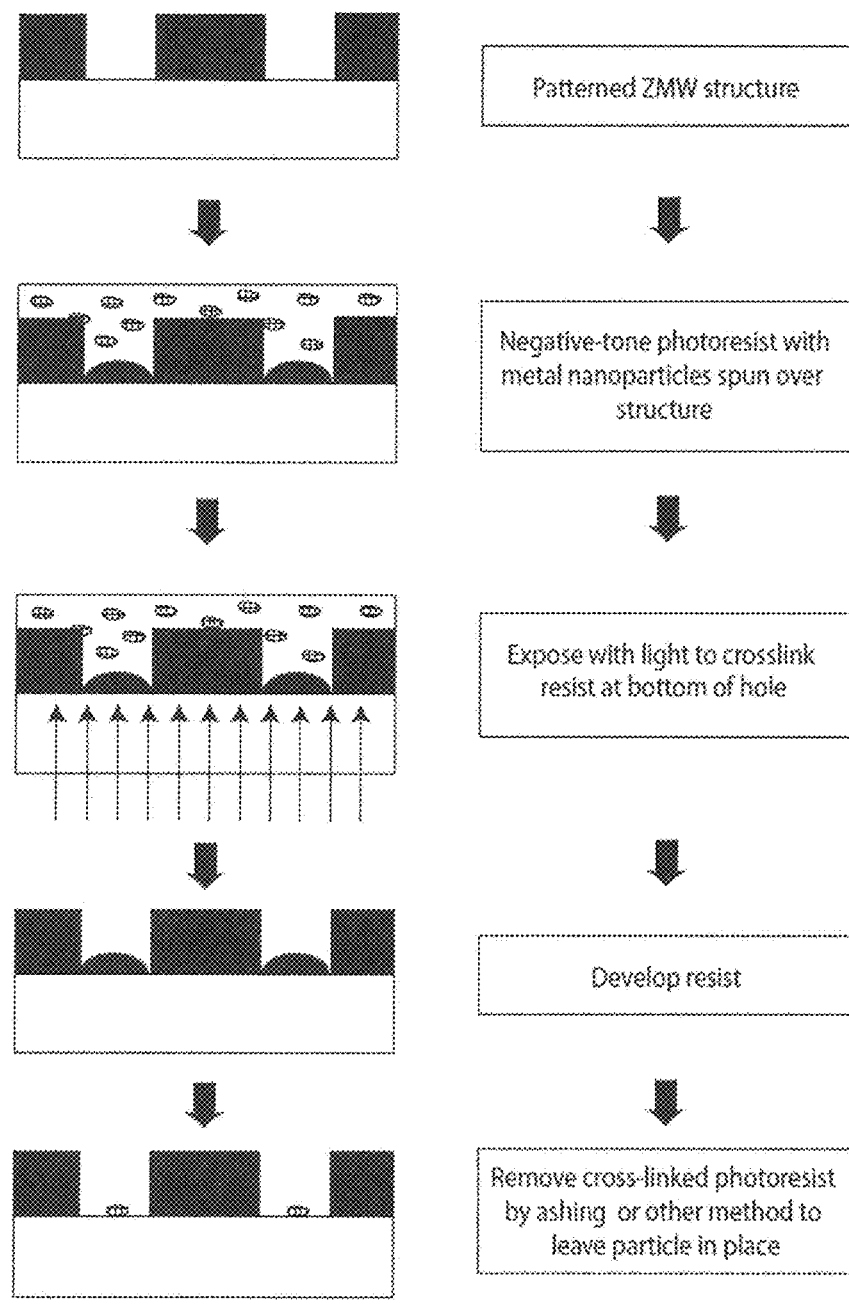
FIG. 10 shows a schematic process for immobilization of nanoparticles in ZMWs.

Immobilization of nanoparticles, e.g., metal nanoparticles can also be achieved by the process shown in FIG. 10. After the ZMW is fabricated using current processes, nanoparticles of sizes ranging from 10-100 nm are suspended in a negative-tone photoresist and spun onto the ZMW structure. The backside of the ZMW is exposed to radiation to crosslink the resist. The wavelength is chosen so that the illumination region is at the bottom of the ZMW hole. The un-crosslinked resist is removed as usual. The remaining photoresist is removed by ashing or other manner that leaves the nanoparticles in the ZMW hole.

Creating Particles in a Target Area by Annealing Smaller Nanoparticles

In one embodiment, monolayers of small nanoparticles close-packed on a surface can be annealed to coalesce and form a single, larger particle. The technique uses deposition of monolayers of small nanoparticles (e.g. 1.5 nm diameter particles) in a desired portion of an array (e.g., at the bottom of ZMWs of the array) followed by annealing the sample. The particles coalesce to form 1 or a few larger particles in the bottom of the ZMW, providing a limited number of binding sites for an analyte of interest. The size of the resultant particle is dependent on the composition of the nanoparticle monolayer, e.g., spacing, density, particle size, etc. These parameters can be adjusted so that the size of the particle only allows a single polymerase to fit on it.

Deposition of a Gold Particle in a ZMW Using Block Copolymer Micelle Nanolithography In one aspect, block copolymer micelle nanolithography is used to produce spatially well-defined deposits of nanometer-sized gold (or other nanomaterial) deposits that can be functionalized as phase determining features for binding of single analyte molecules. In this fabrication protocol, ZMWs (or other small array features) act as pre-structured guides for self-assembly of block copolymer micelles, generated at a size to match the ZMW (or other array feature) diameter. This results in one micelle per waveguide, and also results in positioning of an e.g., gold dot or cluster in the center of the waveguide. The clusters are stable and immobile, presenting suitable substrate sites for coupling to suitably tagged or derivatized molecules of interest, e.g., via gold-based or other suitable chemistries as described above. The small size of the dots/clusters (e.g., gold dots as small as 2 nm in diameter can be produced) ensures single molecule occupancy of the analyte in each ZMW (or other array feature), as proteins and other molecules are typically larger than the minimum size of the gold dots, and will be sterically prevented from binding more than one molecule of analyte per dot (e.g., T7 DNA polymerase has a ~10 nm diameter); thus, the binding site is sterically inaccessible to more analyte molecules after the first analyte has bound. This permits functionalization of a ZMW or other array reaction region under conditions of excess analyte (e.g., excess polymerase), ensuring that each ZMW or other array region harbors a single analyte molecule, followed by washing to remove unbound enzyme.

Additional details regarding functionalization schemes for gold dots prepared by block copolymer micelle nanolithography for binding of single proteins can be found, e.g., in Glass et al. (2003) "Block copolymer micelle nanolithography" *Nanotechnology* 14:1153-1160; Glass et al. (2003) "Micro-nanostructured interfaces fabricated by the use of inorganic block copolymer micellar monolayers as negative resist for electron-beam lithography" *Adv. Funct. Mat.* 13: 569-575; Haupt et al. (2003) "Nanoporous gold films created using templates formed from self-assembled structures of inorganic-block copolymer micelles" *Adv. Mater.* 15: 829-831; and Arnold et al. (2004) "Activation of integrin function by nanopatterned adhesive interfaces" *Chemphyschem.* 5:383-388.

Electrochemical Growth of a Nanostructured Polymerase Binding Site

In one class of embodiments, an electrical current is used to nucleate growth of a nanostructure that can be used to bind to an analyte of interest. In this embodiment, an electrode can be placed under the ZMW or other array, with a transparent conductive substrate in between the electrode and ZMW. A small amount of current flowing from the electrode nucleates the growth of a small nanostructure at the bottom of the ZMW. Once one such structure nucleates, it is far more likely for that structure to continue to grow in response to further current flow than for another nanostructure to nucleate. The current flow is turned off (stopping growth of the structure) while the structure is still small enough for only one polymerase or other analyte to fit on it. The nanostructure can be functionalized with the appropriate chemistry as described herein. When the polymerases or other nanostructure is loaded in at high concentration, only one polymerase can bind to the nanostructure within each ZMW.

Depositing a Single Core-Shell Particle into a Single ZMW

As described herein, islands of particles can be created within nanoscale apertures such as ZMW's by 1) Exposing the array of apertures to core-shell particles which are sized such that one core-shell particle is deposited into one aperture, then 2) removing the shell material so as to deposit the core into the aperture. The core that is deposited can be of a size such that only one molecule of interest such as an enzyme will bind to it within the aperture, for example, with a diameter of from about 2 nm to about 20 nm. The core can be, for example, a metal or metal oxide material. In some cases the core is comprised of gold. The shell is generally comprised of a material that can be readily removed without adversely affecting the core particle or the nanoscale aperture. In some cases, the shell comprises an organic polymer. Organic polymer shells can be produced which result in good dispersability in solution of the core-shell particle. The solution can be brought into contact with an array of nanoscale apertures such that generally one core-shell particle deposits in one nanoscale aperture.

After deposition, the organic material can be removed readily without damaging the core particle or the nanoscale apertures. The organic material can be selectively removed using a plasma, with high temperature, and/or through oxidation. The plasma can be, for example either an oxidizing or a reducing plasma. In some cases the treatment for removal of the shell also transforms the core material, for example either through oxidation or reduction. The core particle can comprise, for example: Au, Pt, Pd, Ag, In, Fe, Zr, Al, Co, Ni, Ga, Sn, Zn, Ti, Si and Ge in the corresponding oxidation stages or mixtures thereof. The shell material can comprise a polymer selected from block copolymers, graft copolymers, micro-branch polymers, star polymers having different branches, dendritic polymers, microgel particles, star block copolymers, block star polymers and core-shell latex polymers. In some cases, the polymer is polystyrene-b-polyethylene oxide, polystyrene-b-poly(2-vinylpyridine), polystyrene-b-poly(4-vinylpyridine) or a mixture thereof. Methods for producing and depositing such core-shell polymers is described, for example, in Spatz et al., European Patent EP 1027157 and in Moller et al., European Patent EP 1244938.

The deposited core particle can be functionalized as described herein to attach a single molecule of interest to the particle. For example, selective methods of coupling to metals such as gold are known in the art and described herein. Thiol containing compounds can be used for selective coupling to a gold surface. For example, a biotin-PEG-alkane-thiol can be selectively reacted with the gold particle. In some cases, in addition to coupling of a molecule of interest to the surface, it is useful to treat other surfaces in order to prevent the unwanted binding of the molecule of interest or other reaction compounds to other portions of the array.

In one exemplary embodiment, an array of nanoscale apertures in an aluminum cladding on a silica surface are provided. The array is treated with silicon oxide by atomic layer deposition (ALD), resulting in a silicon oxide coating over the array. Micelles having metal or metal oxide salts such as $HAuCl_4$ in their cores and block copolymer shells are deposited onto the array such that generally one micelle is deposited in one aperture. The array is treated with a plasma such that the block copolymer shell is degraded and removed and a single metal particle, e.g. a gold dot, having a diameter of about 8 nm to about 12 nm is deposited in an aperture. The metal dot such as a gold dot is selectively functionalized with a coupling agent such as biotin-PEG-silane-SH. The remaining portions of the surface are then passivated using silane chemistry, for example using treatment with silane-PEG, where the PEG is terminated with methoxy, hydroxy, or carboxylic acid. The molecule of interest, having a biotin attached to it is then coupled to the surface using avidin or streptavidin. The size of the functionalized metal dot and the size of the molecule of interest, such as an enzyme, are selected such that generally only one molecule of interest is attached within each aperture.

Forming Single Analyte Binding Sites in an Array Feature

Similar to the approaches for putting a nanostructure into a ZMW (or other array feature) to facilitate super-Poisson loading of an analyte, the invention also provides approaches for locating binding groups that are capable of binding to, e.g., a single analyte into the array feature, without the use of a nanostructure to provide the binding site. In this class of embodiments, binding sites for analyte molecules are not necessarily located on a functionalized particle or other nanostructure, but can be formed directly on the array feature. For example, using this class of embodiments, it is possible to form a small functionalized region or island at the bottom of a ZMW that is capable of binding to an analyte molecule, e.g., where the functionalized region is small enough that only one analyte molecule can bind to the functionalized region at a time.

As with the methods above, placement of a single analyte binding site in the ZMW or other array reaction region makes it possible to completely load the array with the desired number of analyte molecules (polymerase, template, etc.), by introducing a high concentration of analyte to the array, and then washing any excess analyte from the array after binding to the analyte binding site. As with the other embodiments herein, this approach is particularly well suited to delivery of a single analyte molecule to each reaction region of an array, though it is possible to use similar approaches to place more than 1 analyte binding site in an array reaction region, if desired. For single molecule sequencing applications, it is generally desirable to use the methods of this class of embodiments for loading single analyte molecules into a ZMW or other array reaction region.

In some embodiments the methods of microfabrication described herein can be used to produce an island of functionality within a nanoscale aperture such as an island of substrate material surrounded by a region of isolation material, the substrate material and isolation materials having different enough chemical properties in order to selectively functionalize the substrate material for binding a single molecule of interest. Where the substrate surface comprises a silica based material, this material can be selectively functionalized using silane surface chemistry. The silane chemistry can be used to functionalize a silica based surface in the presence of an alumina surface. Methods for selective functionalization of surfaces are described in more detail herein.

Figure 11:
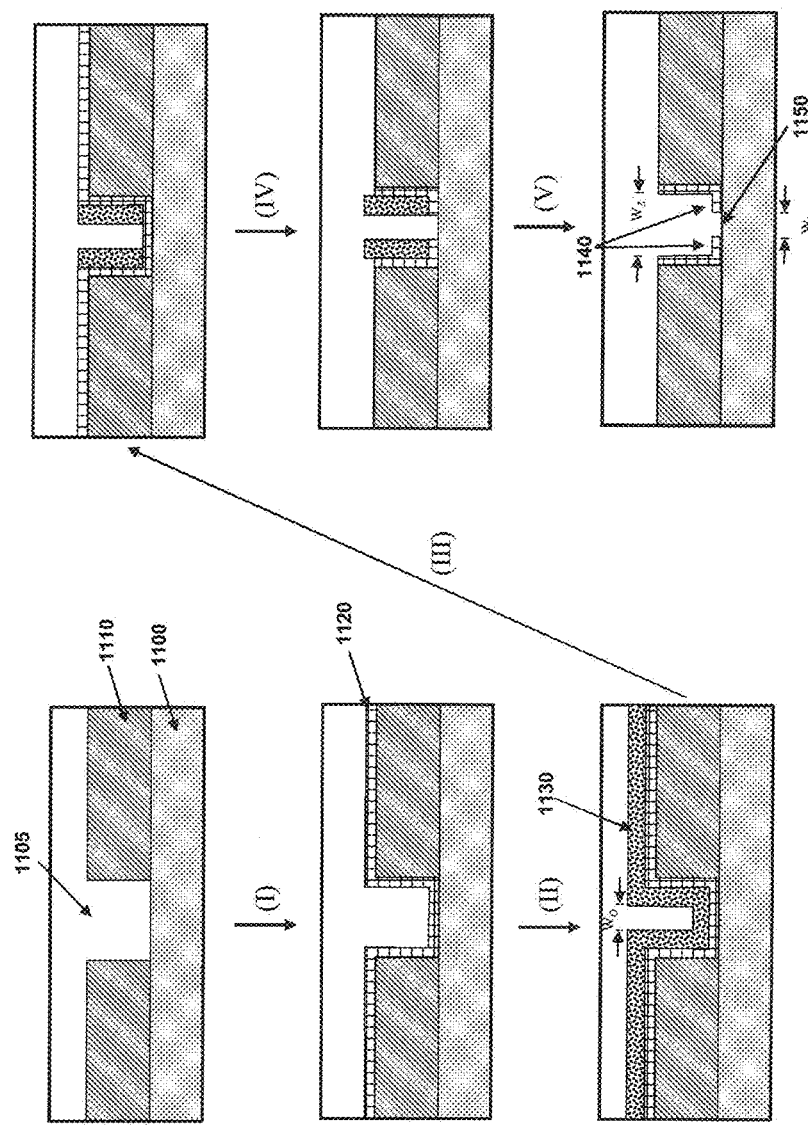
FIG. 11 is a schematic illustration of a process for producing an island of substrate material surrounded by isolation material within a confined region using a sacrificial layer.

FIG. 11 illustrates an embodiment of a method of the invention for forming an island of substrate within a nanoscale aperture surrounded by an isolation layer. A substrate 1100 having a cladding layer 1110 on top of it is provided. The cladding layer has an array of nanoscale apertures 1105 extending through the cladding to the substrate. The substrate is generally a transparent substrate such as fused silica or quartz. The cladding can be a metal such as aluminum or an alloy of aluminum. In step (I) an isolation layer 1120 is deposited onto the substrate. The isolation layer is generally deposited as a conformal layer such that it coats the walls of the apertures as well as the base. The isolation layer is generally a relatively thin layer, for example, from about 2 nm to about 10 nm thick. The isolation layer can be deposited using atomic layer deposition (ALD). The isolation layer can comprise a metal oxide material such as aluminum oxide.

In step (II), a sacrificial material 1130 is conformally coated such that it coats the walls of the aperture. The thickness of the sacrificial layer is selected such that an opening between the coated walls remains. A lateral dimension of the opening, $W_O$, is illustrated in FIG. 11. This opening will be utilized for the formation of the island of functionality. The thickness of the sacrificial spacer ($T_S$) on the walls of the aperture is related to the size of the opening by $W_O=W_Z-2T_S$, where $W_Z$ is the size of the opening of the aperture. The sacrificial material can comprise silicon, germanium or silicon/germanium.

In step (III) the sacrificial layer is etched in a directional (anisotropic) manner to expose the surface of the isolation layer within the aperture, but to leave the sacrificial material on the walls of the aperture. In step (IV) the aluminum oxide isolation layer is etched. This etch can be a directional (anisotropic) etch. It can be carried out, for example using $Cl_2$. In some cases, this etch can extend into the substrate.

In step (V) the sacrificial material is removed, for example using hydrogen peroxide, $XeF_2$, or $SF_6$. The process produces an island 1150 of substrate material, also referred to as a nanopit, within the nanoscale aperture surrounded by a region of isolation material 1140. The size of the island, represented by $W_I$, is on the order of $W_O$, as the sacrificial layer acts as a mask during the etch step used to produce the island. In some cases in this embodiment and in other embodiments of the invention, the isolation layer will comprise alumina and the cladding will comprise aluminum metal. Where this is the case, the aluminum metal will generally have an aluminum oxide coating where it has been exposed to air, thus all of the cladding surfaces will comprise aluminum oxide whether or not the isolation layer has been removed. This feature can be useful where it is desired to subsequently treat, for example to passivate, the surfaces that are not part of the island. Where substantially all of the surfaces outside of the island comprise alumina, one type of passivating chemistry can be used for all such surfaces, simplifying processing, thereby resulting in more reproducible, higher quality substrates.

While as shown, the cladding 1110 is directly deposited onto the substrate 1100, in some cases there can be a layer of material between these layers. In some cases the additional layer will extend across the base of the nanoscale aperture. Where this is the case, at the end of the process, the island within the aperture can have the surface of the intermediate layer rather than, or in addition to the surface of the substrate exposed.

Figure 12:
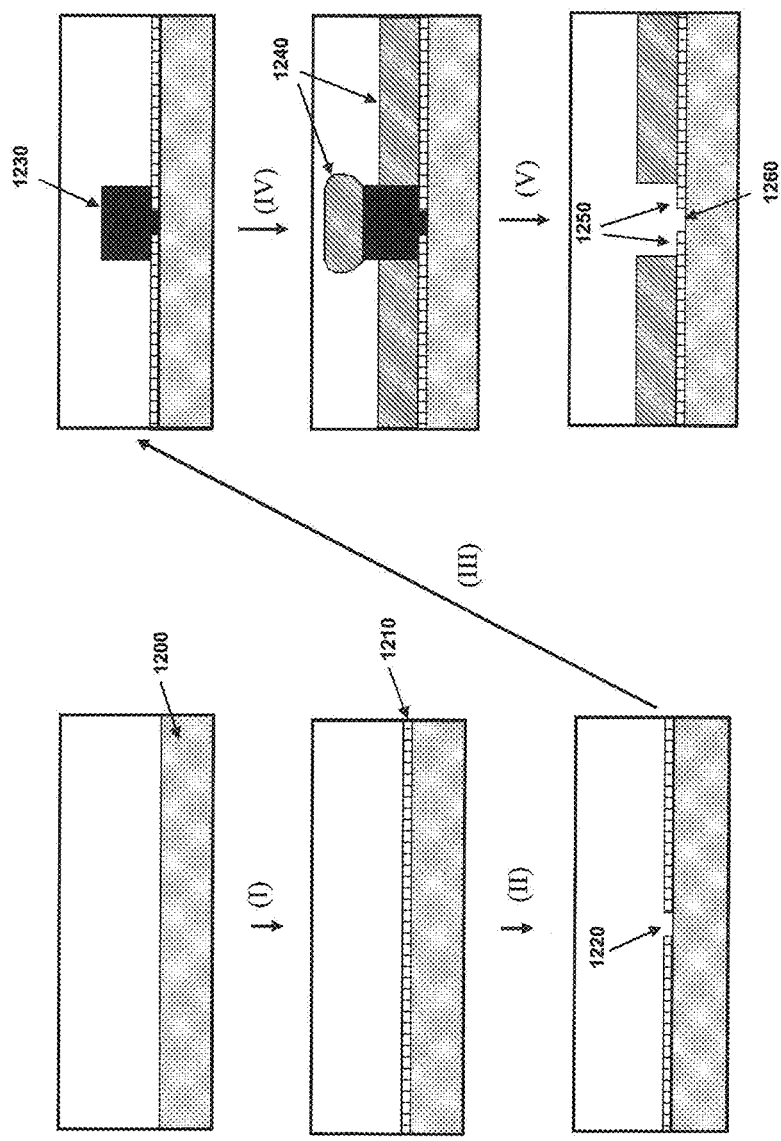
FIG. 12 is a schematic illustration of an alternative process for producing an island of substrate material surrounded by isolation material within a confined region.

FIG. 12 provides an alternative method for forming an island of substrate surrounded by isolation layer within an array of nanoscale apertures. A substrate 1200 is provided. The substrate is generally a transparent substrate, for example fused silica or quartz. In step (I) an isolation layer 1210 is deposited onto the transparent substrate. The isolation layer is generally a relatively thin layer, for example, from about 2 nm to about 10 nm thick. The isolation layer can be deposited using atomic layer deposition (ALD). The isolation layer can comprise a metal oxide material such as aluminum oxide.

In step (II), an array of nanopits 1220 is formed extending through the isolation material. These nanopits will become the islands of substrate, and thus are generally relatively small; having a lateral dimension from between about 2 nm and about 40 nm, or between about 5 nm and about 20 nm. In some cases, due to the small size of the features, electron beam lithography or UV lithography can be used to produce the features. Where electron beam lithography is used, an e-beam resist such as ZEP520A, a positive tone resist from Zeon Corporation can be used. In other cases, high resolution lithography using UV can be used to define the nanopits. The etching of the alumina layer can be carried out using reactive ion etching (RIE), for example using a chlorine plasma. In some cases, the etching of the alumina layer results in some etching into the transparent substrate. In some cases, it is desirable to etch into the transparent substrate. The etching into the transparent substrate is generally fairly shallow, for example from about 1 nm to about 25 nm or about 2 nm to about 10 μm into the substrate.

In step (III), a resist is used to produce a nanoscale feature or pillar 1230 on top of each nanopit. The size and shape of the nanoscale feature 1230 will determine the size and shape of the nanoscale aperture. The nanoscale feature can be produced for example using a negative tone resist. Where electron beam lithography is used, a resist such as NEB31 from. Sumitomo Corporation can be used. In step (IV) a cladding layer 1240 is deposited in a directional or line-of-sight manner, for example thermally or with an electron gun. The deposition is carried out such that a gap remains at the edges of the nanoscale feature that is not coated with cladding. Step (V) involves removing the nanoscale feature, thereby removing the cap of cladding above the nanoscale aperture and nanopit. Where the nanoscale feature 1230 is formed using a resist, a solvent such as 1165 remover from Shipley Corporation can be used. The process produces a nano scale aperture having an island of exposed substrate material 1260 surrounded by isolation material 1250. Where the cladding comprises aluminum, exposure of the cladding to aluminum will result in the surfaces of the cladding comprising aluminum oxide. Where this is the case, and the isolation layer comprises aluminum oxide, one set of passivation chemistry can be used to treat the surfaces outside of the island of exposed substrate.

For the methods illustrated in FIG. 12, there are two separate lithography steps, one for producing the nanopits, and the other for producing the nanoscale apertures. In order to ensure that the islands end up near the center of the nanoscale apertures, it is important that there be accurate alignment between the two lithography steps. In order to ensure good alignment, we have found that it is desirable to form registration features in the substrate. The formation of registration features is generally carried out before carrying out the steps of FIG. 12. In some cases the registration features are etched into the substrate. In other cases, the registration features are deposited onto the substrate. FIG. 13A illustrates a preferred method for producing alignment features for this procedure. A substrate 1300 as described above is provided which has a hard mask layer 1310 such as aluminum on top, and a resist 1320 on top of the hard mask. In step (I), the resist is developed and patterned. An electron beam resist such as ZEP520A from Zeon can be used for this step. In step (II) the hard mask is etched. Where the hard mask is aluminum, a chlorinated plasma reactive ion etch can be used. In step (III) the substrate is etched. Where the substrate is fused silica, the substrate etch can be carried out using a fluorine plasma. The etch can be carried out to provide effective registration marks. The registration marks can be any appropriate shape, generally having both vertical and horizontal lines when viewed from above. FIG. 13(B) shows a representative substrate having a central region 1340 comprising an array of nanoscale apertures each having an island of exposed surface within them. The substrate has four registration marks 1330, each in the shape of a "+".

Figure 14:
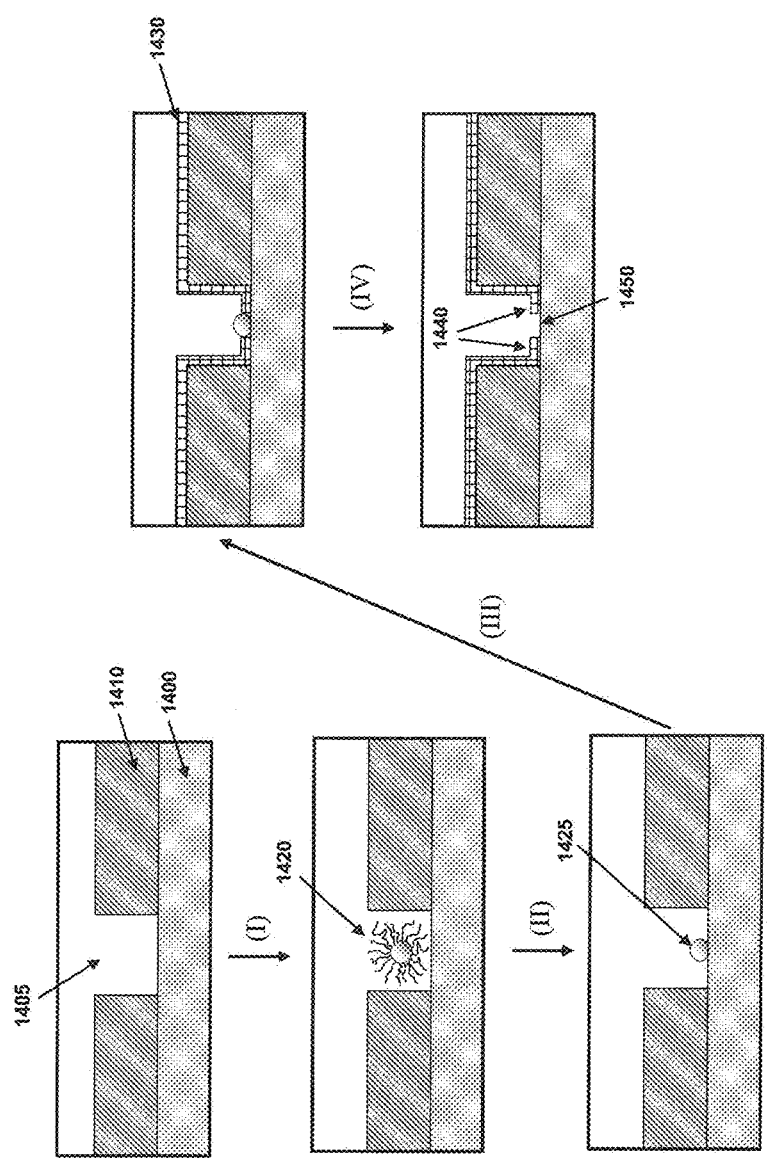
FIG. 14 shows a schematic of a method for producing an island of substrate material using the deposition of a particle within a confined region.

FIG. 14 shows an alternative method for producing an array of nanoscale apertures, each having an island of exposed surface within them. The method generally involves depositing a single particle in the aperture, using that particle to mask a portion of the aperture base while an isolation layer is coated onto it, then removing the particle to expose the portion of the surface the particle was masking. A substrate 1400 having an array of nanoscale apertures 1405 through a cladding layer 1410 is provided. In some cases, prior the substrate is coated with a thin layer, for example by atomic layer deposition, over the cladding and the transparent substrate. This layer can comprise, for example, aluminum oxide.

In steps (I) and (II), an island particle that is smaller than the aperture is deposited within the nanoscale aperture. In step (I) a core-shell particle is deposited such that generally only one core-shell particle 1420 is deposited in a single aperture. For example, the size of the core-shell particle is large enough that once one particle is in an aperture, the core-shell particle sterically prevents the deposition of a second core-shell particle in the well. The core-shell particle can be, for example, a metal or metal oxide core particle surrounded by an organic polymeric shell. In step (II), the shell portion of the particle is removed, thereby depositing a single small particle 1425 corresponding to the core of the core-shell particle into the aperture. The shell can be removed, for example by treatment with a plasma which selectively degrades the organic material comprising the shell. In some cases the core particle is simply deposited into the aperture, in other cases, the core is transformed during the shell removal process, for example reduced from a salt or oxide to a metal. While in FIG. 14 the deposition of the single particle is performed using a core-shell particle, it is understood that the deposition can be performed in other ways including those described herein using other sizing moieties providing for the deposition of a single island-forming particle.

In step (III), an isolation layer 1430 is deposited to coat the regions of the substrate surrounding the particle. This deposition can be carried out in a conformal manner such that the walls of the aperture are coated as shown in FIG. 14. In other embodiments the isolation layer is deposited in a directional manner to selectively coat the lateral surfaces, and in other embodiments, the deposition can be carried out such that the isolation layer selectively grows on the substrate surface. The particle acts as a mask to prevent the deposition of the isolation layer onto a central portion of the base of the aperture. The isolation layer can comprise an inorganic or an organic material. The isolation layer can comprise, for example a metal oxide such as aluminum oxide or silicon oxide. In some cases, the isolation layer can comprise aluminum oxide that is deposited using atomic layer deposition (ALD). Where the substrate is a silica based material such as fused silica and the particle comprises a metal such as gold, an oxide such as aluminum oxide can be selectively deposited onto the substrate and/or the cladding without substantially depositing onto the metal particle. As describe above, in some cases, the substrate has a layer such as an ALD layer over the substrate prior to step (I). In these cases, the deposition of an isolation layer uses a different material than the first coating layer. In some embodiments, for example, an aluminum oxide ALD layer is coated over the substrate prior to deposition of the particles, and a silane, such as PEG-silane is deposited in step (III) as an islolation layer that is masked by the particle.

In an exemplary process, a particle such as gold is deposited into apertures in an aluminum cladding on a silica surface. A silane passivation layer, for example a silane-polyethylene glycol is deposited onto the portions of the silica surface surrounding the particle in order to act as the isolation layer. In another optional step, the cladding is also passivated using a phosphate or phosphonate compound such as Albritect™ CP30 or polyvinyl phosphonic acid (PVPA). Suitable silanes and phosphate containing compounds are described, for example, in U.S. Patent Application 2008/0032301, which is incorporated herein by reference for all purposes. In another exemplary process, a coating such as a silicon oxide ($SiO_X$) coating or an aluminum oxide coating is applied over an array having apertures in an aluminum cladding on a silica surface. This coating provides a uniform surface chemistry over the array. Particles such as gold particles are deposited such that generally one particle per aperture. Where a silicon oxide coating was deposited, silane chemistry is then used to produce an isolation layer on the array. Fore example, a silane-PEG is deposited onto the surfaces not masked by the particle. The silane-PEG that is used can be methyl terminated, hydroxy terminated, or carboxyl terminated. Where an aluminum oxide coating is used, phosphonate or phosphate chemistry can be used to passivate the regions of the aluminum oxide coating not masked by the particle.

Once the isolation layer is deposited, in step (IV) the particle is removed to expose the portion of the surface which the particle was masking. The removal of the particle exposes an island 1450 on the surface that has a different surface chemistry than that of the isolation layer 1440 surrounding it, allowing for selective coupling of a desired molecule onto the island. Where the exposed island comprises a silica surface, silane chemistry can be used to selectively functionalize the island. For example, a biotin-PEG-silane will bind selectively to the island surface without substantially binding to an isolation layer comprising a PEG coated surface. Where the exposed island comprises aluminum oxide, phosphonate chemistry can be used to selectively attach a coupling agent, for example using a biotin-PEG-phosphonate or a biotin-PEG-PVPA. The particle can be removed, for example, by selectively etching or dissolving the particle. Where the particle comprises gold, for example, an $I_2$/KI etchant or a KCN based etchant can be used. The core can comprise other metals such as platinum, nickel, or aluminum. Where the deposited particle comprises aluminum, phosphate based etchants can be employed to remove the particle. Where the deposited particle comprises nickel, a $FeCl_3$ etchant can be used.

The size of the masking particle can be varied by controlling the size of the core in the core-shell particle. Control of size of the core and the shell of core-shell particles is known in the art, for example by forming micelles having cores comprising metal salts. See, for example Spatz et al., European Patent EP 1027157 and in Moller et al., European Patent EP 1244938. For example, the relative amount of metal salt, such as $HAuCl_4$ or $Pt(OAc)_2$ in the formulation can be used to control the size of the metal particle that is deposited. The size of the shell can be controlled by controlling the composition and the solvent conditions, for example by controlling the molecular weight of block copolymers used to form the micelles. In some cases, the masking particle has a diameter of from about 2 nm to about 40 nm. In some cases, the masking particle has a diameter from about 4 nm to about 20 nm. In some cases, the masking particle has a diameter from about 5 nm to about 15 nm.

In some cases, after functionalizing the island, for example with a functionalizing agent such as biotin-PEG-silane, any excess functionalizing agent that is bound to the cladding rather than to the island can be removed with an agent that specifically removes the functionalizing agent from the cladding. Such agents can comprise acidic compounds, in particular compounds comprising phosphate or phosphonate groups. In some cases, the agent for specifically removing functionality from the cladding is a phosphonate end-capped polymer such as polyvinyl phosphonic acid (PVPA), Albritect CP-30, Albritect CP-10, Albritect CP-90, Aquarite ESL, or Aquarite EC4020 from Rhodia, Inc.

Figure 15:
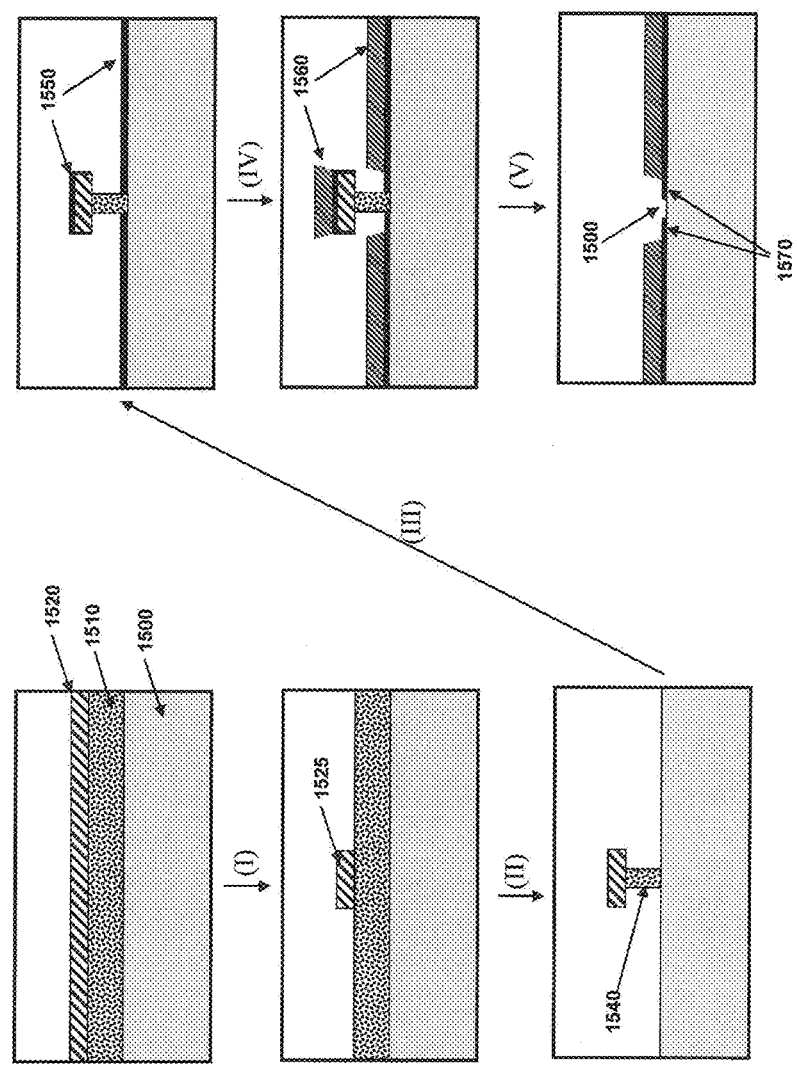
FIG. 15 is a schematic illustration of a process for forming an island of substrate surrounded by an isolation region within a confined region using a sacrificial pillar.

FIG. 15 illustrates another embodiment of a method of the invention for forming an island of substrate surrounded by an isolation layer within an aperture in an array of apertures. A substrate 1500 having a sacrificial layer 1510 and a hard mask layer 1520 is provided. In step (I), the hard mask layer is patterned and etched to produce an array of features 1525 which will be used to define an array of nanoscale apertures. In step (III) the sacrificial layer is etched, using the hard mask layer as a mask, to remove the portions of the sacrificial material not covered by the hard mask, and to undercut the hard mask to form pillars 1540. The etching process can be carried out in two steps, one to remove the bulk of the sacrificial material, and the second to perform the undercut, for example where the second step uses a dry etch undercut. In step (III), a layer of isolation material 1550 is deposited. The isolation material is deposited such that it extends under the overhanging hard mask layer to the base of the pillar of sacrificial layer 1540. The isolation material can be, for example aluminum oxide, deposited using sputtering. In step (IV) a cladding layer 1560 is deposited. The cladding layer can be a metal such as aluminum or an aluminum alloy. The cladding material is deposited such that it does not extend under the overhanging hard mask layer to create an empty space between edge of the cladding layer and the pillar. The isolation material can be deposited using evaporation. In step (V), the sacrificial layer and hard mask layer are removed, resulting in the removal of the portions of the isolation layer and the cladding layer on the portions of hard mask. In some cases, etching of the sacrificial layer is performed, for example, using hydrogen peroxide, $XeF_2$, or $SF_6$. The process results in the formation of a nanoscale aperture having an island of substrate surface at its base surrounded by a region of isolation material.

Figure 16:
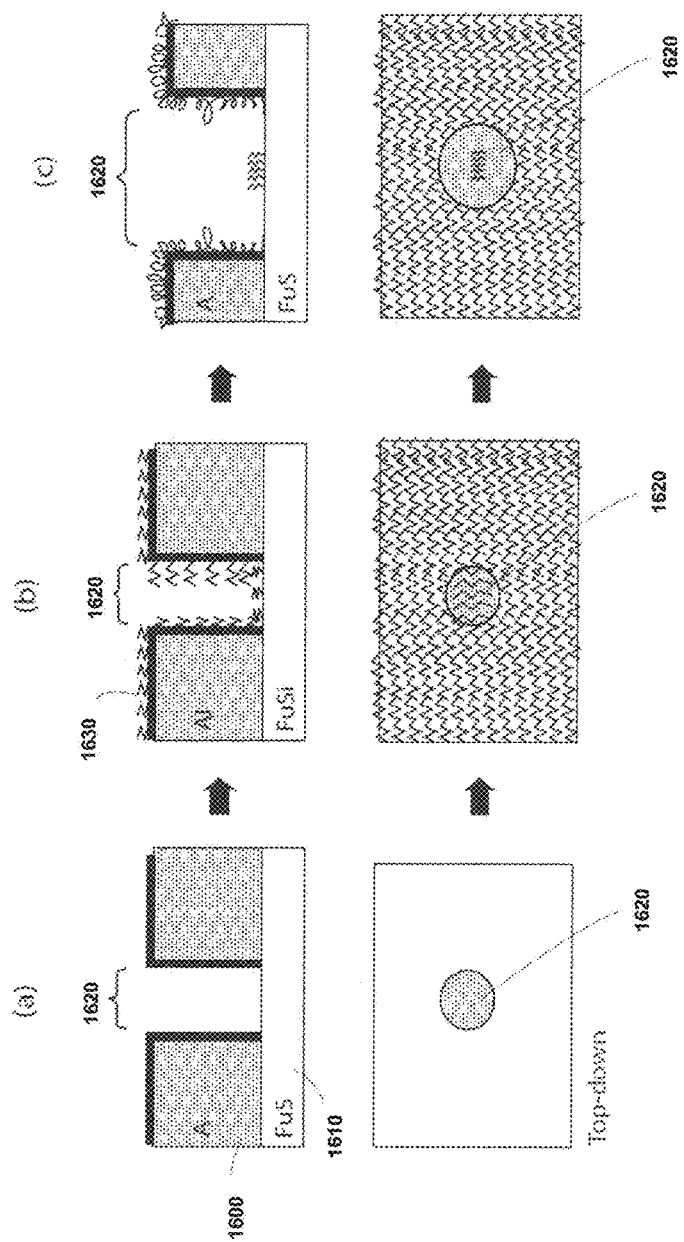
FIG. 16 shows an example schematic of a chemical polishing process used to form an analyte binding site at the bottom of a ZMW or other array reaction region.

Chemically Polishing a ZMW or Other Array Feature to Leave a Small Analyte Binding Site In one approach, chemical polishing is used to form an analyte binding site at the bottom of a ZMW or other array reaction region. FIG. 16 shows an example schematic of the process. An initial array of reaction regions 1620 (e.g., ZMWs) or other array features is formed in cladding material 1600 (e.g., Al) on substrate 1610 (e.g., a glass, quartz or silicon substrate). The initial cladding is thicker than the final desired thickness of the cladding in a final array, and reaction regions 1620 (e.g., holes in the cladding), etc., have a diameter smaller than the final desired array region (e.g., the holes are smaller than the ZMWs that form a ZMW array).

The first step in the process, shown in FIG. 16 subpanel (b), is to deposit functionalizing material 1630 such as peg-silane (e.g. biotin-peg-silane) on the surface of substrate 1610, which is covered in cladding material 1600 (additional details regarding suitable linking chemistries is found herein). The functionalizing material deposits on the aluminum as well as on the glass or silicon surface at the bottom of holes 1620 in the cladding material, but is removed during chemical polishing.

The polish step is provided by an immersion of the functionalized cladded substrate into a phosphonic acid bath at elevated temperature (e.g. polyvinyl phosphonic acid at 90° C.). The acid uniformly etches (e.g., aluminum) cladding 1600. The surface at the bottom of the holes, e.g., glass, fused silicon, quartz, or the like, is not susceptible to corrosion in phosphonic acid. The resulting structure, shown in FIG. 16 subpanel (c), consists of a phosphonate treated ZMW (or other feature) array with a functionalized center having a larger diameter as the original hole through the cladding. By controlling initial cladding thickness, material, and hole-diameter, it is possible to yield a very small functionalized area in the center of the fused silica surface. The size of the functionalized region can be small enough that only a single appropriately functionalized analyte can bind to the small functionalized region. For example, if the analyte is on the order of 10-15 nm in diameter, the functionalized region can be on the order of, or less than, e.g., about 10-25 nm or less.

Such a surface is an ideal platform for achieving super-Poisson loading of a single active analyte (e.g., polymerase) in the bottom of an otherwise passivated ZMW. If the functionalized area is small enough, then only one, e.g., polymerase, is able to bind within each ZMW.

Deposition of a Small Analyte Binding Site in an Array Feature Such as a ZMW by Evaporation In one embodiment, an evaporation strategy is used to leave a functionalized region in the center of a ZMW or other array feature. The ZMW holes of the array are filled with one drop each of a solvent (water or other solvent appropriate to the functionalization chemistry) containing a low concentration of solute. The solute is a linker molecule capable of binding both the surface and the analyte (e.g., capable of binding to a DNA polymerase). As the drop evaporates from the outside to the center, the linker is concentrated in the middle of the ZMW or other array feature. Eventually the linker precipitates in the center of the ZMWs of the array. The linker can be chemically absorbed to the ZMW by heating, exposure to light, or any other appropriate linker fixation method. By optimizing the concentration of linker and solvent it is possible to form a very small region of the linker in the ZMW or other feature, e.g., small enough that only a single molecule of analyte can bind to the region.

The polymerase or other analyte is deposited into the ZMW or other array feature, e.g., by flowing the analyte onto the array. Free analyte is washed away, leaving an analyte bound to the center of the ZMW.

Tilted Angle Evaporation

Figure 17:
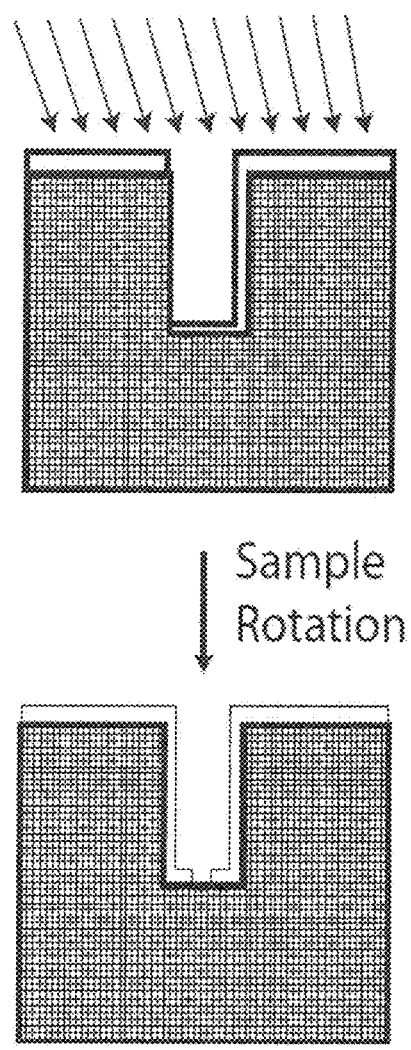
FIG. 17 provides a schematic of a tilted angle evaporation embodiment for forming a functionalized region in a center of a ZMW.

In a variant of the above method, tilted angle evaporation is used to mask off a portion of an array feature (e.g., to mask off a portion of a bottom surface of a ZMW), leaving a small unmasked region that can be functionalized for analyte binding. The resulting functionalized region can be small enough that only a single analyte can bind to the region. In this embodiment, evaporation of a coating is performed in the array feature (e.g., in the ZMWs of the array). If the sample is tilted in an evaporator, a portion of the bottom of the ZMW is left uncovered by the coating. If the sample is rotated during the evaporation (FIG. 17), it is possible to form an uncoated island in the center of the ZMW that does not contain the coating (this approach typically leaves the center of the bottom of the ZMW uncoated, which is desirable). A binding site for the analyte (e.g., polymerase) can then be added to the island. The binding site only attaches to the bottom of the ZMW or other array feature in the region of the uncoated island, i.e., the coating on the rest of the bottom blocks functionalization of the coated regions. The binding site can be small enough so that only a single polymerase or other analyte will easily bind to it.

Non-Random Loading

One preferred aspect of the invention includes the non-random (and non-Poisson limited) delivery of nucleic acids, enzymes and other analytes into the wells or other reaction regions of an array. In general, the analytes (and/or array components) of the invention can be configured so that a single analyte (or other desired number of analytes) is delivered per region. This can be achieved in any of several ways as described herein, including by coupling moieties to the analytes to sterically and/or electrostatically prevent loading of more than one analyte, or, e.g., by incorporating a single binding site for the analyte into the array region, or, e.g., by iterative loading of analytes, or, e.g., by actively controlling loading of the analyte, or, e.g., by temporarily or permanently configuring features of the array to control analyte loading. These and other procedures are discussed in detail herein. The methods herein permit substantially more complete loading of single molecule analytes into arrays than is typical for random loading approaches, in which single molecule distributions of analyte are produced by underloading the array as a whole. As has been noted, random distribution of analytes into the array results in one or fewer analytes being loaded into most reaction/observation volumes only when fewer than about 36% of all observation volumes are loaded. This type of Poisson-limited analyte loading results in few enough molecules being added to the array so that a Poisson-style random statistical distribution of the analyte molecules into the array results in one or fewer analytes per observation volume (in most cases). Prior art yields for single-molecule occupancies of approximately 30% have been obtained for a range of ZMW diameters (e.g., 70-100 nm). See, Foquet (2008), herein. About 60% of the ZMWs in a ZMW array are not loaded (i.e., have no analyte molecules) using such random loading methods.

The various methods of the invention can provide a frequency of as high as 100% loading for the relevant analyte of interest. Such high loading efficiencies are possible, e.g., because the array does not typically accept and/or bind more than one analyte in an analysis region of the array (e.g., by distributing or fabricating one analyte binding particle per well, or one particle per analysis region of a well), or because delivery of the analyte to the well or other array region is controlled. By extending the appropriate incubation times and/or increasing the concentration of particles, more complete loading is achieved. One of skill can, of course, choose to load fewer than 100% of the wells of the array. Typical particle-based arrays of the invention can include greater than 30%, usually greater than 37% (the approximate Poisson random loading limit to achieve maximal single analyte molecule occupancy), typically 38% or more, often as much as 50% or more, and preferably as much as 60%, 70%, 80% or 90% or more of the wells of the array being loaded with a single molecule in an analysis region of each well (or, alternately, simply wells having a single analyte molecule per well). In some cases an analyte molecule that is immobilized comprises a biomolecule such as an enzyme which has an activity. Where an active biomolecule such as an enzyme is used, it is generally desired that the enzyme be active so that it can carry out its natural function, such as catalyzing a chemical reaction. The methods, substrates, and systems of the invention allow for not only achieving higher levels of single molecule loading within wells, but higher levels of loading of active single molecules. Thus, typically 38% or more, often as much as 50% or more, and preferably as much as 60%, 70%, 80% or 90% or more of the wells of the array being loaded with a single active molecule in an analysis region of each well. A wide variety of methods, systems and compositions for achieving non-random loading of particles are described herein.

The array feature to be loaded with analyte is dependent on the application at issue and the equipment available. Arrays can include features such as wells, depressions, grooves, waveguides, zero mode waveguides, chambers, microfluidic channels, trenches, magnetized regions, unmagnetized regions, etched structures, machined structures, masked or unmasked analysis regions, masks that permit access by the analyte to any analysis regions, arrangements of particles or other analyte binding sites in the array, arrangements of binding sites, located, e.g., at least 50 nm apart in the array, configured to bind individual analyte molecules, and many other features can be loaded with analyte according to the methods herein. The features can be arranged to provide a physical phase determining feature, e.g., a regular or decipherable pattern of locations into which the analyte is to be loaded. For example, the analyte molecules can be loaded into ZMWs or other features that are located in the array with a regular or selected spacing that places the features, e.g., at least 20 nm apart, at least 30 nm apart, at least 40 nm apart, at least 50 nm apart, at least 60 nm apart, at least 70 nm apart, at least 80 nm apart, at least 90 nm apart; at least 100 nm apart; at least 150 tint apart, at least 200 nm apart, at least 250 nm apart, at least 300 nm apart, at least 350 nm apart, at least 400 nm apart, at least 450 nm apart, or 500 nm or further apart. It should be appreciated that spacing of array features in the array can, of course be further apart, if desired, though this may decrease the density of the features of the array, which may reduce overall throughput of systems that comprise the array features. The phase determining feature can be simple location of the array features, e.g., spacing of the array features on center in a regularly arranged physical array of features, or can be a more complex logically decipherable arrangement, e.g., where the features of the array are arranged in a manner that uses optical masking of signals from the array, and/or data deconvolution algorithms to assign which features contribute to a "logical phase" of the array.

Particle and Other Sizing Moiety Regulated Delivery of Analytes to Arrays

Particles or other sizing moieties can be selected such that a single particle/moiety fits into a single well/observation volume (e.g., ZMW) of a small well array. Sizing methods for sizing array wells to receive the particles or moieties are discussed in more detail below; it is generally possible to control the size of wells to within a few nanometers with respect to diameter and depth; ZMW arrays on the order of 10 nm to greater than 200 nm can be achieved using available methods (see, e.g., Foquet et al (2008) "Improved fabrication of zero-mode waveguides for single-molecule detection" *Journal of Applied Physics* 103: 034301; Eid et al. (2008) "Real-Time DNA Sequencing from Single Polymerase Molecules" *Science* DOI: 10.1126/science.322.5905.1263b). Particle/moiety size is a function of the type of particle or other moiety that is used for packaging or binding to the analyte of interest.

Analytes

A variety of analytes or molecules of interest can be delivered to reaction/observation regions using the methods and compositions herein. These include enzyme substrates, nucleic acid templates, primers, etc., as well as polypeptides such as enzymes (e.g., polymerases).

A wide variety of nucleic acids can be analytes in the methods herein. These include cloned nucleic acids (DNA or RNA), expressed nucleic acids, genomic nucleic acids, amplified nucleic acids cDNAs, and the like. Details regarding nucleic acids, including isolation, cloning and amplification can be found, e.g., in Berger and Kimmel, *Guide to Molecular Cloning Techniques, Methods in Enzymology* volume 152 Academic Press, Inc., San Diego, Calif. (Berger); Sambrook et al., *Molecular Cloning—A Laboratory Manual* (3rd Ed.), Vol. 1-3, Cold Spring Harbor Laboratory, Cold Spring Harbor, New York, 2000 ("Sambrook"); *Current Protocols in Molecular Biology*, F. M. Ausubel et al., eds., Current Protocols, a joint venture between Greene Publishing Associates, Inc. and John Wiley & Sons, Inc; Kaufman et al. (2003) Handbook of Molecular and Cellular Methods in Biology and Medicine Second Edition Ceske (ed) CRC Press (Kaufman); and *The Nucleic Acid Protocols Handbook* Ralph Rapley (ed) (2000) Cold Spring Harbor, Humana Press Inc (Rapley).

Similarly, a wide variety of proteins, e.g., enzymes, can also be delivered using the methods herein. The types of proteins can be binding proteins that can be analyzed for binding with substrates in solution. These can comprise, for example receptor proteins and proteins that are potential targets for drugs. A variety of protein isolation and detection methods are known and can be used to isolate enzymes such as polymerases, e.g., from recombinant cultures of cells expressing the recombinant polymerases of the invention. A variety of protein isolation and detection methods are well known in the art, including, e.g., those set forth in R. Scopes, *Protein Purification*, Springer-Verlag, N.Y. (1982); Deutscher, *Methods in Enzymology Vol. 182: Guide to Protein Purification*, Academic Press, Inc. N.Y. (1990); Sandana (1997) *Bioseparation of Proteins*, Academic Press, Inc.; Bollag et al. (1996) *Protein Methods, 2$^{nd}$ Edition* Wiley-Liss, NY; Walker (1996) *The Protein Protocols Handbook* Humana Press, NJ, Harris and Angal (1990) *Protein Purification Applications: A Practical Approach* IRL Press at Oxford, Oxford, England; Harris and Angal *Protein Purification Methods: A Practical Approach* IRL Press at Oxford, Oxford, England; Scopes (1993) *Protein Purification: Principles and Practice* 3$^{rd}$ *Edition* Springer Verlag, NY; Janson and Ryden (1998) *Protein Purification: Principles, High Resolution Methods and Applications, Second Edition* Wiley-VCH, NY; and Walker (1998) *Protein Protocols on. CD-ROM* Humana Press, NJ; and the references cited therein. Additional details regarding protein purification and detection methods can be found in Satinder Ahuja ed., *Handbook of Bioseparations*, Academic Press (2000). Sambrook, Ausubel, Kaufman, and Rapley supply additional useful details.

The enzyme can be any suitable enzyme that can operably be coupled to a surface. Examples include polymerases, DNA polymerases, RNA polymerases, reverse transcriptases, helicases, kinases, caspases, phosphatases, terminal transferases, endonucleases, exonucleases, dehydrogenases, proteases, beta-lactamases, beta-galactosidases, and luciferases. Examples of suitable enzymes include a Taq polymerase, an exonuclease deficient Taq polymerase, an *E. coli* DNA Polymerase 1, a DNA polymerase Klenow fragment, a reverse transcriptase, a wild type Φ29 polymerase, a mutant Φ29 polymerase, an exonuclease deficient Φ29 polymerase, a T7 DNA polymerase, and a T5 DNA polymerase.

For a description of polymerases and other enzymes that are active when bound to surfaces, which is useful in single molecule sequencing reactions in which the enzyme is fixed to a surface (e.g., to a particle or to a wall of a reaction/observation region, e.g., in a ZMW), e.g., conducted in a ZMW, see Hanzel et al. ACTIVE SURFACE COUPLED POLYMERASES, WO 2007/075987 and Hanzel et al. PROTEIN ENGINEERING STRATEGIES TO OPTIMIZE ACTIVITY OF SURFACE ATTACHED PROTEINS, WO 2007/075873). For a description of polymerases that can incorporate appropriate labeled nucleotides, useful in the context of sequencing, see, e.g., Hanzel et al. POLYMERASES FOR NUCLEOTIDE ANALOGUE INCORPORATION, WO 2007/076057. For further descriptions of single molecule sequencing applications utilizing ZMWs, see Levene et al. (2003) "Zero Mode Waveguides for single Molecule Analysis at High Concentrations," *Science* 299: 682-686; Eid et al. (2008) "Real-Time DNA Sequencing from Single Polymerase Molecules" *Science* DOI: 10.1126/science.322.5905.1263b; Korlach et al. (2008) "Selective aluminum passivation for targeted immobilization of single DNA polymerase molecules in zero-mode waveguide nanostructures" *Proceedings of the National Academy of Sciences U.S.A.* 105(4): 1176-1181; Foquet et al. (2008) "Improved fabrication of zero-mode waveguides for single-molecule detection" *Journal of Applied Physics* 103, 034301; "Zero-Mode Waveguides for Single-Molecule Analysis at High Concentrations" U.S. Pat. Nos. 7,033,764, 7,052,847, 7,056,661, and 7,056,676, the full disclosures of which are incorporated herein by reference in their entirety for all purposes.

Particles and Other Sizing Moieties

Sizing moieties such as particles can include either biological or non-biological particle materials (or both). Thus, viral components are included within the definition of particles for purposes of the present invention as discussed above. In general, particles or other sizing moieties to be delivered to the arrays of the invention can be formed of any discrete material that can be coupled/associated, at least temporarily, to or with an analyte (e.g., a DNA, or an enzyme such as a polymerase) of interest, for delivery to the array of interest. Useful particles include a variety of polymer and ceramic beads, self-assembling structures such as nucleic acid origami (discussed in more detail herein), as well as metal, glass, teflon, or silica particles. PEG or other large polymers can also be used to provide an appropriate particle/sizing moiety. For example, polymers, proteins, nucleic acids, polymer beads, silica beads, ceramic beads, glass beads, magnetic beads, metallic beads, and organic resin beads can be used to provide particles in the context of the invention. The particles can have essentially any shape, e.g., spherical, helical, spheroid, rod shaped, cone shaped, disk shaped, cubic, polyhedral or a combination thereof. Optionally, they are configured to fit individually into the relevant well (e.g., ZMW) of the relevant array; the shape of the relevant particle can also be used to orient the particle in the relevant well, e.g., by shaping the walls of the well to conform to the particle. Particles can optionally be coupled to any of a variety of reagents that facilitate surface attachment of the analyte, e.g., affinity matrix materials, or the like, e.g., nucleic acid synthesis/coupling reagents, peptide synthesis/coupling reagents, polymer synthesis reagents, nucleic acids, nucleotides, nucleobases, nucleosides, peptides, amino acids, various monomers, biological sample materials, synthetic molecules, or combinations thereof. In addition to delivering the analyte of interest, particles optionally serve a variety of other purposes within the arrays of interest, including acting as "blank" or other control particles, calibration particles, sample delivery particles, reagent particles, test particles, etc.

The particles as used herein typically comprise a core, for example of island material, and a shell. The whole particle including the core and the shell is sized such that it can be delivered to the confined regions with one particle being delivered to one region. This can be accomplished, for example, by sizing the particle appropriately for fit into the confined region. The conditions under which the particle is delivered, such as the concentration of particles in solution, the mode of deposition, and the time and temperature of deposition, can also be controlled such that a high percentage of confined regions only have one particle. Once the particles are delivered in a single particle to confined region manner, the shell of the particle can be removed in order to deposit the core material into the confined region. For example, the shell can comprise an organic material such as a polymer which can be dissolved or degraded from the core, depositing the core within the confined region. The conditions of the removal of the shell can be controlled such that the core is deposited into a central region within the confined region, producing an island of the core material within the confined region, such as a well or ZMW. In some cases, the analyte will be on the core prior to deposition. In other cases, the analyte will be attached to the core after the core is deposited as an island. For example, the core can be selected to form an island having a size such that generally only one analyte molecule or only one active analyte molecule will be attached to a single island due to steric constraints.

Particles and other sizing moieties are sized to fit, optionally individually, into the array reaction/observation site (e.g., reaction/observation portion of a ZMW or other well). Accordingly, particles will range in size, depending on the application, e.g., from about 1-500 nm in least one cross-sectional dimension. Typical sizes in ZMW applications will range from about 5 nm to about 150 nm in at least one dimension, e.g., about 25 to about 100 nm. In one useful embodiment, useful particles are about 50 nm to about 100 nm in at least one dimension. It is understood that a polymeric coating in solution will tend to extend into the solution, such that the outer boundary of the particle is not a solid wall. In some cases the size of the particle can be represented by its hydrodynamic radius.

The particles of the arrays of the invention can comprise essentially any material which can be moved into the array wells (e.g., ZMWs). Example particles include viral particles, as well as self-assembling structures, large nucleic acid or polypeptide complexes (including e.g., ribosomes), polymeric, ceramic or metallic particles, beads, and the like. For example, polymer beads (e.g., polystyrene, polypropylene, latex, nylon and many others), silica or silicon beads, ceramic beads, glass beads, magnetic beads, metallic beads and organic compound beads can be used. An enormous variety of particles are commercially available, e.g., those typically used for chromatography (see, e.g., Catalogs from Sigma-Aldrich (Saint Louis, Mo.), Supelco Analytical (Bellefonte, Pa.; sold, e.g., through Sigma-Aldrich), as well as those commonly used for affinity purification (e.g., the various magnetic Dynabeads™, which commonly include coupled reagents) supplied e.g., by Invitrogen. For a discussion of matrix materials see also, e.g., Hagel et al. (2007) *Handbook of Process Chromatography, Second Edition: Development, Manufacturing, Validation and Economics,* Academic Press; 2nd edition ISBN-10: 0123740231; Miller (2004) *Chromatography: Concepts and Contrasts* Wiley-Interscience; 2nd edition ISBN-10: 0471472077; Satinder Abuja (2002) *Chromatography and Separation Science (SST)* (*Separation Science and Technology* Academic Press, ISBN-10: 0120449811; Weiss (1995) *Ion Chromatography* VCH Publishers Inc.; Baker (1995) *Capillary Electrophoresis* John Wiley and Sons; Marcel Dekker and Scott (1995) *Techniques and Practices of Chromatography* Marcel Dekker, Inc.

Delivering Particles to Arrays

Particles can be delivered to an array by methods that are generally used to deliver analyte molecules to the array. For example, delivery methods can include suspending the particles in a fluid and flowing the resulting suspension into the wells of the array. This can include simply pipetting the relevant suspension onto one or more regions of the array, or can include more active flow methods, such as electro-direction or pressure-based fluid flow. In one useful embodiment, the particles are flowed into selected regions of the array, e.g., where a particular particle type is to be analyzed in a particular region of the array. This can be accomplished by masking techniques (applying a mask to direct fluid flow), or by active flow methods such as electro-direction or pressure based fluid flow, including by ink jet printing methods. Ink jet and other delivery methods for delivering nucleic acids and related reagents to arrays is found, e.g., in Kimmel and Oliver (Eds) (2006) *DNA Microarrays Part A: Array Platforms & Wet-Bench Protocols, Volume* 410 (Methods in Enzymology) ISBN-10: 0121828158; Lee (2002) *Microdrop Generation (Nano- and Microscience, Engineering, Technology and Medicine)* CRC Press ISBN-10: 084931559X; and Heller (2002) "DNA MICROARRAY TECHNOLOGY: Devices, Systems, and Applications" *Annual Review of Biomedical Engineering* 4: 129-153. Microfluidic flow can also be used for analyte delivery; these approaches are discussed in more detail herein. Regions of an array can also be selective targets of delivery simply by pipetting the relevant suspension into the correct region of the array.

The arrays can incorporate or interface with fluid channels, e.g., microchannels that can control or direct fluid flow into selected regions of the array. Alternately, the fluid delivery methods can be discrete from the array itself, e.g., using a print head, manual pipettor or robotic pipettor system. A variety of automated fluid delivery systems are available and can readily be used in the context of the invention.

Iterative Analyte Loading

In one class of embodiments, high densities of single molecule analytes in array reaction regions such as ZMWs of a ZMW array are achieved through iterative loading procedures. In general, these procedures include performing a first loading cycle, e.g., using standard random analyte loading methods, followed by a subsequent loading cycle that targets regions of the array that were not loaded in the first loading cycle. These iterative loading procedures can be repeated until essentially complete single molecule loading into all desired array regions is achieved.

In general, after each loading cycle, the presence of the analyte of interest is detected, e.g., through an activity assay (e.g., by detecting a SMS sequencing reaction), or via detection of a label bound to the analyte. Regions that do not comprise the analyte are targeted for additional loading, e.g., by directing flow to those regions (e.g., using microfluidic flow or optical or electrical trapping as described herein), or simply by masking the loaded regions and loading unmasked regions.

For example, random loading methods that result in a standard statistical distribution of analytes into array regions can be performed. For example, polymerase loading can be performed, using a fluorescently labeled polymerase (or using any other type of detectable label). After deposition, the array is imaged (the labels are detected) to detect which array regions (e.g., which ZMWs) contain only one polymerase (single versus multiple loading can be differentiated by the magnitude of the label signal at each array site). A mask is created, e.g., using lithographic methods as discussed herein, with the mask protecting those array regions (e.g., ZMWs) that contain only one polymerase. The remaining ZMWs are washed out to remove polymerases from multiply-loaded ZMWs. This process can be repeated until essentially all of the array regions are loaded with analyte. For example, after two rounds, ~60% of ZMWs can contain only one polymerase (if loading proceeds using standard Poisson statistics, about 0.37+0.37*0.63). After three rounds, ~75% of ZMWs will contain only one polymerase. After four rounds, ~84%. After five rounds, ~90%. After six rounds, ~94% loading is achieved. If desired, the label can be cleaved from the polymerase before starting a sequencing or other reaction.

Alternatively, each step could utilize sub-Poisson loading (e.g., below the ~37% Poisson limit) to ensure that there are virtually no multiply-loaded ZMWs in each reaction cycle. In this case, it is not necessary to differentiate between singly and doubly loaded array regions—instead, all of the labeled reaction sites can be masked, and the loading process repeated on unlabeled sites.

Enrichment of Active Analytes

Typical analyte samples contain active and inactive forms of the analyte. For example, a typical solution of polymerase enzyme contains many copies of active and inactive molecules of polymerase. In bulk solution assays, where there are many copies of the analyte that can act in the reaction, this is not generally a significant issue—at most, it may be useful to normalize the activity of the analyte for quantitative purposes. However, in single molecule assays, the presence of a fraction of inactive molecules in a source of analyte molecules that is used to form single molecule reactions is undesirable, because the presence of an inactive analyte molecule in a given single molecule reaction effectively kills that reaction.

Thus, it is desirable to have a source of analytes that is enriched in active analyte molecules. For example, it is useful to form single molecule sequencing reactions using an enriched population of polymerases that is, e.g., capable of DNA extension so that all polymerase molecules immobilized in a SMS reaction are functional. Improperly active analytes such as some defective polymerases can also have undesirable features beyond simple inactivity, e.g., increased binding of labeled analogs, which can confound readout of SMS reactions; accordingly, it is also useful to actively eliminate improperly active as well as inactive analytes.

In general, any of a variety of screening steps to negatively select improperly active analytes, combined with positive screening steps to isolate active enzymes can be used to achieve active analyte enrichment. For example, polymerases that bind, but do not release a template can be negatively selected, while polymerases that bind and extend a template can be selected for. Polymerases that do not bind template at all can be negatively selected. Centrifugation, or simple size or affinity purification to isolate template bound from non-template bound fractions can be used to purify active enzyme from inactive enzyme. Similar approaches can be used to select for or against template nucleic acids to be sequenced, e.g., by separating cross-linked from non-crosslinked nucleic acids, or the like.

In one example, the invention provides a protocol to enrich fraction of active polymerase (e.g., Phi29 polymerase) in a given sample. The polymerase sample is first incubated with a "double headed template" with a FAM or hapten conjugated at 5' ends of oligos. Concentration of polymerase and template is to be at least about 10×Kd of the template-Pol dissociation constant, with polymerase at slight excess to ensure close to 100% binding of template. Functional polymerase molecules bind template, but non-functional, inactive polymerase or contaminating proteins do not. Bead conjugated to FAM antibody (or another antibody that binds to the hapten) is mixed and centrifuged, and supernatant is discarded to remove non-functional (non-template binding) proteins. The bead is resuspended and reagents for DNA extension are added (divalent metal. dATP, dCTP, dGTP, dTTP) along with a trap molecule, either DNA or heparin, at a concentration that is several times in excess of the double-headed templates. The reaction is allowed to proceed for a few minutes to allow the polymerase to extend the DNA. Active, productive polymerase catalyzes dNTP incorporation and extends the DNA and eventually dissociates from the template when it reaches the end of the (linear) double headed template. These active polymerase bind the trap molecule and do not rebind to any free "double head template". Non-productive or non-catalyzing polymerase remains bound to the template. Active, productive polymerase is separated by centrifugation, which pellets beads bound with nonproductive enzyme and template, leaving active, productive polymerase in the supernatant. Another method to enrich active polymerase is to use magnetic beads conjugated to trap molecules (DNA or heparin). The magnetic beads are added along with reagents for DNA extension. Active polymerase which dissociates from the template binds to trap molecules on magnetic beads. Magnetic beads are then separated from the reaction mixture. Active polymerase are recovered by dissociating trap molecules, e.g., during dialysis.

Figure 18:
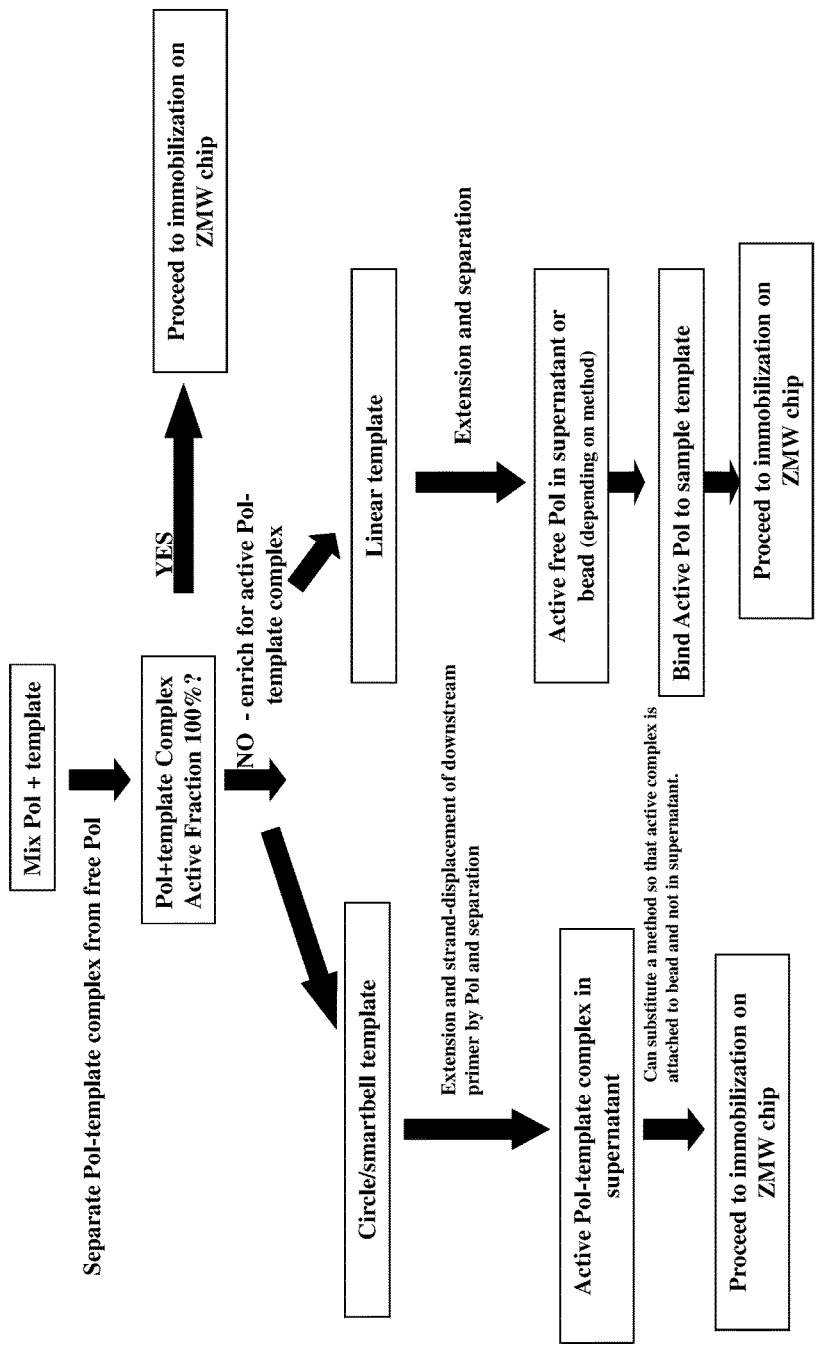
FIG. 18 provides an example flow chart for enrichment of active polymerases.
Figure 19A:
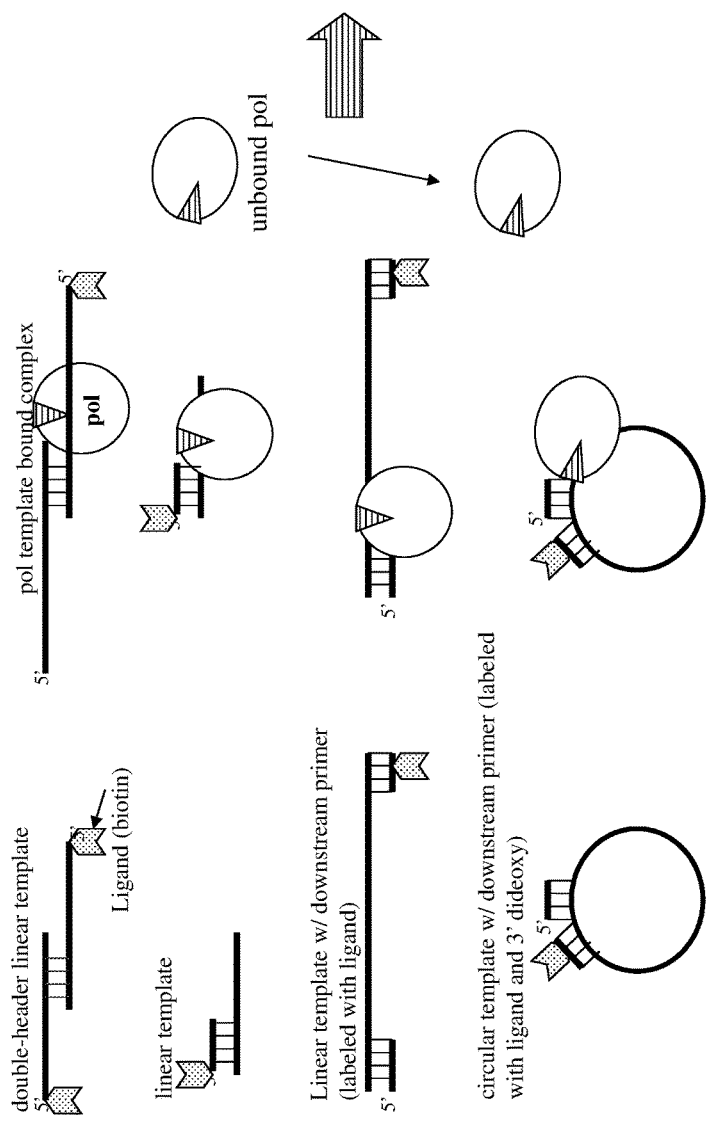
FIG. 19, panels A-B provide additional details regarding polymerase enrichment.

An example flow chart for enrichment of active polymerases, e.g., using phi29 as an example polymerase, is illustrated in FIG. 18. FIG. 19, panels A-B provides an example enrichment protocol. As illustrated, polymerase such as a phi29 polymerase can be enriched for the ability to bind to a template (linear, circular, etc.). Bound (active) and unbound (dead) polymerases are separated, e.g., by centrifugation. For example, the polymerase can be mixed with beads conjugated with receptor, e.g., streptavidin for biotin, antibody for FAM, and incubated. The beads are then pelleted and the supernatant, which contains unbound or inactive polymerase, discarded. Polymerization is initiated by adding dNTPs and divalent cation ($Mg^{++}$ or $Mn^{++}$) and active versus inactive polymerases are again separated, e.g., using centrifugation. In another example, engaged polymerases are more stable at 37° C. than are non-engaged polymerases, providing an additional enrichment selection scheme. A heat treatment before loading increases the proportion of productive polylnerase:template complexes, leading to improved loading. The addition of $Ca^{2+}$ ions and cognate nucleotide analogs can be used to further improve loading. Similarly, pre-forming and purifying a streptavidin-polymerase complex can be performed before template is added to further enhance loading of active polymerase.

Further Details Regarding Linking Chemistries

The binding surfaces and/or particles within the arrays of the invention can present a solid or semi-solid surface for any of a variety of available linking chemistries, allowing the binding of biological analytes of interest to the particle members to be distributed into the arrays. A wide variety of organic and inorganic polymers, both natural and synthetic can be employed as the material for the solid surface. Illustrative polymers include polyethylene, polypropylene, poly(4-methylbutene), polystyrene, polymethacrylate, poly (ethylene terephthalate), rayon, nylon, poly(vinyl butyrate), polyvinylidene difluoride (PVDF), silicones, polyformaldehyde, cellulose, cellulose acetate, nitrocellulose, and the like. Other materials that are employed, include papers, ceramics such as glass, fused silicon, quartz, metals such as gold, metalloids, semiconductive materials, cements or the like. In addition, substances that form matrixes, such as proteins (e.g., gelatins), lipopolysaccharides, silicates, agarose and polyacrylamides can also be used. Proteins can also provide particles, e.g., using antibodies that bind specific recognition components incorporated into the analyte of interest.

A wide variety of linking chemistries are available for linking molecules to a wide variety of molecular, solid or semi-solid particle support elements. These chemistries can be performed in situ (i.e., in the array) or prior to introduction of the particles into the array. It is impractical and unnecessary to describe all of the possible known linking chemistries for linking molecules to a solid support. It is expected that one of skill can easily select appropriate chemistries, depending on the intended application.

In one preferred embodiment, the particles or binding surfaces of the invention comprise silicate elements (e.g., glass or silicate beads). A variety of silicon-based molecules appropriate for functionalizing surfaces are commercially available. See, for example, *Silicon Compounds Registry and Review*, United Chemical Technologies, Bristol, Pa. Additionally, the art in this area is very well developed and those of skill will be able to choose an appropriate molecule for a given purpose. Appropriate molecules can be purchased commercially, synthesized de novo, or it can be formed by modifying an available molecule to produce one having the desired structure and/or characteristics.

A substrate linker attaches to the solid substrate through any of a variety of chemical bonds. For example, the linker is optionally attached to the solid substrate using carbon-carbon bonds, for example via substrates having (poly) trifluorochloroethylene surfaces, or siloxane bonds (using, for example, glass or silicon oxide as the solid substrate). Siloxane bonds with the surface of the substrate are formed in one embodiment via reactions of derivatization reagents bearing trichlorosilyl or trialkoxysilyl groups. The particular linking group is selected based upon, e.g., its hydrophilic/hydrophobic properties where presentation of an attached polymer in solution is desirable. Groups which are suitable for attachment to a linking group include amine, hydroxyl, thiol (e.g., in the case of gold particles), carboxylic acid, ester, amide, isocyanate and isothiocyanate. Preferred derivatizing groups include aminoalkyltrialkoxysilanes, hydroxyalkyltrialkoxysilanes, polyethyleneglycols, polyethyleneimine, polyacrylamide, polyvinylalcohol and combinations thereof.

By way of non-limiting example, the reactive groups on a number of siloxane functionalizing reagents can be converted to other useful functional groups:

1. Hydroxyalkyl siloxanes (Silylate surface, functionalize with diborane, and H2O2 to oxidize the alcohol);
    a. allyl trichlorosilane→→3-hydroxypropyl
    b. 7-oct-1-enyl tichlorchlorosilane→→8-hydroxyoctyl
2. Diol (dihydroxyalkyl) siloxanes (silylate surface and hydrolyze to diol)
    a. (glycidyl trimethoxysilane→→(2,3-dihydroxypyloxy)propyl
3. Aminoalkyl siloxanes (amines requiring no intermediate functionalizing step)
    a. 3-aminopropyl trimethoxysilane→aminopropyl
4. Dimeric secondary aminoalkyl siloxanes
    a. bis(3-trimethoxysilylpropyl)amine→bis(silyloxylpropyl)amine.

See, for example, Leyden et al., Symposium on Silylated Surfaces, Gordon & Breach 1980; Arkles, Chemtech 7, 766 (1977); and Plueddemann, Silane Coupling Reagents, Plenum, N.Y., 1982. These examples are illustrative and do not limit the types of reactive group interconversions which are useful in conjunction with the present invention. Additional starting materials and reaction schemes will be apparent to those of skill in the art.

The components that can be attached to a derivatized particle or binding surface include nucleic acids such as DNA, polypeptides (e.g., enzymes such as polymerases), mimetics, large and small organic molecules, polymers and combinations thereof. For example, moieties bearing a charge can be easily coupled to a particle. For example, the charged group can be a carboxylate, quaternary amine or protonated amine that is a component of an amino acid that has a charged or potentially charged side chain. The amino acids can be either those having a structure which occurs naturally or they can be of unnatural structure (i.e., synthetic). Useful naturally occurring amino acids include: arginine, lysine, aspartic acid and glutamic acid. Surfaces utilizing a combination of these amino acids are also of use in the present invention. Further, peptides comprising one or more residues having a charged or potentially charged side chain are useful coating components and they can be synthesized utilizing arginine, lysine, aspartic acid, glutamic acid and combinations thereof. Useful unnatural amino acids are commercially available or can be synthesized utilizing art-recognized methodologies, such as available systems of orthogonal elements. In those embodiments in which an amino acid moiety having an acidic or basic side chain is used, these moieties can be attached to a surface bearing a reactive group through standard peptide synthesis methodologies or easily accessible variations thereof. See, for example, Jones, Amino Acid and Peptide Synthesis, Oxford University Press, Oxford, 1992.

When proteins are attached to the particles or binding surfaces, it is also possible to subsequently attach a nucleic acid to the protein. For example, a variety of proteins that specifically bind to specific DNA sequences can be used to link DNAs to the particles or binding surfaces. Examples include capsid packaging proteins, as discussed above, as well as a variety of antibodies. Similarly, nucleic acids can be attached to particles and used to bind polypeptides of interest. Linkers can be added to the DNAs for purposes of linking to the proteins on the particles or binding surfaces, using the methods discussed above, e.g., in the context of adding packaging sites to the analyte nucleic acids.

Linking groups can also be placed on the particles of the invention. Linking groups of use in the present invention can have a range of structures, substituents and substitution patterns. They can, for example be derivatized with nitrogen, oxygen and/or sulfur containing groups which are pendent from, or integral to, the linker group backbone. Examples include, polyethers, polyacids (polyacrylic acid, polylactic acid), polyols (e.g., glycerol,), polyamines (e.g., spermine, spermidine) and molecules having more than one nitrogen, oxygen and/or sulfur moiety (e.g., 1,3-diamino-2-propanol, taurine). Specific examples of linkers that can link DNA and proteins include: (1) incorporating 06-benzylguanine analog(s) on DNA, and a SNAP-tag on the protein (Stein et al. (2007) "A Covalent Chemical Genotype-Phenotype Linkage for in vitro Protein Evolution." *Chembiochem* 8:2191-2194). Another known strong DNA-protein attachment that could be exploited is between the Ter sequence at DNA replication terminators and the Tus protein, as described by Coskun-Ari and Hill (1997) "Sequence-specific Interactions in the Tus-Ter Complex and the Effect of Base Pair Substitutions on Arrest of DNA Replication in *Escherichia coli*," JBC 272:26448-26456.

In one embodiment of the invention, the coupling chemistries for coupling materials to the particles of the invention are light-controllable, i.e., utilize photo-reactive chemistries. The use of photo-reactive chemistries and masking strategies to activate coupling of molecules to substrates, as well as other photo-reactive chemistries is generally known (e.g., for semi-conductor chip fabrication and for coupling biopolymers to solid phase materials). The use of photo-cleavable protecting groups and photo-masking permits type switching of particles, i.e., by altering the presence of substrates present on the array members (i.e., in response to light). Among a wide variety of protecting groups which are useful are nitroveratryl (NVOC)-methylnitroveratryl (Menvoc), allyloxycarbonyl (ALLOC), fluorenylmethoxycarbonyl (FMOC), -methylni.tro-piperonyloxycarbonyl (MeNPOC), —NH-FMOC groups, t-butyl esters, t-butyl ethers, and the like. Various exemplary protecting groups (including both photo-cleavable and non-photo-cleavable groups) are described in, for example, Atherton et al., (1989) Solid Phase Peptide Synthesis, IRL Press, and Greene, et al. (1991) Protective Groups In Organic Chemistry, 2nd Ed., John Wiley & Sons, New York, N.Y. The use of these and other photo-cleavable linking groups for nucleic acid and peptide synthesis on solid supports is a well-established methodology.

Tethering Particles to the Array

The particles can incorporate features that permit tethering of the particles to the wells of the array. Any of the applicable linking chemistries discussed herein in the context of fixing analytes to particles are applicable to the problem of linking/tethering the particles to the surfaces of the arrays. Devices, methods and systems that incorporate functionalized regions into the walls of a ZMW, e.g., by incorporating an annular gold ring into the walls of the ZMW, are described, e.g., in Foquet et al. SUBSTRATES AND METHODS FOR SELECTIVE IMMOBILIZATION OF ACTIVE MOLECULES (U.S. Ser. No. 60/905,786, filed Mar. 7, 2007 and U.S. Ser. No. 12/074,716, filed Mar. 5, 2008).

The particles can include appropriate functionalities for linking to the relevant array surface. For example, thiol chemistries can be used to link proteins to surfaces. Recombinant proteins such as viral capsid assemblies can also include unnatural amino acids with any of a variety of linking chemistries, e.g., when expressed in a host cell that includes orthogonal elements that permit site-specific expression of the unnatural amino acid. Systems of orthogonal elements that can be used to incorporate unnatural amino acids, including amino acids with reactive groups, are described in Wang, et al. (2006) "Expanding the genetic code." *Annu Rev Biophys Biomolec Struct* 35: 225-249; Wang and Schultz (2005) "Expanding the Genetic Code," *Angewandte Chemie Int. Ed.* 44(1):34-66; Xie, et al. (2005) "An expanding genetic code." *Methods* 36: 227-38; and Xie, et al. (2006) "A chemical toolkit for proteins: an expanded genetic code." *Nat Rev Mol Cell Biol* 7: 775-82.

In the context of particles, the site specific incorporation of an amino acid that comprises a reactive/linking group can be used to specifically orient the particle relative to the array well. For example, the array well can include a specific functionalized region (e.g., a gold band, as discussed above) that can be coupled to a specific portion of the particle. For example, where the particle is a viral particle, the tail or capsid can incorporate one or more reactive/linking groups to orient the capsid relative to the well (and/or relative to other assay components, such as surface immobilized enzymes, e.g., surface immobilized polymerases).

Reading the Analyte

In the embodiments herein, the analyte molecule is optionally complexed to a particle, binding site or other entity and analyzed in a reaction site, well, ZMW or other observation volume or region of the array. In the simplest case, this is accomplished simply by performing the relevant read reaction (e.g., a copy polymerization reaction using a polymerase); the analyte is optionally complexed to the particle, etc., during this readout. This is particularly practical where the particle or other coupled moiety does not inhibit the action of relevant readout components, such as a polymerase analyte acting on a DNA template analyte. In the case of some viral particles, including many bacteriophage, the polymerase can capture the analyte DNA, which may protrude from the capsid, and can pull it from the capsid as it synthesizes a complementary strand, e.g., during a sequencing reaction. Further, active enzymes can remain bound to particles, or can be transferred from a particle to a structure in the reaction/observation region. See Hanzel et al. ACTIVE SURFACE COUPLED POLYMERASES, WO 2007/075987 and Hanzel et al. PROTEIN ENGINEERING STRATEGIES TO OPTIMIZE ACTIVITY OF SURFACE ATTACHED PROTEINS, WO 2007/075873). Similarly, a polymerase or other readout enzyme can bind to other particle-bound analytes (e.g., enzyme substrates) and can act on them without separation from the particle. However, alternate approaches can also be used, in which an analyte is separated from the particle or other moiety before it participates in a relevant reaction.

Methods of separating the analyte from the particle are available in the context of the present invention. For example, a restriction enzyme can be used to cleave an analyte DNA from the particle, after it is delivered to an array well. Similarly, a polypeptide linker can be cleaved using a site-specific protease. In another approach, photo-cleavable linkers can be used to couple the analyte to the particle; upon exposure to light, the cleavable linker is cleaved, releasing the analyte. Linkers can also incorporate specifically cleavable linkages that cleave as a result of changing pH, presence of a cleavage molecule, or the like. A viral capsid can be digested away from the nucleic acid using either chemical or enzymatic methods after delivery of the capsid to the array well. Airy of these methods (or combinations thereof) can result in a controllable release of the analyte molecule from the particle of interest.

Once any necessary or desired separation of the analyte and anything it is bound to is performed, the analyte can be read or can participate in the system in any of the typical methods that are used to read the array during regular single molecule analyte monitoring. For example, in the case of sequencing in a ZMW, a polymerase can be bound in the waveguide in which the sequencing reaction is performed;

the incorporation of appropriately labeled nucleotides is used to determine sequences of the analyte nucleic acids. For a description of polymerases that can incorporate appropriate labeled nucleotides see, e.g., Hanzel et al. POLYMERASES FOR NUCLEOTIDE ANALOGUE INCORPORATION, WO 2007/076057. For a description of polymerases that are active when bound to surfaces, which is useful in single molecule sequencing reactions in which the enzyme is fixed to a surface, e.g., conducted in a zero mode waveguide, see Hanzel et al. ACTIVE SURFACE COUPLED POLYMERASES, WO 2007/075987 and Hanzel et al. Protein Engineering Strategies to Optimize Activity of Surface ATTACHED PROTEINS, WO 2007/075873). For further descriptions of single molecule sequencing applications utilizing ZMWs, see Levene et al. (2003) "Zero Mode Waveguides for single Molecule Analysis at High Concentrations," Science 299:682-686; Eid et al. (2008) "Real-Time DNA Sequencing from Single Polymerase Molecules" Science DOI: 10.1126/science.322.5905.1263b; U.S. Pat. Nos. 7,033,764, 7,052,847, 7,056,661, and 7,056,676, the full disclosures of which are incorporated herein by reference in their entirety for all purposes.

In general, analytes such as nucleic acids or polypeptides can be distributed into array wells using the methods described herein. Once the analytes are formatted into the appropriate wells, any of a variety of different analyte readout formats in current use can be used during analyte analysis. These include fluorescence measurement, epifluorescence measurements, and the like. For a discussion of array readout formats see, e.g., Kimmel and Oliver (Eds) (2006) *DNA Microarrays Part A: Array Platforms & Wet-Bench Protocols, Volume* 410 (Methods in Enzymology) ISBN-10: 0121828158; Kimmel and Oliver (Eds) (2006) *DNA Microarrays, Part B: Databases and Statistics Volume* 411 (Methods in Enzymology) ISBN-10: 0121828166; Alan R. Kahane et al. (2005) *Microarrays for an Integrative Genomics* MIT Press ISBN: 0262612100; Hardiman (2003) *Microarrays Methods and Applications (Nuts & Bolts series)* DNA Press, USA; Baldi and Hatfield (2002) *DNA Microarrays and Gene Expression* Cambridge University Press; ISBN: 0521800226; Bowtell and Sambrook (Eds) (2002) *DNA Microarrays: A Molecular Cloning Manual* David Paperback: 1st edition Cold Spring Harbor Laboratory; ISBN: 0879696257; *Microarrays and Related Technologies: Miniaturization and Acceleration of Genomics Research* (May 1, 2001) Cambridge Healthtech InstitutelSBN: B00005TXRM; Rampal (ed) (2001) *DNA Arrays: Methods and Protocols* (Methods in Molecular Biology, Vol 170 Humana Press, ISBN: 089603822X; Schena (2000) *Microarray Biochip Technology* Eaton Pub Co ISBN: 1881299376; and Schena (Editor) (1999) *DNA Microarrays: A Practical Approach* (Practical Approach Series) Oxford Univ Press, ISBN: 0199637768. In general, a variety of commercially available array readers exist, or can be modified to read the arrays of the invention.

EXAMPLES

Example 1

Dimensional Values for Producing Nanoscale Islands of Island Material

Figure 20:
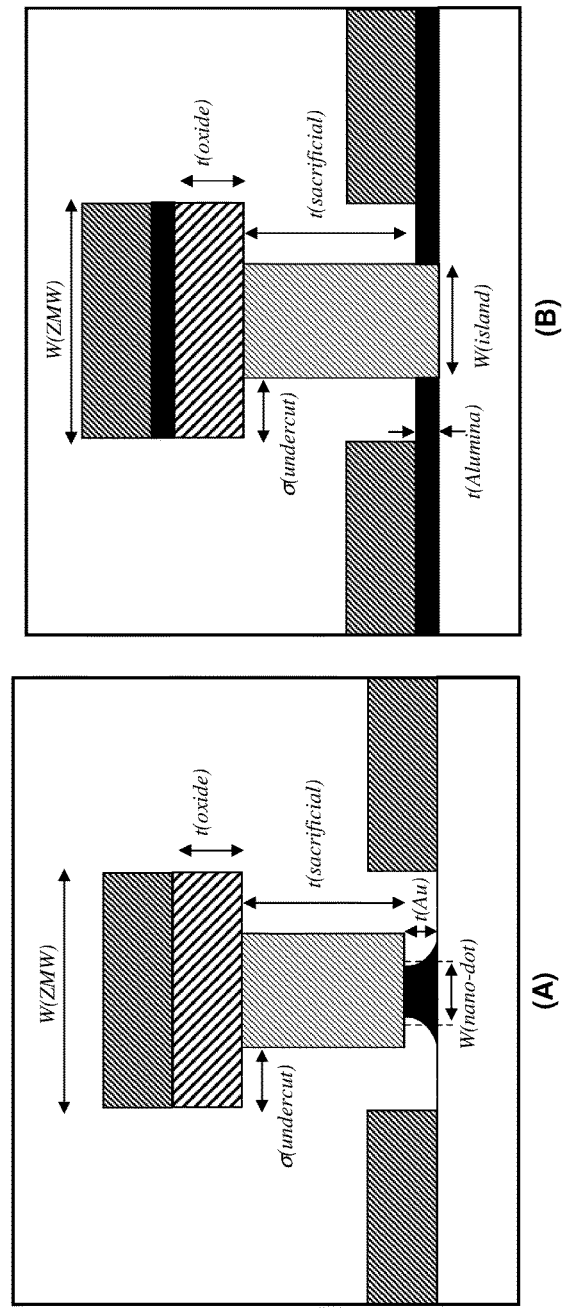
FIG. 20(A) shows a diagram outlining the dimensional elements for a method of the invention for forming nanodot islands.
FIG. 20(B) shows a diagram outlining the dimensional elements for a method of the invention for forming islands of transparent substrate.

The methods illustrated in FIG. 4 are directed to producing islands of nanodots within nanoscale apertures. FIG. 20A is a drawing illustrating the values of relevant dimensions for the process illustrated in FIG. 4. Table 1 below shows values for the parameters for producing a gold nanodot on the order of 10 nm in diameter. The size of the gold dot can be smaller than the diameter of the sacrificial pillar, due to undercut made during gold wet etching.

TABLE 1

|   | W(ZMW) | T(sacrificial) | t(oxide) | σ (undercut) | T(gold) | W(nano-dot) |
|---|--------|----------------|----------|--------------|---------|-------------|
| 1 | 100 nm | 200 nm | 50 nm | 35 nm | 10 nm | ≤10 nm |
| 2 | 120 nm | 200 nm | 50 nm | 45 nm | 10 nm | ≤10 nm |
| 3 | 140 nm | 200 nm | 50 nm | 55 nm | 10 nm | ≤10 nm |

Example 2

Dimensional Values for Producing Nanoscale Islands of Substrate Surface

The methods illustrated in FIG. 15 are directed to the formation of islands of substrate surrounded by an isolation layer within a nanoscale aperture. FIG. 20B provides a drawing illustrating the values of the dimensions for the process illustrated in FIG. 15. Table 2 shows values for the parameters for producing an island with a diameter on the order of 10 nm.

TABLE 2

|   | W(ZMW) | T(sacrificial) | t(oxide) | σ (undercut) | T(alumina) | W(island) |
|---|--------|----------------|----------|--------------|------------|-----------|
| 1 | 100 nm | 200 nm | 50 nm | 45 nm | 10 nm | ≤10 nm |
| 2 | 120 nm | 200 nm | 50 nm | 55 nm | 10 nm | ≤10 nm |
| 3 | 140 nm | 200 nm | 50 nm | 65 nm | 10 nm | ≤10 nm |

Example 3

Gold Nano-Dot Islands

Figure 21:
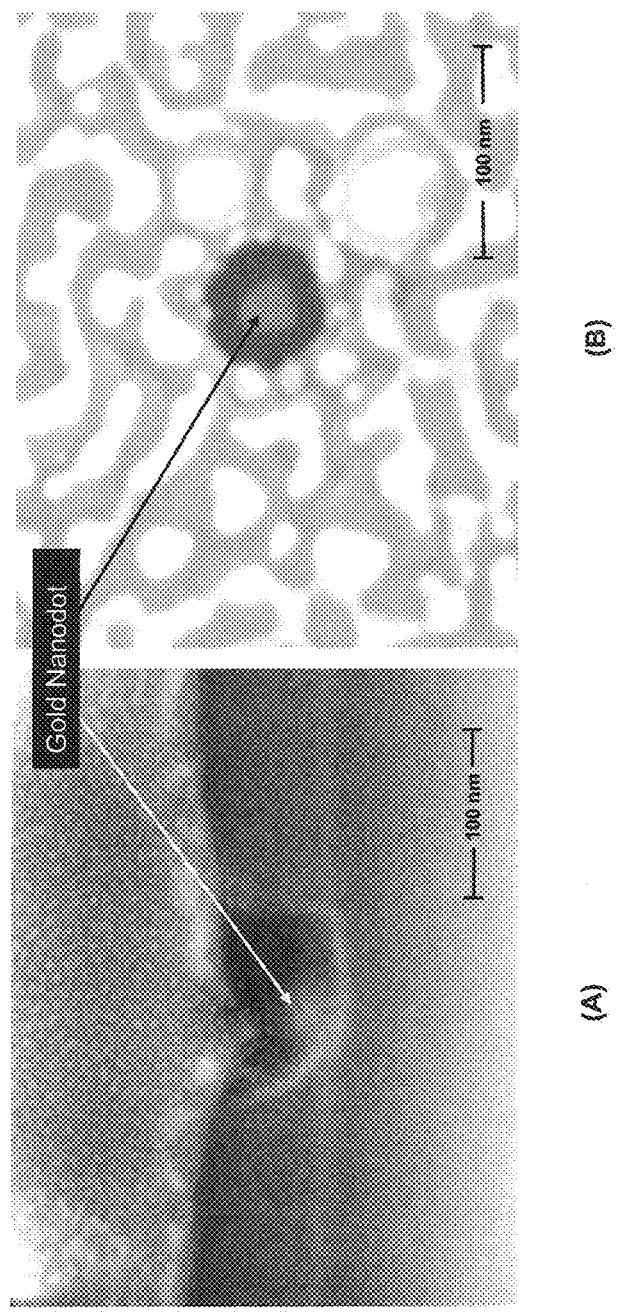
FIG. 21 shows a transmission electron micrograph image of a cross section of a ZMW having an island of substrate material.

FIG. 21 shows Scanning Electron Micrographs of representative apertures from an array of nanoscale apertures having gold dots disposed within them. The structures were formed using the method illustrated in FIG. 3. FIG. 21A shows a cross-section through a nanoscale aperture. FIG. 21B shows an SEM taken from above the nanoscale aperture showing the gold nanodot at the base of the aperture. Starting from a ZMW having 100 nm thick aluminum on fused silica substrate, 30 nm PECVD amorphous silicon was deposited at 300° C., followed by 7 nm gold/chrome evaporation at room temperature and 9 µTorr. The gold/chrome at the top of ZMW could be removed according to FIG. 3, or by tilted ion milling of gold. Finally, the sacrificial layer was removed in XeF2.

Example 4

Island of Exposed Substrate Surrounded by Isolation Layer

Figure 13:
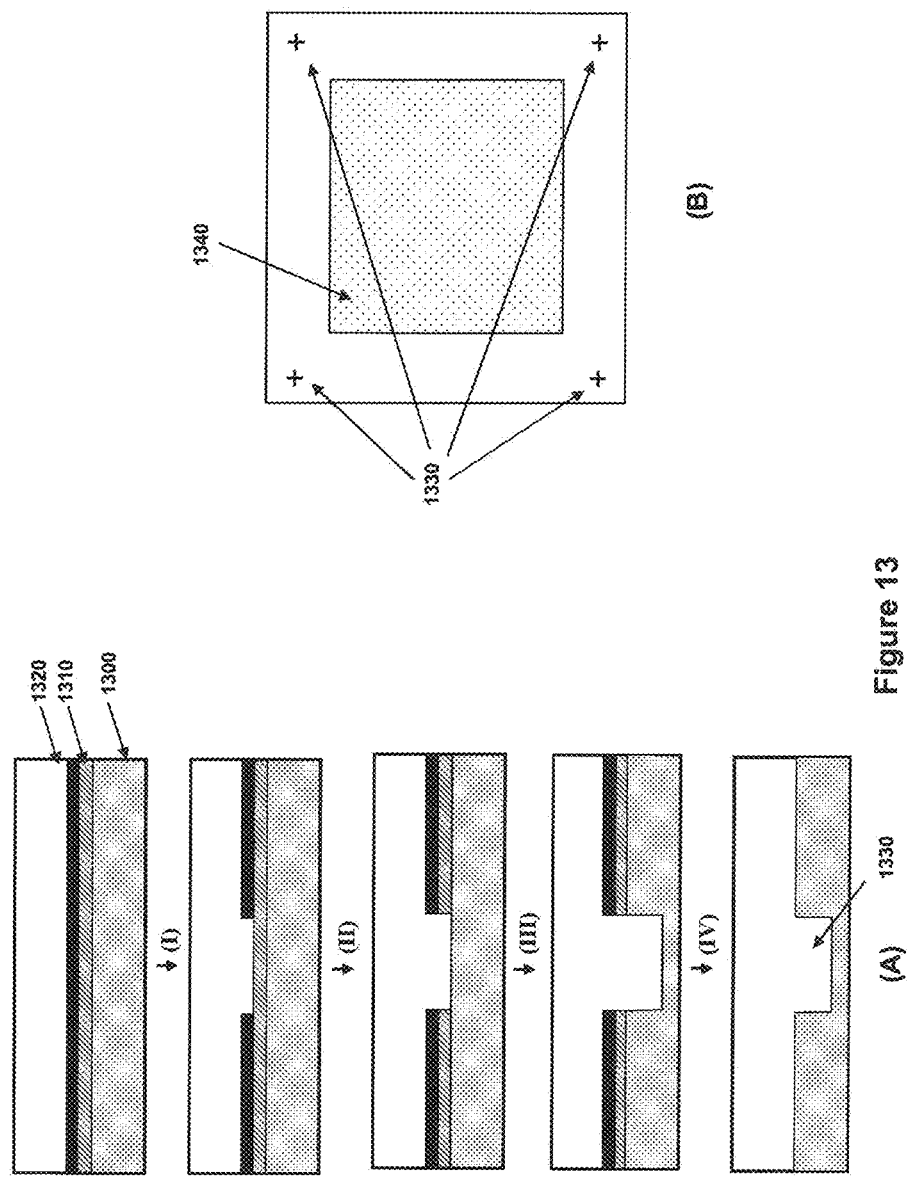
FIG. 13 shows an example of a schematic for forming alignment features.
Figure 22:
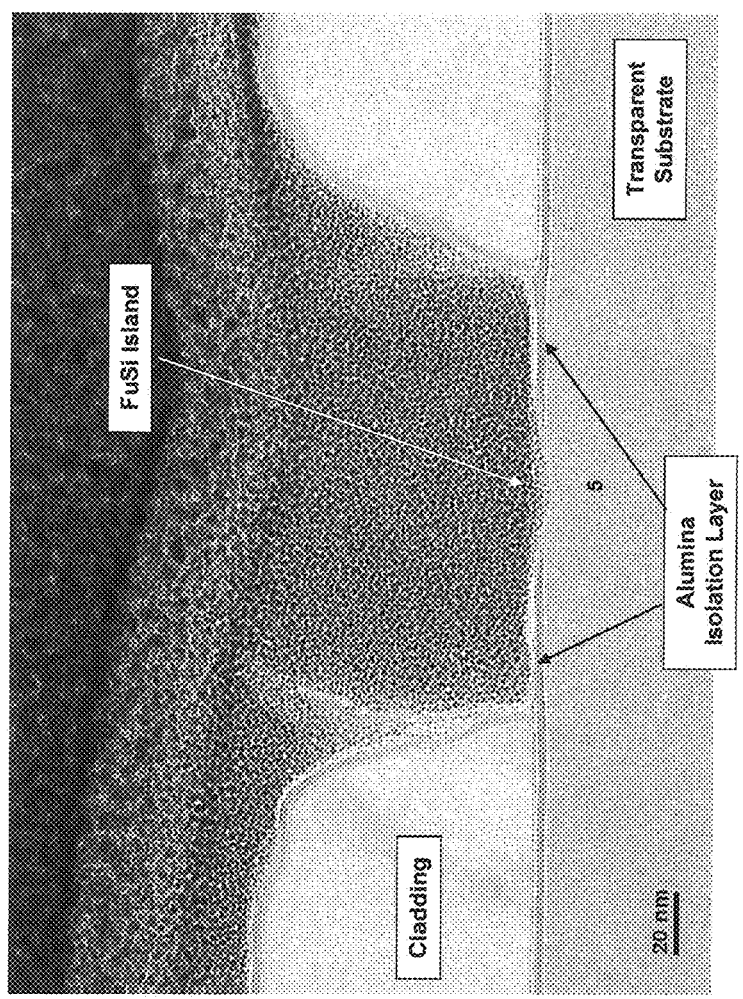
FIG. 22 shows a transmission electron micrograph image of a cross section of a ZMW having an island of exposed fused silica substrate at its center surrounded by an aluminum isolation layer.

FIG. 22 shows a Transmission Electron Micrograph of a cross-section of an aperture having an island of exposed substrate (fused silica) surrounded by isolation layer (aluminum oxide). The structure was formed by a process as illustrated in FIG. 12 and FIG. 13. Aluminum is deposited onto a fused silica substrate. On top of the aluminum is deposited a layer of e-beam resist ZE.P520A. The resist is developed to produce four cross-shaped registration marks on the substrate outside of the region in which the apertures will be formed. The width of the lines making up the alignment marks is about 5 microns. A chlorinated plasma reactive ion etch is used to etch the exposed portions of the aluminum layer. A fluorine plasma is then used to etch the exposed portions of the fused silica using the aluminum as a hard mask. The etch extends about 1 micron into the fused silica substrate. The resist and aluminum are then removed. The aluminum is removed and the surface cleaned using a Piranha etch.

Onto the substrate having the registration marks is deposited a layer of aluminum oxide using atomic layer deposition (ALD) at thickness of about 5 nm. An E-beam resist ZEP520A is then deposited onto the aluminum oxide layer. The resist is patterned, developed, and the alumina layer etched with a chlorine ME plasma to form nanopits of about 30-40 nm in diameter. The resist is removed using an oxygen plasma, and wet cleaning, using 1165 solvent. A negative resist NEB31 is deposited, patterned, and developed to form pillars which define the nanoscale apertures on top of the nanopits. The pillars are aligned to the nanopit structures using the registration marks. Aluminum is then deposited using thermal or electron gun deposition. A solvent, for example 1165 is used to dissolve the resist pillars and lift-off portion of the cladding on the pillar to produce the structure shown in FIG. 22. It can be seen in FIG. 22 that the etching of the nanopit extends several nanometers into the fused silica substrate.

Example 5

Island of Exposed Substrate Surrounded by Isolation Layer

Figure 23:
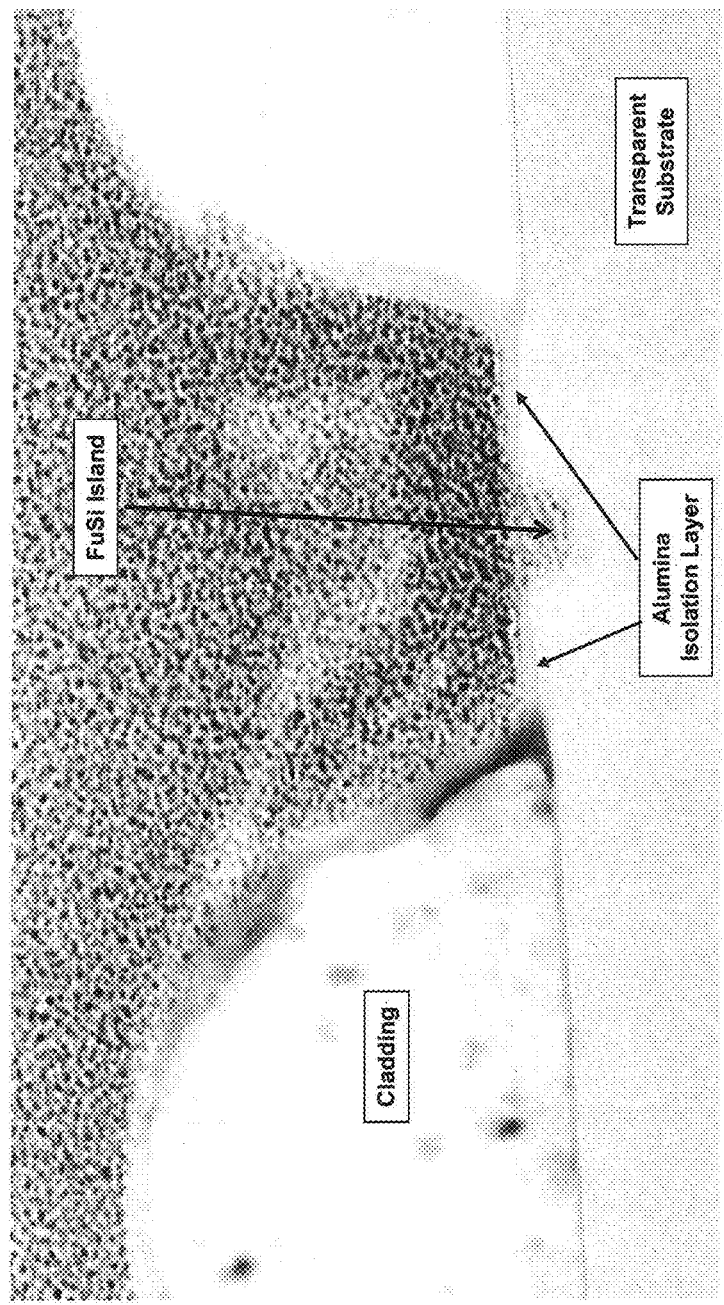
FIG. 23 shows a transmission electron micrograph image of a cross section of a ZMW having an island of exposed fused silica substrate at its center surrounded by an aluminum isolation layer.
Figure 24:
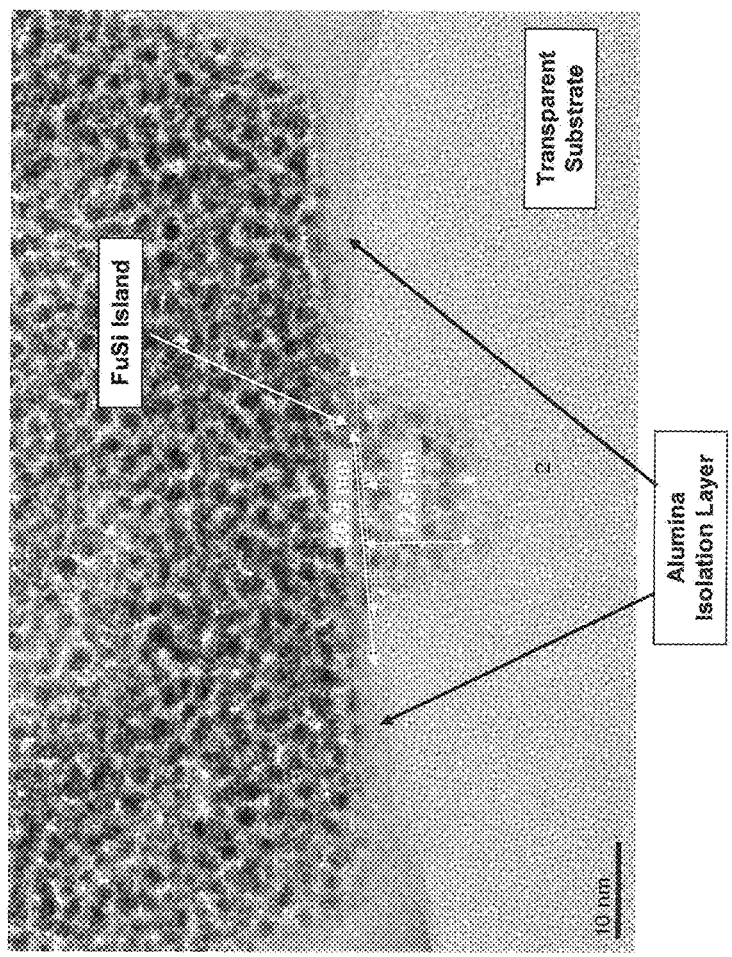
FIG. 24 shows a transmission electron micrograph image of a cross section of a ZMW having an island of exposed fused silica substrate at its center surrounded by an aluminum isolation layer including the dimensions of the island.

FIGS. 23 and 24 show transmission electron micrographs of cross-sections of nanoscale apertures (ZMWs) having an island of fused silica surrounded by an isolation layer of aluminum oxide. These structures were formed by the process illustrated in FIG. 11. The cladding layer 1110 is a layer of aluminum about 100 nm thick. The isolation layer 1120 is a layer of aluminum oxide about 3.5 nm thick deposited by ALD at 300° C. The sacrificial layer 1130 is amorphous silicon at a thickness of about 30 nm which is deposited by ALD at 300° C. and etched using a Lam 9600 etcher. The sacrificial layer is then removed using xenon difluoride which is selective in etching the sacrificial layer in the presence of aluminum and fused silica. FIG. 24 is a close up view of FIG. 23 which chose that Wi is around 26.5 nm and Wz is around 85 nm.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above can be used in various combinations. For example, particle delivery can be practiced with array well sizing methods as described. All publications, patents, patent applications, and/or other documents cited in this application are incorporated by reference in their entirety for all purposes to the same extent as if each individual publication, patent, patent application, and/or other document were individually and separately indicated to be incorporated by reference for all purposes.

What is claimed is:

1. An array of nanoscale apertures comprising:
a transparent substrate having a cladding layer deposited on its surface, the cladding layer having a plurality of nanoscale apertures extending therethrough;
each nanoscale aperture having walls and a base and each nanoscale aperture having an island of island material on the base of the aperture, wherein the island does not contact the walls of the nanoscale aperture, and wherein the island material is a metallic, dielectric, or semiconductor material.

2. The array of claim 1 wherein the substrate comprises a transparent material.

3. The array of claim 1 wherein the substrate comprises a silica based material.

4. The array of claim 1 wherein the substrate comprises a fused silica.

5. The array of claim 1 wherein the island material is a metallic material.

6. The array of claim 1 wherein the metallic material comprises gold.

7. The array of claim 1 wherein the substrate comprises more than 10,000 nanoscale apertures.

8. The array of claim 1 wherein the nanoscale apertures comprise holes having a circular lateral profile.

9. The array of claim 1 wherein the apertures have a cross sectional dimension between 1 nm and 500 nm.

10. The array of claim 1 wherein at least some of the plurality of nanoscale apertures comprise a single molecule of interest attached to the island in the nanoscale aperture.

11. The array of claim 10 wherein the single molecule of interest comprises an enzyme attached to the island in the nanoscale aperture.

12. The array of claim 1 wherein at least some of the plurality of nanoscale apertures comprise a single active polymerase enzyme, a single active template nucleic acid, or a single active primer attached to the island.

13. The array of claim 1 wherein the island of island material is formed by a process comprising:
providing a substrate having a cladding layer, the cladding layer having a plurality of nanoscale apertures extending therethrough;
conformally depositing a sacrificial layer onto the top of the cladding layer;
directionally etching the sacrificial layer such that the sacrificial layer remains on the walls of the nanoscale apertures, and the sacrificial layer is removed from the region of the nanoscale aperture between the sacrificial layer on the walls;
depositing an island material onto the substrate;
etching the island material such that a portion of the island material remains in the region between the sacrificial layer between the walls;

removing the sacrificial layer on the walls thereby producing an island of island material within the nanoscale aperture.

14. The array of claim 1 wherein the island of island material is formed by a process comprising:
- providing a substrate having a cladding layer, the cladding layer having a plurality of nanoscale apertures;
- conformally depositing a first sacrificial layer onto the top of the cladding layer;
- directionally etching the sacrificial layer such that the sacrificial layer remains on the walls of the nanoscale apertures, and the sacrificial layer is removed from the region of the nanoscale aperture between the sacrificial layer on the walls;
- directionally depositing an island material onto the substrate;
- depositing a second sacrificial layer on top of the island material;
- etching the second sacrificial layer so as to leave a portion of the second sacrificial layer on top of the island material within the nanoscale aperture, thereby protecting it from the subsequent etching step;
- etching the island material from the top of the cladding such that a portion of the island material remains in the region between the sacrificial layer between the walls; and
- removing the first sacrificial layer on the walls and the second sacrificial layer, thereby producing an island of island material within the nanoscale aperture.

15. The array of claim 1 wherein the island of island material is formed by a process comprising:
- providing a stack of materials comprising from bottom to top, a transparent substrate, an island material layer, a sacrificial layer, and a hard mask;
- patterning and etching the hard mask layer to form a plurality of nanoscale features;
- etching the sacrificial layer to expose regions of the island material layer such that the etch of the sacrificial layer extends underneath the hard mask layer, producing and undercut;
- directionally depositing a cladding layer, leaving portions of the island material layer under the hard mask layer exposed;
- etching the exposed portions of the island material layer; and
- removing the remaining portions of the sacrificial layer, hard mask, and portions of the cladding layer on top of the hard mask; thereby producing nanoscale apertures comprising islands of island material within the nanoscale apertures surrounded by regions of transparent substrate surface.

16. The array of claim 1 wherein the lateral dimensions of the islands are about 40% to about 10% of the corresponding lateral dimension of the nanoscale aperture in which the islands are present.

* * * * *